United States Patent
Yoshida et al.

(10) Patent No.: US 7,379,572 B2
(45) Date of Patent: May 27, 2008

(54) METHOD FOR COMPUTER-AIDED DETECTION OF THREE-DIMENSIONAL LESIONS

(75) Inventors: Hiroyuki Yoshida, Chicago, IL (US); Abraham Dachman, Chicago, IL (US); Janne Nappi, Chicago, IL (US); Peter Maceneaney, Chicago, IL (US); David Rubin, Chicago, IL (US); Yoshitaka Masutani, Tokyo (JP); Li Lan, Naperville, IL (US)

(73) Assignee: University of Chicago, Chicago, IL (US)

( * ) Notice: Subject to any disclaimer, the term of this patent is extended or adjusted under 35 U.S.C. 154(b) by 740 days.

(21) Appl. No.: 10/270,674

(22) Filed: Oct. 16, 2002

(65) Prior Publication Data

US 2003/0223627 A1    Dec. 4, 2003

Related U.S. Application Data

(60) Provisional application No. 60/329,322, filed on Oct. 16, 2001.

(51) Int. Cl.
    *G06K 9/00* (2006.01)
(52) U.S. Cl. ............................... 382/128; 382/131
(58) Field of Classification Search ............... 382/131, 382/128
    See application file for complete search history.

(56) References Cited

U.S. PATENT DOCUMENTS

| | | | |
|---|---|---|---|
| 6,138,045 A | 10/2000 | Kupinski et al. | |
| 6,246,784 B1* | 6/2001 | Summers et al. | 382/128 |
| 6,493,460 B1* | 12/2002 | MacAulay et al. | 382/133 |
| 6,694,163 B1* | 2/2004 | Vining | 600/407 |
| 6,980,682 B1* | 12/2005 | Avinash et al. | 382/131 |
| 7,043,064 B2* | 5/2006 | Paik et al. | 382/128 |
| 7,194,117 B2* | 3/2007 | Kaufman et al. | 382/128 |
| 2001/0031920 A1* | 10/2001 | Kaufman et al. | 600/431 |
| 2003/0053667 A1* | 3/2003 | Paragios et al. | 382/128 |
| 2003/0223627 A1 | 12/2003 | Yoshida et al. | |
| 2005/0152588 A1* | 7/2005 | Yoshida et al. | 382/128 |

OTHER PUBLICATIONS

Sato et al.; "A Gradient Magnitude Based Region Gowing Algorithm for Accurate Segmentation", IEEE, 2000.*

(Continued)

*Primary Examiner*—Bhavesh M. Mehta
*Assistant Examiner*—John B Strege
(74) *Attorney, Agent, or Firm*—Oblon, Spivak, McClelland, Maier & Neustadt, P.C.

(57) ABSTRACT

A method, system, and computer program product for identifying at least one three-dimensionally extended lesion within a volumetric region encompassing an inner surface, an outer surface, and intervening tissue of a target organ. The method includes: (1) generating a set of voxels representing a total scanned volume from a set of cross-sectional images of the target organ; (2) performing segmentation to extract a set of voxels representing the volumetric region from the set of voxels representing the total scanned volume; (3) detecting a set of candidate lesions based on geometric feature values of each voxel in the set of voxels representing the volumetric region; and (4) selecting the at least one three-dimensionally extended lesion from the set of candidate lesions based on at least one of volumetric, morphologic, and texture feature values of each lesion in the set of candidate lesions.

35 Claims, 31 Drawing Sheets

OTHER PUBLICATIONS

Samara et al.; "Automated centerline tracking of the human colon", SPIE Conference on Image Processing, Feb. 1998.*

Ashton et al.; "A novel volumetric feature extraction technique, with applications to MR images", IEEE, 1995.*

Sato et al.; "An automatic colon segmentation for 3D virtual colonoscopy", IEICE Trans. Information and Systems, 2000.*

Liang et al.; "Inclusion of A Priori Information in Segmentation of Colon Lumen for 3D Virtual Coloscopy", IEEE, 1998.*

Justice et al.; "3-D Segmentation of MR Brain Images using seeded Region Growing", 18th Annual International Conference of the IEEE Engineering in Medicine and Biology Society, Amsterdam, 1996.*

Summers et al.; "Automated Polyp Detector for CT Colonography Feasibility Study", Radiology, pp. 284-290, 2000.*

Gokturk et al.; "A Learning Method for Automated Polyp Detection", MICCAI 2001, Oct. 14-17, 2001.*

Acar et al.; "Using Optical Flow Fields for Polyp Detection in Virtual Colonoscopy", MICCAI 2001, Oct. 14-17, 2001.*

Macari et al.; "Comparison of Time-Efficient CT Colonography with Two- and Three Dimensional Colonic Evaluation for Detecting Colorectal Polyps", AJR:174, pp. 1543-1549, Jun. 2000.*

Worthington et al.; "Region-Base Object Recognition Using Shape-from-Shading", ECCV 2000, LNCS 1842, pp. 455-471, 2000.*

J. D. Potter, et al., Epidemiologic Reviews, vol. 15, No. 2, pp. 499-545, "Colon Cancer: A Review of the Epidemiology", 1993.

M. J. O'Brien, et al., Gastroenterology, vol. 98, No. 2, pp. 371-379, "The National Polyp Study, Patient and Polyp Characteristics Associated with High-Grade Dysplasia in Colorectal Adenomas", 1990.

S. J. Winawer, et al., Gastroenterology, vol. 112, No. 2, pp. 594-642, "Colorectal Cancer Screening: Clinical Guidelines and Rationale", Feb. 1997.

C. D. Johnson, et al., Radiology, vol. 216, No. 2, pp. 331-341, "CT Colonography: The Next Colon Screening Examination?", Aug. 2000.

J. T. Ferrucci, Am. J. Roentgenol., vol. 177, pp. 975-988, "Colon Cancer Screening with Virtual Colonoscopy: Promise, Polyps, Politics", Nov. 2001.

P. M. McMahon, et al., Abdominal Imaging, vol. 27, pp. 235-243, "Colorectal Cancer Screening Issues: A Role for CT Colonography?", 2002.

P. Pescatore, et al., Gut, vol. 47, no. 1, pp. 126-130, "Diagnostic Accuracy and Interobserver Agreement of CT Colonography (Virtual Colonoscopy)", Jul. 1, 2000.

J. G. Fletcher, et al., Radiology, vol. 216, No. 3, pp. 704-711, "Optimization of CT Colonography Technique: Prospective Trial in 180 Patients", Sep. 2000.

G. D. Rubin, et al., Radiology, vol. 199, No. 2, pp. 321-330, "Perspective Volume Rendering of CT and MR Images: Applications for Endoscopic Imaging", May 1996.

A. H. Dachman, et al., Am. J. Roentgenol., vol. 171, pp. 989-995, "CT Colonography With Three-Dimensional Problem Solving for Detection of Colonic Polyps", Oct. 1998.

A. Sonnenberg, et al., Ann. Intern. Med., vol. 133, No. 8, pp. 573-584, "Cost-Effectiveness of Colonoscopy in Screening for Colorectal Cancer", Oct. 17, 2000.

J. Yee, et al., Radiology, vol. 219, No. 3, pp. 685-692, "Colorectal Neoplasia: Performance Characteristics of CT Colonography for Detection in 300 Patients", Jun. 2001.

A. H. Dachman, Abdominal Imaging, vol. 27, pp. 260-267, "Diagnostic Performance of Virtual Colonoscopy", 2002.

D. K. Rex, et al., Gastrointestinal Endoscopy, vol. 50, No. 3, pp. 309-313, "An Initial Experience with Screening for Colon Polyps Using Spiral CT with and without CT Colography (Virtual Colonoscopy)", 1999.

H. Yoshida, et al., IEEE Transactions on Medical Imaging, vol. 20, No. 12, pp. 1261-1274, "Three-Dimensional Computer-Aided Diagnosis Scheme for Detection of Colonic Polyps", Dec. 2001.

H. Yoshida, et al., Radiology, vol. 222, No. 2, pp. 327-336, "Computerized Detection of Colonic Polyps at CT Colonography on the Basis of Volumetric Features: Pilot Study", Feb. 2002.

H. Yoshida, et al., RadioGraphics, vol. 22, No. 4, pp. 963-979, "Computer-Aided Diagnosis Scheme for Detection of Polyps at CT Colonography", Jul.-Aug. 2002.

J. G. Fletcher, et al., Am. J. Roentgenol., vol. 172, pp. 1271-1278, "CT Colonography: Potential Pitfalls and Problem-Solving Techniques", May 1999.

M. Macari, et al., Am. J. Roentgenol., vol. 176, pp. 137-143, "Pitfalls of Using Three-Dimensional CT Colonogrphy With Two-Dimensional Imaging Correlation", Jan. 2001.

R. M. Summers, et al., Radiology, vol. 219, No. 1, pp. 51-59, "Automated Polyp Detection at CT Colonography: Feasibility Assessment in a Human Population", Apr. 2001.

S. B. Göktürk, et al., IEEE Transactions on Medical Imaging, vol. 20, No. 12, pp. 1251-1260, "A Statistical 3-D Pattern Processing Method for Computer-Aided Detection of Polyps in CT Colonography", Dec. 2001.

G. Kiss, et al., Eur. Radiol., vol. 12, pp. 77-81, "Computer-Aided Diagnosis in Virtual Colonography Via Combination of Surface Normal and Sphere Fitting Methods", 2002.

D. J. Vining, et al., Computer-Aided Diagnosis in Medical Imaging, pp. 445-452, "Virtual Colonoscopy with Computer-Assisted Polyp Detection", 1999.

R. M. Summers, et al., Radiology, vol. 216, No. 1, pp. 284-290, "Automated Polyp Detector for CT Colonography: Feasibility Study", Jul. 2000.

D. S. Paik, et al., Radiology, vol. 217(P), p. 370, "Computer Aided Detection of Polyps in CT Colonography: Method and Free-Response ROC Evaluation of Peformance", 2000.

D. Chen, et al., IEEE Transactions on Medical Imaging, vol. 19, No. 12, pp. 1220-1226, "A Novel Approach to Extract Colon Lumen From CT Images for Virtual Colonoscopy", Dec. 2000.

C. L. Wyatt, et al., Computerized Medical Imaging and Graphics, vol. 24, pp. 1-9, " Automatic Segmentation of the Colon for Virtual Colonoscopy", 2000.

L. Hong, et al., IEEE Transactions on Nuclear Science, vol. 44, No. 3, pp. 1297-1301, "Reconstruction and Visualization of 3D Models of Colonic Surface", Jun. 1997.

Y. Masutani, et al., Journal of Computer Assisted Tomography, vol. 25, No. 4, pp. 629-638, "Automated Segmentation of Colonic Walls for Computerized Detection of Polyps in CT Colonography", 2001.

J. Näppi, et al., Journal of Computer Assisted Tomography, vol. 26, No. 4, pp. 493-504, "Automated Knowledge-Guided Segmentation of Colonic Walls for Computerized Detection of Polyps in CT Colonography", 2002.

C. Dorai, et al., IEEE Transactions on Pattern Analysis and Machine Intelligence, vol. 19, No. 10, pp. 1115-1130, "COSMOS—A Representation Scheme for 3D Free-Form Objects", Oct. 1997.

J. Näppi, et al., Academic Radiology, vol. 9, No. 4, pp. 386-397, "Automated Detection of Polyps with CT Colonography: Evaluation of Volumetric Features for Reduction of False-Positive Findings", Apr. 2002.

C. E. Metz, et al., Statistics in Medicine, vol. 17, pp. 1033-1053, Maximum Likelihood Estimation of Receiver Operating Characteristic (ROC) Curves from Continuously-Distributed Data, 1998.

Justice, R.K., et al., "3-D Segmentation of MR Brain Images Using Seeded Region Growing"; Proc. of the 18th Annual International Conference of the IEEE, Engineering in Medicine and Biology Society, Amsterdam 1996, vol. 3, pp. 1083-1084.

Liang, Z., et al., "Inclusion of a Priori Information in Segmentation of Colon Lumen for 3D Virtual Colonoscopy"; Nuclear Science Symposium, 1997 IEEE, pp. 1423-1427.

Dongqing Chen, et al., "A Novel Approach to Extract Colon Lumen from CT Images for Virtual Colonoscopy", IEEE Transactions on Medical Imaging, Dec. 2000, vol. 19, No. 12, pp. 1220-1226.

Y. Masutani, et al., Automated Segmentation of the Pulmonary Vascular Tree in Spiral CT Angiography for Computerized Detection of Pulmonary Embolism, the annual meeting of American Association of Medical Physicists (AAPM) 1999, Medical Physics, vol. 26, No. 6, Jun. 1999, pp. 1102.

The abstract for Y. Masutani, et al., Computerized Detection of Pulmonary Embolism in Spiral CT Angiography: Segmentation and 3D Image Feature Analysis of Thrombi, SPIE Medical Imaging 2000.

H. Kobatake, et al., Convergence Index Filter for Vector Fields, IEEE Trans. on Image Processing, vol. 8, No. 8, pp. 1029-1038, 1999.

Y. Masutani, et al., Automated Segmentation and Visualization of the Pulmonary Vascular Tree in Spiral CT Angiography: An Anatomy-Oriented Approach based on Three-Dimensional Image Analysis, Journal of Computer-Assisted Tomography, vol. 25, No. 4, pp. 587-597, 2001.

Y. Masutani, et al., Computerized Detection of Pulmonary Embolism in Spiral CT Angiography: A segmentation-based approach using 3D image analysis and anatomical knowledge, Proc. of Computer Assisted Radiology and Surgery (CARS) 2000.

U.S. Appl. No. 11/181,884, filed Jul. 15, 2005, Suzuki et al.

Yoshitaka Masutani, et al., Automated Segmentation of Colonic Walls for Computerized Detection of Polyps in CT Colonography, Journal of Computer Assisted Tomography, vol. 25, No. 4, Aug. 31, 2001, pp. 629-638, XP009047881.

Dongquing Chen, et al., A Novel Approach to Extract Colon Lumen from CT Images for Virtual Colonoscopy, IEEE Transactions on Medical Imaging, IEEE Inc., New York, US, vol. 19, No. 12, Dec. 1, 2000, pp. 1220-1226, XP001003262.

Hiroyuki Yoshida, et al., Computer-aided Detection of Polyps in CT Colonography Based on Geometric Features, Proc. SPIE Medical Imaging 2001, Physilology and Function from Multidimensional Images, vol. 4321, May 31, 2001, pp. 53-57, XP-001206312.

J. Nappi, et al., Computer-Aided Detection of Polyps in CT Colonography: Evaluation of Volumetric Features in Differentiating Polyps from False Positives, Proceedings of the 15th International Congress and Exhibition; Computer Assisted Radiology and Surgery, vol. 123, Jun. 27, 2001, pp. 635-640, XP009047888.

\* cited by examiner

AXIAL    CORONAL

 
FIG.12a  FIG.12b
 
FIG.12c  FIG.12d
 
FIG.12e  FIG.12f axial axial coronal coronal

METHOD FOR COMPUTER-AIDED DETECTION OF THREE-DIMENSIONAL LESIONS

CROSS-REFERENCE TO CO-PENDING APPLICATIONS

The present application is related to and claims priority to U.S. Provisional Application Ser. No. 60/329,322, filed Oct. 16, 2001. The contents of that application are incorporated herein by reference.

BACKGROUND OF THE INVENTION

1. Field of the Invention

The present invention relates generally to systems and methods for the computer-aided detection of three-dimensionally extended organ lesions.

The present invention also generally relates to automated techniques for the detection of abnormal anatomic regions, for example, as disclosed, in particular, in one or more of U.S. Pat. Nos. 4,907,156; 5,133,020; 5,832,103; and 6,138,045; all of which are incorporated herein by reference.

The present invention also generally relates to computerized techniques for automated analysis of digital images, for example, as disclosed in one or more of U.S. Pat. Nos. 4,839,807; 4,841,555; 4,851,984; 4,875,165; 4,918,534; 5,072,384; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,732,697; 5,740,268; 5,790,690; 5,873,824; 5,881,124; 5,931,780; 5,974,165; 5,982,915; 5,984,870; 5,987,345; 6,011,862; 6,058,322; 6,067,373; 6,075,878; 6,078,680; 6,088,473; 6,112,112; 6,141,437; 6,185,320; 6,205,348; 6,240,201; 6,282,305; 6,282,307; 6,317,617 as well as U.S. patent application Ser. Nos. 08/173,935; 08/398,307 (PCT Publication WO 96/27846); 08/536,149; 08/900,189; 09/027,468; 09/141,535; 09/471,088; 09/692,218; 09/716,335; 09/759,333; 09/760,854; 09/773,636; 09/816,217; 09/830,562; 09/818,831; 09/842,860; 09/860,574; 60/160,790; 60/176,304; 09/990,311; 09/990,310; 09/990,377; and 60/331, 995; and PCT patent applications PCT/US98/15165; PCT/US98/24933; PCT/US99/03287; PCT/US00/41299; PCT/US01/00680; PCT/US01/01478 and PCT/US01/01479, all of which are incorporated herein by reference.

The present invention includes the use of various technologies referenced and described in the above-noted U.S. patents and patent applications, as well as described in the references identified in the following LIST OF REFERENCES by the author(s) and year of publication and cross-referenced throughout the specification by reference to the respective number in parentheses, of the reference:

LIST OF REFERENCES

[1] J. D. Potter, M. L. Slattery, R. M. Bostick, and S. M. Gapstur, "Colon cancer: a review of the epidemiology," *Epidemiol Rev*, vol. 15, pp. 499-545, 1993.

[2] K. Doi, H. MacMahon, M. L. Giger, and K. R. Hoffmann, "Computer-aided diagnosis in medical imaging," in *Excerpta Medica: International Congress Series II*82. Amsterdam: Elsevier, 1999.

[3] M. J. O'Brien, S. J. Winawer, A. G Zauber, L. S. Gottlieb, S. S. Sternberg, B. Diaz, G. R. Dickersin, S. Ewing, S. Geller, D. Kasimian, and et al., "The national polyp study: patient and polyp characteristics associated with high-grade dysplasia in colorectal adenomas," *Gastroenterology*, vol. 98, pp. 371-9, 1990.

[4] S. J. Winawer, R. H. Fletcher, L. Miller, F. Godlee, M. H. Stolar, C. D. Mulrow, S. H. Woolf, S. N. Glick, T. G. Ganiats, J. H. Bond, L. Rosen, J. G. Zapka, S. J. Olsen, F. M. Giardiello, J. E. Sisk, R. Van Antwerp, C. Brown-Davis, D. A. Marciniak, and R. J. Mayer, "Colorectal cancer screening: clinical guidelines and rationale," *Gastroenterology*, vol. 112, pp. 594-642, 1997.

[5] C. D. Johnson and A. H. Dachman, "CT colonography: the next colon screening examination?," *Radiology*, vol. 216, pp. 331-41, 2000.

[6] J. T. Ferrucci, "Colon cancer screening with virtual colonoscopy: promise, polyps, politics," *AJR Am J Roentgenol*, vol. 177, pp. 975-88, 2001.

[7] P. M. McMahon and G. S. Gazelle, "Colorectal cancer screening issues: a role for CT colonography?," *Abdominal Imaging*, vol. 27, pp. 235-243, 2002.

[8] P. Pescatore, T. Glucker, J. Delarive, R. Meuli, D. Pantoflickova, B. Duvoisin, P. Schnyder, A. L. Blum, and G. Dorta, "Diagnostic accuracy and interobserver agreement of CT colonography (virtual colonoscopy)," *Gut*, vol. 47, pp. 126-130, 2000.

[9] J. G. Fletcher, C. D. Johnson, T. J. Welch, R. L. MacCarty, D. A. Ahlquist, J. E. Reed, W. S. Harmsen, and L. A. Wilson, "Optimization of CT colonography technique: prospective trial in 180 patients," *Radiology*, vol. 216, pp. 704-11, 2000.

[10] G. D. Rubin, C. F. Beaulieu, V. Argiro, H. Ringl, A. M. Norbash, J. F. Feller, M. D. Dake, R. B. Jeffrey, and S. Napel, "Perspective volume rendering of CT and MR images: applications for endoscopic imaging," *Radiology*, vol. 199, pp. 321-30., 1996.

[11] A. H. Dachman, J. K. Kuniyoshi, C. M. Boyle, Y. Samara, K. R. Hoffmann, D. T. Rubin, and I. Hanan, "CT colonography with three-dimensional problem solving for detection of colonic polyps," *Am J Roentgenol*, vol. 171, pp. 989-95, 1998.

[12] A. Sonnenberg, F. Delco, and J. M. Inadomi, "Cost-effectiveness of colonoscopy in screening for colorectal cancer," *Ann Intern Med*, vol. 133, pp. 573-84., 2000.

[13] J. Yee, G. A. Akerkar, R. K. Hung, A. M. Steinauer-Gebauer, S. D. Wall, and K. R. McQuaid, "Colorectal neoplasia: performance characteristics of CT colonography for detection in 300 patients," *Radiology*, vol. 219, pp. 685-92., 2001.

[14] A. H. Dachman, "Diagnostic performance of virtual colonoscopy," *Abdominal Imaging*, vol. 27, pp. 260-267, 2002.

[15] D. K. Rex, D. Vining, and K. K. Kopecky, "An initial experience with screening for colon polyps using spiral CT with and without CT colography (virtual colonoscopy)," *Gastrointest Endosc*, vol. 50, pp. 309-13., 1999.

[16] H. Yoshida and J. Nappi, "Three-dimensional computer-aided diagnosis scheme for detection of colonic polyps," *IEEE Transactions on Medial Imaging*, vol. 20, pp. 1261-1274, 2001.

[17] H. Yoshida, Y. Masutani, P. MacEneaney, D. T. Rubin, and A. H. Dachman, "Computerized detection of colonic polyps at CT colonography on the basis of volumetric features: pilot study," *Radiology*, vol. 222, pp. 327-36, 2002.

[18] H. Yoshida, J. Nappi, P. MacEneaney, D. T. Rubin, and A. H. D. A H, "Computer-aided diagnosis scheme for the detection of polyps in CT colonography.," *RadioGraphics*, vol. 22, pp. 963-979, 2002.

[19] J. G. Fletcher, C. D. Johnson, R. L. MacCarty, T. J. Welch, J. E. Reed, and A. K. Hara, "CT colonography: potential pitfalls and problem-solving techniques," *Am J Roentgenol*, vol. 172, pp. 1271-8, 1999.

[20] M. Macari and A. J. Megibow, "Pitfalls of using three-dimensional CT colonography with two-dimensional imaging correlation," *Am J Roentgenol*, vol. 176, pp. 137-43., 2001.

[21] R. M. Summers, C. D. Johnson, L. M. Pusanik, J. D. Malley, A. M. Youssef, and J. E. Reed, "Automated polyp detection at CT colonography: feasibility assessment in a human population," *Radiology*, vol. 219, pp. 51-9., 2001.

[22] S. B. Gokturk, C. Tomasi, B. Acar, C. F. Beaulieu, D. S. Paik, R. B. Jeffrey, Jr., J. Yee, and S. Napel, "A statistical 3-D pattern processing method for computer-aided detection of polyps in CT colonography," *IEEE Trans Med Imaging*, vol. 20, pp. 1251-60, 2001.

[23] G. Kiss, J. Van Cleynenbreugel, M. Thomeer, P. Suetens, and G. Marchal, "Computer-aided diagnosis in virtual colonography via combination of surface normal and sphere fitting methods," *Eur Radiol*, vol. 12, pp. 77-81, 2002.

[24] D. J. Vining, Y. Ge, D. K. Ahn, and D. R. Stelts, "Virtual colonoscopy with computer-assisted polyp detection," in *Computer-Aided Diagnosis in Medical Imaging: Proceedings of the First International Workshop on Computer-Aided Diagnosis*, K. Doi, H. MacMahon, M. L. Giger, and K. R. Hoffmann, Eds.: Elsevier Science B. V., 1999, pp. 445-452.

[25] R. M. Summers, C. F. Beaulieu, L. M. Pusanik, J. D. Malley, R. B. Jeffrey, Jr., D. I. Glazer, and S. Napel, "Automated polyp detector for CT colonography: feasibility study," *Radiology*, vol. 216, pp. 284-90, 2000.

[26] D. S. Paik, C. F. Beaulieu, R. B. Jeffrey, C. Karadi, and S. Napel, "Detection of polyps in CT colonography: a comparision of a computer-aided detection algorithm to 3D visualization methods," *Radiology*, vol. 213(P), pp. 193, 1999.

[27] D. S. Paik, C. F. Beaulieu, R. B. Jeffrey, J. Yee, A. M. Steinauer-Gebauer, and S. Napel, "Computer aided detection of polyps in CT colonography: method and free-response ROC evaluation of performance," *Radiology*, vol. 217(P), pp. 370, 2000.

[28] D. Chen, Z. Liang, M. R. Wax, L. Li, B. Li, and A. E. Kaufman, "A novel approach to extract colon lumen from CT images for virtual colonoscopy," *IEEE Trans Med Imaging*, vol. 19, pp. 1220-6., 2000.

[29] C. L. Wyatt, Y. Ge, and D. J. Vining, "Automatic segmentation of the colon for virtual colonoscopy," *Comput Med Imaging Graph*, vol. 24, pp. 1-9, 2000.

[30] L. Hong, Z. Liang, A. Viswambharan, A. Kaufman, and M. Wax, "Reconstruction and visualization of 3D models of colonic surface," *IEEE Transactions on Nuclear Science*, vol. 44, pp. 1297-1302, 1997.

[31] Y. Masutani, H. Yoshida, P. MacEneaney, and A. Dachman, "Automated segmentation of colonic walls for computerized detection of polyps in CT colonography," *Journal of Computer Assisted Tomography*, vol. 25, pp. 629-638, 2001.

[32] J. Nappi, A. H. Dachman, P. MacEneaney, and H. Yoshida, "Automated knowledge-guided segmentation of colonic walls for computerized detection of polyps in CT colonography," *J Comput Assist Tomogr*, vol. 26, pp. 493-504, 2002.

[33] J. Serra, "Image Analysis and Mathematical Morphology," 1982.

[34] A. K. Jain, *Fundamentals of Digital Image Processing*. New Jersey: Prentice Hall, 1989.

[35] S. Z. Li, *Markov Random Field: Modeling in Computer Vision*. New York: Spinger-Verlag, 1995.

[36] E. R. Dougherty, *An Introduction to Morphological Image Processing*: Society of Photo-optical Instrumentation Engineers, 1992.

[37] J. C. Russ, *The Image Processing Handbook, Third Edition*: CRC Press, 1999.

[38] J. J. Koenderink, *Solid shape*. Cambridge, Mass.: MIT Press, 1990.

[39] C. Dorai and A. K. Jain, "COSMOS—A representation scheme for 3D free-form objects," *IEEE Transactions on Pattern Analysis and Machine Intelligence*, vol. 19, pp. 1115-1130, 1997.

[40] S. Kobayashi and K. Nomizu, *Foundations of differential geometry I*, vol. I: Interscience Press, 1963.

[41] G Lohmann, *Volumetric image analysis*: John Wiley & Son Ltd, 1998.

[42] O. Faugeras, *Three-dimensional computer vision: a geometric viewpoint*. Cambridge, Mass.: MIT Press, 1993.

[43] F. Hoppner, F. Klawonn, R. Kruse, and T. Runkler, *Fuzzy cluster analysis: methods for classification, data analysis, and image recognition*. New York: John Wiley & Sons, 1999.

[44] P. Arabie, L. J. Hubert, and G. D. Soete, "Clustering and Classification," World Scientific Pub Co, 1996.

[45] J. Nappi and H. Yoshida, "Automated detection of polyps with CT colonography: evaluation of volumetric features for reduction of false-positive findings," *Acad Radiol*, vol. 9, pp. 386-97, 2002.

[46] J. Nappi and H. Yoshida, "Feature-guided analysis for reduction of false positives in CAD of polyps for CT colonography," *Medical Physics*, pp. (submitted), 2002.

[47] K. Fukunaga, *Introduction to statistical pattern recognition*. San Diego: Academic Press, 1990.

[48] S. Haykin, *Neural networks: A comprehensive foundation*. New Jersey: Prentice Hall, 1999.

[49] N. Cristianini and J. Shawe-Taylor, *An Introduction to Support Vector Machines and Other Kernel-based Learning Methods*: Cambridge University Press, 2002.

[50] R. O. Duda, P. E. Hart, and D. G Stork, *Pattern Recognition*: John Wiley & Sons, 2001.

[51] C. E. Metz, "Fundamental ROC analysis," in *Handbook of Medical Imaging*, vol. 1, J. Beutel, H. L. Kundel, and R. L. V. Metter, Eds. Bellingham, Wash. USA: SPIE Press, 2000, pp. 751-770.

[52] C. E. Metz, B. A. Herman, and J. H. Shen, "Maximum likelihood estimation of receiver operating characteristic (ROC) curves from continuously-distributed data," *Stat Med*, vol. 17, pp. 1033-53, 1998.

[53] E. Efron, *The jackknife, the bootstrap, and other resampling plans*. Philadelphia: Society for Industrial and Applied Mathematics, 1982.

[54] B. Efron and R. J. Tibshirani, *An introduction to the bootstrap*, vol. 57. New York: Chapman & Hall, 1993.

The entire contents of each related patent and patent application listed above, and each reference listed in the LIST OF REFERENCES, are incorporated herein by reference.

DISCUSSION OF THE BACKGROUND

Studies show that early detection and removal of lesions in human organs can reduce the risk of cancer, and decrease the overall mortality rate from various forms of cancer [1].

Moreover, computer-aided detection of lesions based on radiographic images of a target organ is becoming an important medical tool to assist radiologists [2].

In particular, colon cancer is the second leading cause of cancer deaths in the United States, with approximately 60,000 deaths per year [1, 3]. Early detection and removal of polyps can reduce the risk of colon cancer and thus result in a decrease in the mortality rate from colorectal cancer [4]. Computed-tomographic colonography (CTC) or virtual colonoscopy is a technique for detecting colorectal neoplasms by using a CT scan of the cleansed and air-distended colon [5-7]. Current CT technology allows a single image set of the colon to be acquired in 20-30 seconds, which translates into an easier, more comfortable examination than is available with other screening tests. Therefore, CTC has been advocated as a promising technique for providing mass screening for colorectal carcinoma [5-7].

For CTC to be a clinically practical means of screening for colon cancers, the technique must be feasible for interpreting a large number of images in a time-effective fashion, and for detecting polyps and masses with high accuracy. Currently, however, interpretation of an entire CTC examination is time-consuming [5, 8, 9]. A typical CTC examination produces 150-350 axial CT images each for the supine and prone imaging data sets, yielding a total of 300-700 images per patient. Despite the recent advances in image-display techniques [10], studies show that the case interpretation time is still between 15 and 40 minutes even when reading is done by experts in abdominal imaging [5, 6, 11]. The interpretation time for an entire CTC examination should be reduced substantially before CTC can be translated from the research area to routine clinical practice, and especially to the screening setting [12]. In addition, the diagnostic performance of CTC currently remains undetermined and prone to perceptual errors. Several studies have showed a high sensitivity of 80-100% and a specificity of 80-90% in the detection of polyps [9, 13, 14], whereas others reported a relatively low sensitivity of 40-70% and a specificity of 70-80% [8, 15]. It has been suggested that the reported differences in sensitivity and specificity for CTC are partly based on the undefined learning curve for the interpretation of CTC [15]. Moreover, the visibility and conspicuity of polyps, and thus the accuracy of polyp detection, may depend on the image acquisition parameters and display methods, both of which are still under investigation. These factors increase the perceptual error even for experienced radiologists.

Computer-aided detection (CAD) of polyps is attractive because it has the potential to overcome the above difficulties with CTC [16-18]. A CAD scheme automatically detects polyps and masses in CTC images, and it provides the locations of suspicious polyps to the radiologists. The "second opinion" offered by a CAD scheme has the potential to (1) reduce radiologists' interpretation time, and (2) increase the radiologists' diagnostic performance in the detection of polyps.

Reduction of interpretation time can be achieved if radiologists focus on the small number of regions indicated by the CAD scheme. Radiologists can quickly survey a large portion of the colon that is likely to be normal. An improvement in the detection performance can be achieved because CAD can reduce radiologists' perceptual errors. These perceptual errors can be caused by the presence of normal structures that mimic polyps and by variable conspicuity of polyps, depending on the display methods used [11, 19]. The absence of visual cues which normally exist with colonoscopy, such as mucosal color changes, and a large number of images for each patient, also makes image interpretation tedious and susceptible to perceptual error. Perceptual errors due to the large number of images are becoming more important as there is a tendency to use thinner collimation and reconstruction intervals for production of high-quality images [20]. Furthermore, CAD schemes can also provide objective and consistent results, which can be useful for reducing differences in skill and experience among radiologists in identifying polyps in CTC.

In the past several years, investigators have developed prototype CAD schemes [16-18, 21-24]. These schemes showed a potential to detect polyps in CTC because they gave a high detection performance when they were applied to simulated polyps. However, these existing schemes suffered from either a low sensitivity or a high false-positive rate when they were applied to clinical cases. Among CAD prototypes that were evaluated based on clinical cases, Summers et al. [21, 25] developed a CAD scheme based on the curvature of the surface of the colonic wall. The scheme yielded a sensitivity of 64% at the rate of 6 false-positive (FP) detections per colon based on 20 patients with 28 polyps larger than 1 cm. The sensitivity could be 71% when only polyps in well-distended segments are considered. The FP rate could be reduced to 3.5 FP detections per patient by use of a CT attenuation feature. Paik et al. [26, 27] proposed a CAD scheme based on the contour normal method that is based on the directions of the normal vectors from air to tissue, and evaluated their scheme based on 51 patients with 14 polyps larger than 8.5 mm. Their scheme yielded a sensitivity of 92.9% at 7.9 FP detections per colon. Göktürk et al. [22] applied the random orthogonal shape section method to the scheme to reduce the number of FP detections substantially. Vining et al. [24] developed a CAD scheme based on surface curvature and wall thickness. In an analysis of 10 patients with 15 polyps larger than 5 mm, the sensitivity was 73% with approximately 50 FP detections per patient. Kiss et al. [23] reported a CAD scheme based on convexity and sphericity. Their scheme yielded 80% sensitivity at 8.2 FP detections per data set for 15 polyps larger than 5 mm in 18 patients. Yoshida et al. [16-18] developed a CAD scheme on 3-dimensionally derived geometric and volumetric features. In their methods, first a thick volumetric region encompassing the entire colon was extracted from the CTC data. Then polyp candidates were extracted using the geometric and volumetric features. Finally, false positives were removed by use of texture features and a statistical classifier. In an analysis of 71 cases, including 14 cases with polyps larger than 5 mm and 57 cases without polyps, our scheme yielded 100% sensitivity with 2.0 FPs per case.

In parallel to the efforts for developing CAD schemes, several methods for segmentation of the colon have been developed [28-32]. Most of the previously proposed methods use a surface-generation method for extraction of the inner surface of the colonic wall [28, 30]; this has the risk of losing a part of a polyp, in particular, the internal structure of the polyp. Moreover, most of methods rely on manually placed seed points, and thus they are semi-automatic. Only a few fully automated methods have been reported [28, 29] except for the methods disclosed in this invention.

One method used a region-growing technique to segment the colon, in which the automated selection of seed voxels was based on the use of a distance transform [29]. The method was evaluated with twenty datasets reconstructed at 1.0-2.5 mm intervals, with colonic fluid enhanced by an oral contrast agent. The colon was reportedly segmented satisfactorily, but a small amount of bowel or stomach was present in a majority of the segmentations, and the unoptimized version of the technique took sixty minutes to compute. In another method, the voxels of the CT volume are labeled by vector quantization, and the colonic walls are segmented by region-growing based on the labeled voxels [28]. The method was evaluated with 21 CTC data sets reconstructed at a one mm interval, with colonic stool and fluid enhanced by ingested contrast. The segmentation was satisfactory in fifteen data sets, but there were problems in six datasets.

Nappi et al. developed a knowledge-guided segmentation method, which is designed for fully automated extraction of the thick region encompassing the entire colon [32]. The first step of their method removes the normal structures that are not connected to the colon for extraction of colonic wall [31]. The second step applies a self-adjusting volume growing method to the colonic lumen surrounded by the colonic wall identified in the first step. Intersection of this volume-grown region and the colonic wall removes these adhering extra-colonic structures, and thus determines the final region encompassing only the colon.

SUMMARY OF THE INVENTION

Accordingly, it is an object of the present invention to provide a method, system, and computer program product for processing a set of cross-sectional images defining a volumetric region encompassing an inner surface, an outer surface, and intervening tissue of a target organ.

Another objective of the present invention is to provide a method, system, and computer program product for performing segmentation of the target organ.

Another objective of the present invention is to provide a method, system, and computer program product for detecting a set of candidate lesions based on three-dimensional geometric feature values of each voxel in a set of voxels representing a thick volumetric region encompassing a target organ.

Another objective of the present invention is to provide a method, system, and computer program product for selecting a set of true-positive lesions from the set of candidate lesions based on at least one of volumetric feature values and morphologic feature values of each candidate lesion in the set of candidate lesions.

Another objective of the present invention is to provide a method, system, and computer program product for identifying at least one three-dimensionally extended lesion from a set of voxels representing a volumetric region encompassing an inner surface, an outer surface, and intervening tissue of a target organ.

A further object is to provide an image signal representing a segmentation of a colon of a patient.

The above and other objects are achieved according to the present invention by providing a method, system, and computer program product for processing a set of cross-sectional images defining a volumetric region encompassing an inner surface, an outer surface, and intervening tissue of a target organ, comprising (1) obtaining a set of voxels representing a total scanned volume from a set of cross-sectional images of the target organ; (2) performing segmentation to extract a set of voxels representing the thick volumetric region from the set of voxels representing the total scanned volume.

According to the present invention, the method of performing segmentation comprises: (1) generating a first set of segmentation voxels by thresholding the set of voxels representing the total scanned volume with a value characteristic of the target organ; (2) performing organ-based analysis of the first set of segmentation voxels to obtain a second set of segmentation voxels; and (3) determining an intersection of the first set of segmentation voxels and the second set of segmentation voxels to obtain the set of voxels representing the volumetric region encompassing the inner surface, the outer surface, and the intervening tissue of the target organ. A system and computer program product, each configured to execute the above steps, is also provided.

According to the present invention, the method of detecting a set of candidate lesions based on geometric feature values of each voxel in the set of voxels representing the thick volumetric region comprises: (1) calculating geometric feature values for each voxel in the set of voxels representing the volumetric region; (2) generating a set of initial candidate lesions using the geometric feature values calculated in the calculating step; and (3) clustering the set of initial candidate lesions to form the set of candidate lesions. A system and computer program product, each configured to execute the above steps, is also provided.

According to the present invention, the method of selecting a set of true-positive lesions from the set of candidate lesions based on three-dimensional volumetric feature values of each lesion in the set of candidate lesions comprises: (1) calculating at least one feature value for each voxel in a set of voxels representing the set of candidate lesions; (2) calculating statistics of the at least one feature value for each lesion in the set of candidate lesions; and (3) partitioning the set of candidate lesions into a set of false-positive lesions and the set of true-positive lesions based on analysis of the statistics of the at least one feature value calculated in the preceding calculating step. A system and computer program product, each configured to execute the above steps, is also provided.

According to the present invention, the method of identifying at least one three-dimensionally extended lesion from a set of voxels representing a volumetric region encompassing an inner surface, an outer surface, and intervening tissue of a target organ, comprises: (1) detecting a set of candidate lesions based on three-dimensional geometric feature values of each voxel in the set of voxels representing the volumetric region; (2) selecting the at least one three-dimensionally extended lesion from the set of candidate lesions based on volumetric feature values of each lesion in the set of candidate lesions; and (3) outputting a set of voxels representing the at least one three-dimensionally extended lesion selected in the selecting step. A system and computer program product, each configured to execute the above steps, is also provided.

In addition, the present invention also provides an image signal representing a three-dimensional segmentation of an organ. The image signal is derived from a set of cross-sectional images of said organ and comprises: (1) a first signal portion representing an internal surface of said organ; (2) a second signal portion representing an external surface of said organ; and (3) a third signal portion representing tissue located between said internal surface and said external surface of said organ.

Further, the present invention provides an image signal representing a segmentation of an organ, wherein the image signal is formed by executing the steps of: (1) obtaining a set of cross-sectional images of said organ; (2) determining corresponding pixels on adjacent images in the set of cross-sectional images; (3) connecting said corresponding pixels to obtain a set of voxels representing a total scanned volume; and (4) extracting a set of voxels representing a three-dimensional segmentation of said organ from the set of voxels representing the total scanned volume.

An aspect of the present invention is the computation of novel three-dimensionally derived geometric features for the detection of lesions. These geometric features are employed specifically for differentiating lesions from folds and from the target organ wall, and thus they can be effective in maximizing sensitivity.

Another aspect of the present invention is the calculation of a novel three-dimensionally derived volumetric feature, directional gradient concentration, which characterizes the internal structures of lesions and folds, and is useful for reducing false positives.

Another aspect of the present invention is the combined, instead of independent, use of three-dimensionally derived volumetric features by a linear or a nonlinear classifier to reduce false positives.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 12a-12f illustrate an axial view of (a) an original CT slice, (b) the segmented colon obtained by the ABE method (cyan), (c) the segmentation of colonic lumen by volume-growing (blue), (d) the expansion of the segmented colonic lumen, (e) the intersection of the regions segmented by ABE and CBA (green), and (f) the simultaneous representation of the final complete segmentation (green) and the regions removed by the ABE step (red);

DESCRIPTION OF THE PREFERRED EMBODIMENTS

Figure 1:
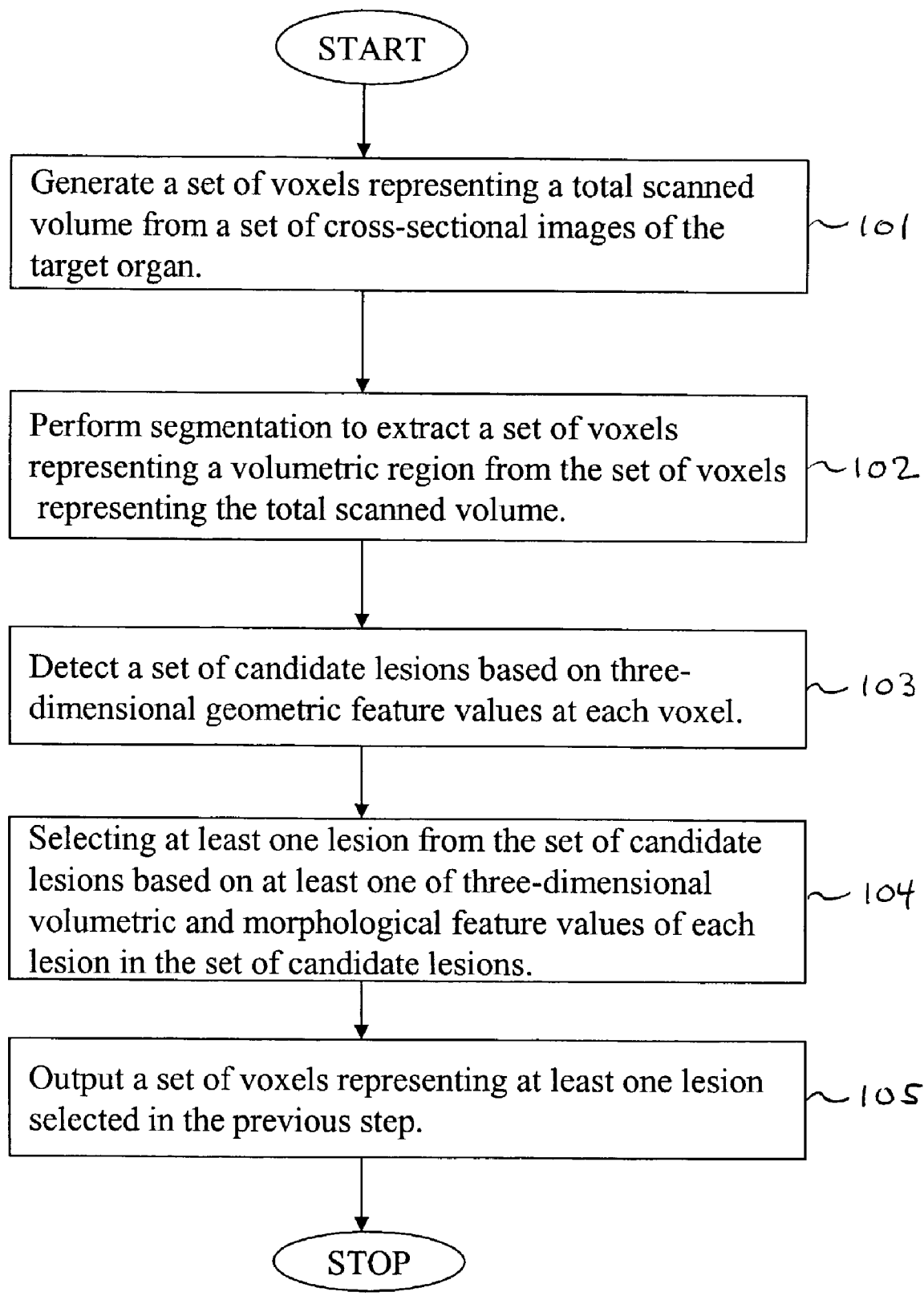
FIG. 1 is a flowchart illustrating the steps of identifying at least one three-dimensionally extended lesion within a thick volumetric region encompassing a target organ according to the present invention.

Referring now to the drawings, wherein like reference numerals designate identical or corresponding parts throughout the several views, FIG. 1 is a flowchart illustrating steps in the computer-aided detection of three-dimensionally extended lesions within a volumetric region encompassing a target organ, according to the present invention.

First, in step 101, a set of voxels representing a total scanned volume is generated from a set of cross-sectional images of the target organ. Note that in this context, we mean a "set" to include at least one member.

Next, in step 102, segmentation is performed to extract a set of voxels representing the thick volumetric region from the set of voxels representing the total scanned volume.

In step 103, a set of candidate lesions is detected based on three-dimensionally derived geometric feature values of each voxel in the set of voxels representing the thick volumetric region.

In step 104, at least one three-dimensionally extended lesion is selected from the set of candidate lesions, based on three-dimensionally derived volumetric feature values, morphologic feature values, and/or texture feature values of each lesion in the set of candidate lesions.

Finally, in step 105, a set of voxels is output representing the at least one detected three-dimensionally extended lesion.

While the method illustrated in FIG. 1 is applicable to identifying lesions in any target organ, steps 101-105 will be described in more detail below with regard to the specific method of identifying three-dimensionally extended colonic polyps. However, those skilled in the art will recognize that the following methods and structures are readily adaptable for application to other types of lesions in other organs, and that the methods are not limited only to the identification of colonic polyps. Moreover, the invention should not be limited to the specific embodiments of the individual steps of FIG. 1 disclosed below, since various modifications may be made without departing from the spirit and scope of the invention.

Typically, colonographic image data is obtained for a patient in the supine and prone positions, after insufflation of the colon with room air. In a performance evaluation study of the method of the present invention, data was obtained with a helical CT (GE CTi 9800; GE Medical Systems, Milwaukee, Wis., U.S.A) with a collimation of 5 mm, a pitch of 1.5-1.7, and a reconstruction interval of 2.5-3.5 mm. Patients were scanned in a single breath-hold followed by shallow breathing. The data sets originally consisted of 150-250 slice images in a 512×512 matrix and were interpolated linearly in the axial direction to yield isotropic volumes in 512×512×500-600 matrices. Alternatively, more slice images could be obtained, eliminating the need for interpolation. The imaging range of the data was from the diaphragm to the rectum so that the entire colon was included in the volume data.

For the purposes of this description, an image shall be defined to be a representation of a physical scene, in which the image has been generated by some imaging technology: examples of imaging technology include television or CCD cameras or X-ray, sonar or ultrasound imaging devices, CT or MRI device, etc. The initial medium on which an image is recorded could be an electronic solid-state device, a photographic film, or some other device such as a photostimulable phosphor. That recorded image could then be converted into digital form by a combination of electronic (as in the case of a CCD signal) or mechanicavoptical means (as in the case of digitizing a photographic film or digitizing the data from a photostimulable phosphor). The number of dimensions which an image could have could be one (e.g. acoustic signals), two (e.g. X-ray radiological images) or more (e.g. nuclear magnetic resonance images).

The present invention is preferably computer implemented and can be configured to accept image data either from an image acquisition device directly or from an image digitizer or from and image storage device. The image storage device can be local, e.g., associated with an image acquisition device or image digitizer, or can be remote so that upon being accessed for processing according to the present invention, the image data is transmitted via a network, for example a Picture Archiving Communications System (PACS) or other network.

Also, it should be appreciated that the source of data may be any appropriate image acquisition device such as an X-ray machine, CT apparatus, or MRI apparatus. Alternatively, the source of image data being obtained and processed may be an image storage device storing data produced by an image acquisition device. The radiographic image(s) may be digitized to produce digitized image(s) and stored in the image storage device for subsequent retrieval and processing, as may be desired by a user. However, it should be appreciated that, if the radiographic images are obtained with a direct digital imaging device, then there is no need for digitization.

The isotropic volume generated by linear interpolation will contain large amounts of anatomic structures other than the colon. To limit the search space for the polyps within the colon and to avoid generating false positives due to the extra-colonic structures, the entire colon is segmented by using a fully automated knowledge-guided technique. Specifically, a set of thick regions that encompasses the entire colon wall is extracted. Other methods attempt to extract only the surface of the colon, even semi-automatically, which risks losing a part of the polyps in the surface generation process [25, 28, 30].

Figure 2:
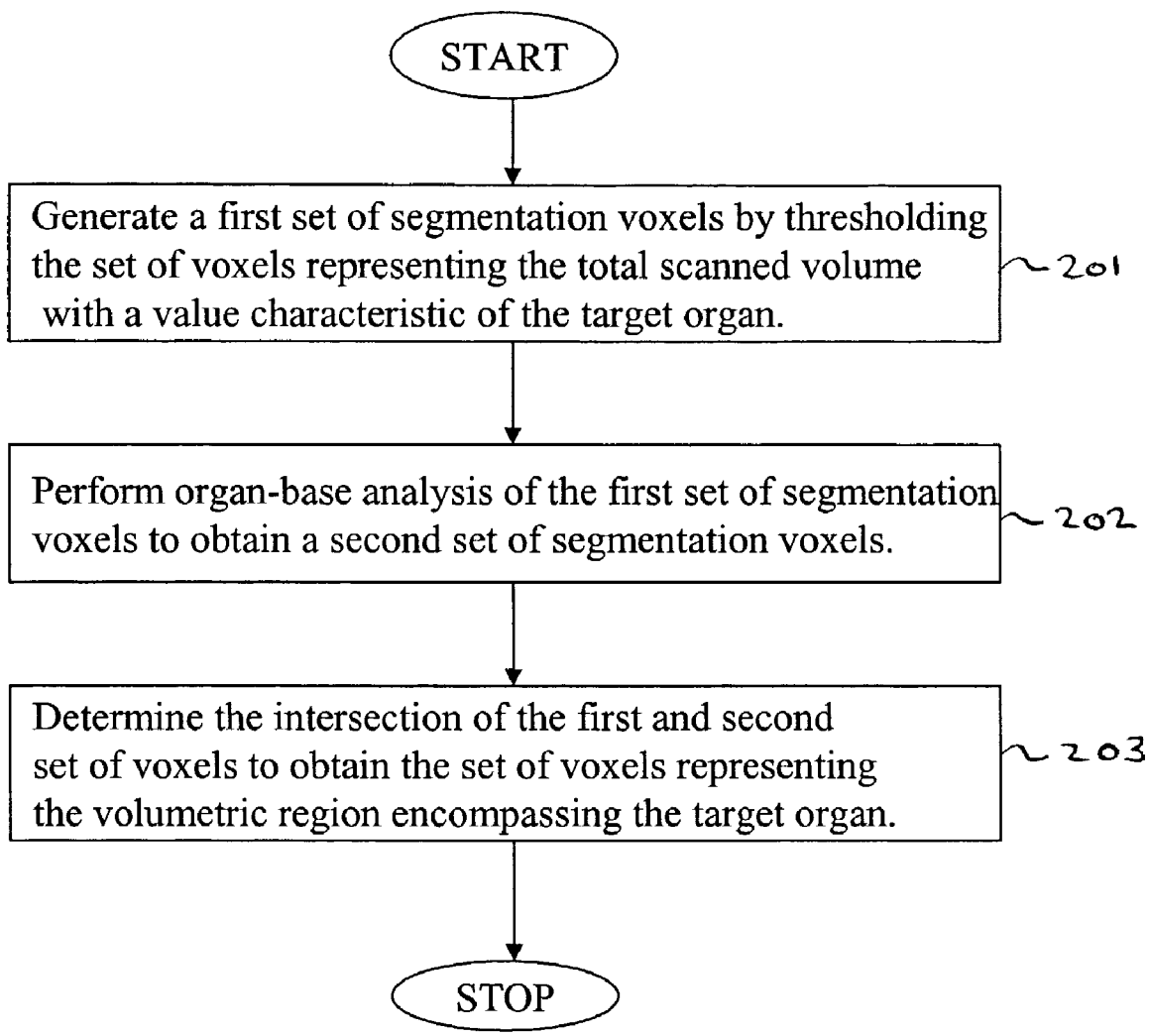
FIG. 2 is a flowchart illustrating the steps in the knowledge-guided segmentation of the target organ according to the present invention.
Figure 3A:
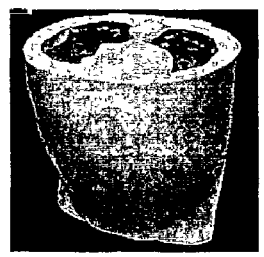
FIGS. 3a-3f illustrate colon segmentation, showing (a) the original CT volume, (b) the segmented outer air (body shown), (c) the segmented bone, (d) segmented lung bases, (e) segmentation after anatomy-based extraction, and (f) final segmentation after colon-based analysis.
Figure 3B:
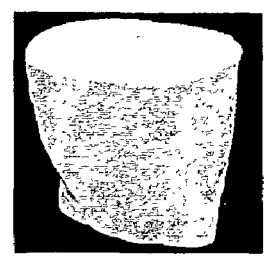
Figure 3C:
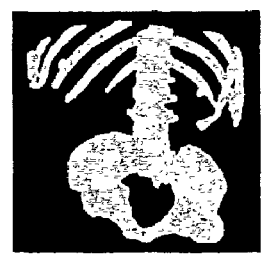
Figure 3D:
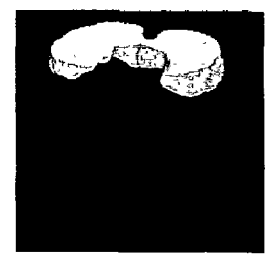
Figure 3E:
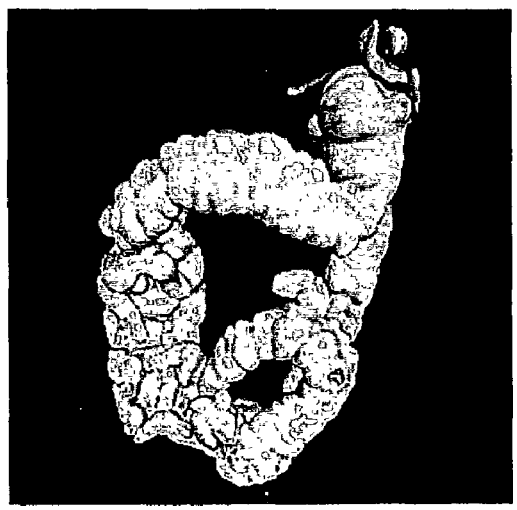
Figure 3F:
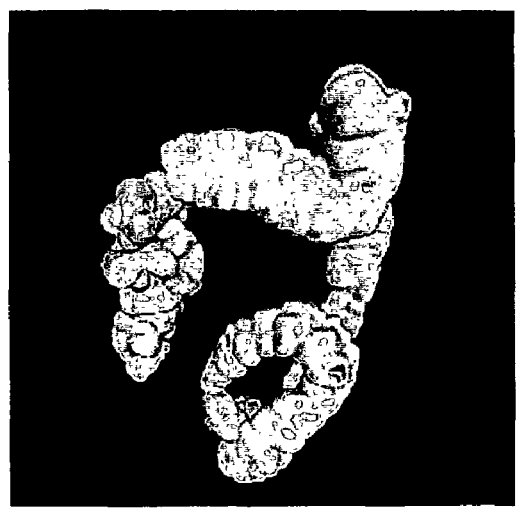

FIG. 2 is a flowchart illustrating the steps in the segmentation of the target organ according to the present invention.

In step 201, a first set of segmentation voxels is generated by thresholding the set of voxels representing the total scanned volume with a value characteristic of the target organ.

Next, in step 202, organ-based analysis of the first set of segmentation voxels is performed to obtain a second set of segmentation voxels.

Finally, in step 203, the intersection of the first set of segmentation voxels and the second set of segmentation voxels is determined to obtain the set of voxels representing the thick volumetric region.

While the method illustrated in FIG. 2 is applicable to the segmentation of any target organ, steps 201-203 will be described in more detail below with regard to the specific method of segmenting a colon. However, those skilled in the art will recognize that the following methods and structures are readily adaptable to the segmentation of other organs, and that the methods are not limited only to colonic segmentation. Moreover, the invention should not be limited to the specific embodiments of the individual steps of FIG. 2 disclosed below, since various modifications may be made without departing from the spirit and scope of the invention.

For reliable segmentation of the colonic walls, an anatomy-based extraction (ABE) method [32] (step 201) is used in which anatomical objects other than the target organ are segmented. The ABE method is an extension of the anatomy-oriented approach [31] and uses the anatomy-oriented approach for initial segmentation of the colon by removing: (1) the air surrounding the body region ("outer air"), (2) the bones, and (3) the lung base. The anatomy-oriented approach includes thresholding, region growing, connected component analysis (labeling), Gaussian smoothing, edge detection (gradient filtering), and operations of mathematical morphology [33] in three-dimensional space. The colonic walls are segmented from the remaining region by thresholding of the range of the CT and gradient magnitude values corresponding to the colonic wall. The ABE method performs an additional step that enlarges the region of the segmented colon walls by approximately 5% in special situations, such as when part of the actual is left outside the imaged volume.

These methods extract nearly all of the visible colonic walls, although the resulting volume could contain extracolonic components (ECs). In particular, the segmented region may contain a small amount of bowel that adheres to the colonic wall or that is covered by the tortuous colonic loops. Therefore, the colon-based analysis (CBA) technique (step 202) uses the ABE segmentation to produce an alternative segmentation of the colon where the ECs have been excluded. The final segmentation is obtained by intersecting of the ABE and CBA segmentations.

FIG. 3 shows a series of segmentations produced in the method of colon segmentation according to the present invention. FIGS. 3a-3d show the segments generated by the anatomy-oriented approach including (a) the original CT volume, (b) the segmented outer air (body shown), (c) the segmented bone, and (d) segmented lung bases. FIG. 3e shows a final segmentation after ABE. FIG. 3f shows a signal representing a three-dimensional segmentation of a colon obtained by a combination of the ABE and CBA segmentations, including a first signal portion representing an internal surface of the colon; a second signal portion representing an external surface of the colon; and a third signal portion representing tissue located between said internal surface and said external surface of the colon.

Figure 8A:
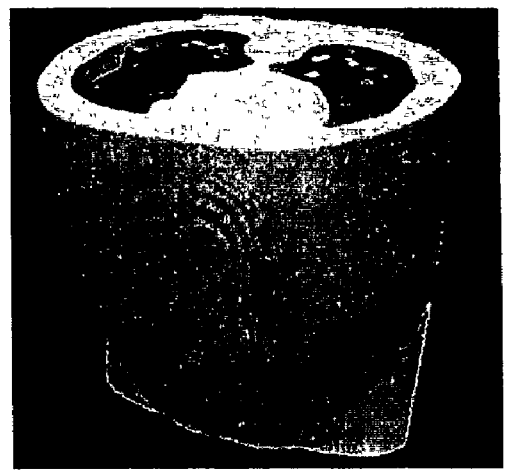
FIGS. 8a-8c are illustrations of the three-dimensional representation of (a) the original isotropic CT volume, (b) the region segmented by the ABE step, with extracolonic components colored in red, and (c) the complete segmentation in which the extracolonic components have been removed by intersecting the segmentations generated by the ABE and CBA steps.
Figure 8B:
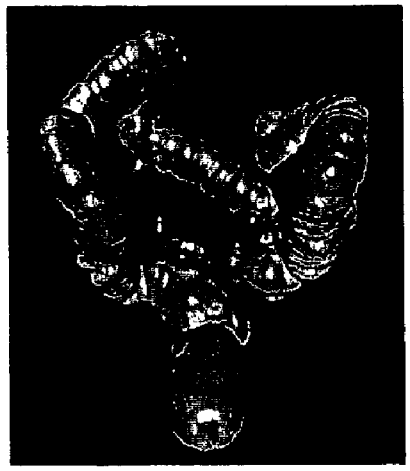
Figure 8C:
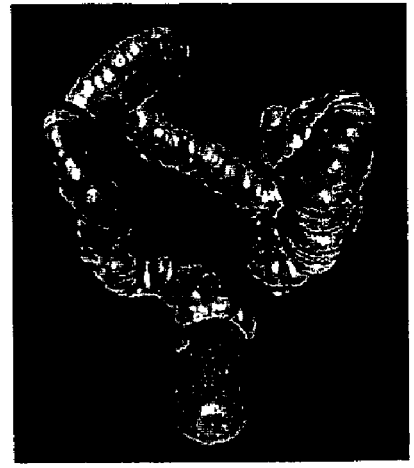

In addition, FIG. 8 is an illustration of the three-dimensional representation of (a) the original isotropic CT volume, (b) the region segmented by the ABE step, with extracolonic components colored in red, and (c) the complete segmentation in which the extracolonic components have been removed by intersecting the segmentations generated by the ABE and CBA steps.

The ABE method segments the colonic walls C with high sensitivity, but the resulting segmentation $\tilde{C}^+$ could contain redundant extra-colonic components, such as small bowel or stomach. Therefore, in the second step, the CBA removes the extra-colonic components from $\tilde{C}^+$, producing the final segmentation $\tilde{C}$.

Figure 4:
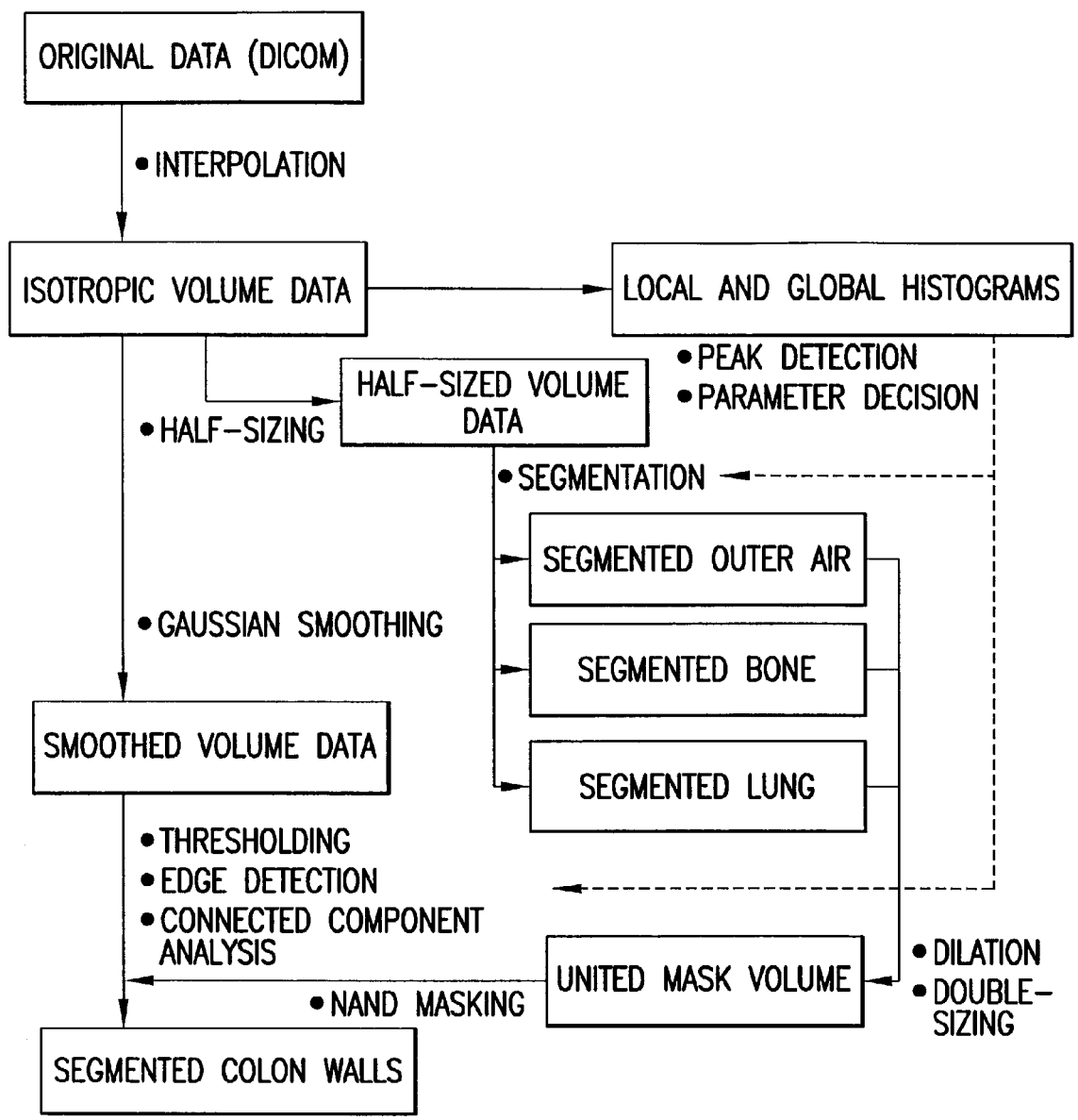
FIG. 4 is a flowchart showing the steps in the anatomy-oriented approach of the segmentation of the colon, a major componenent of the anatomy-based extraction (ABE) method.
Figure 5:
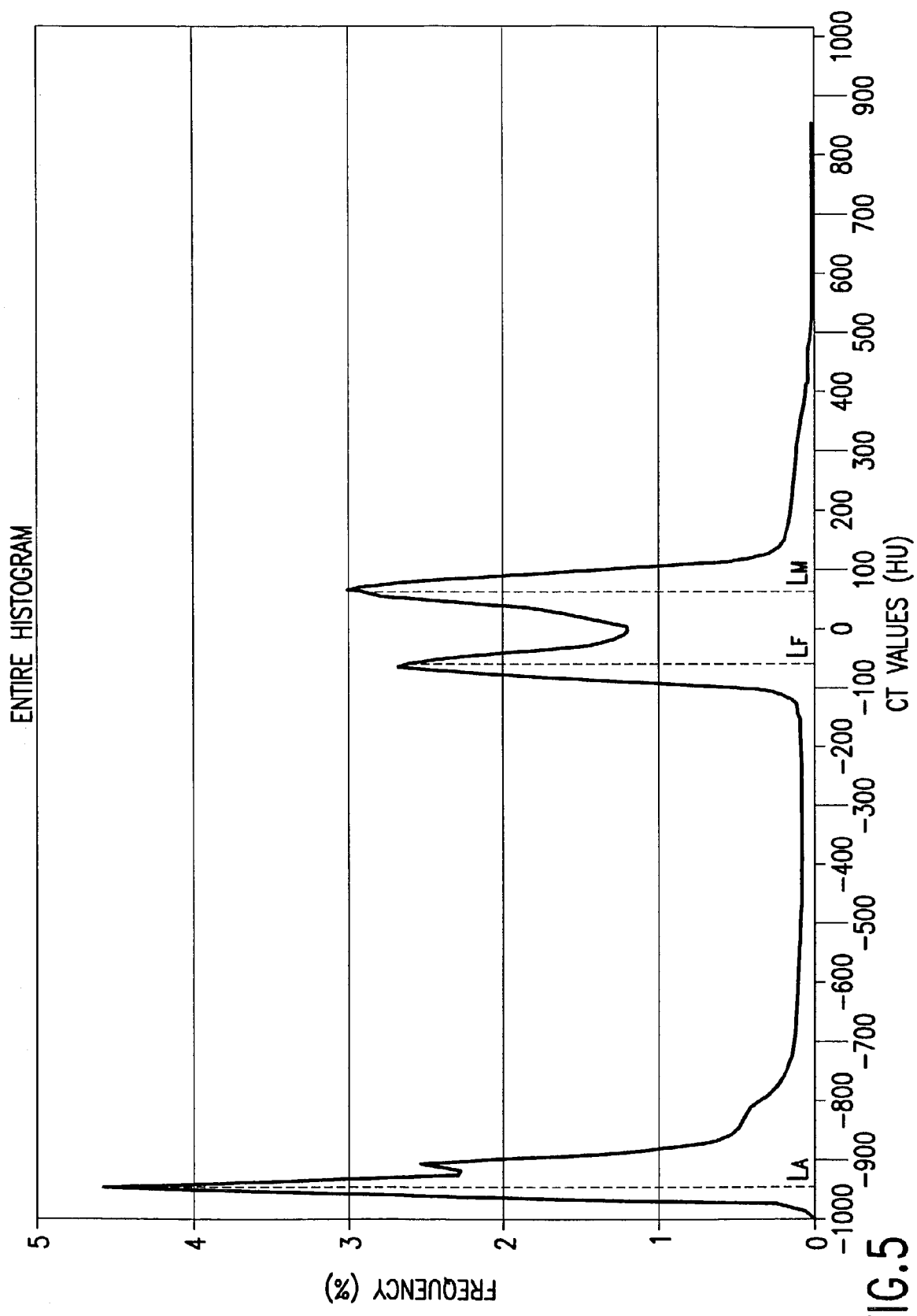
FIG. 5 shows a typical histogram of CT colonography indicating three characteristic peaks for air ($L_A$), fat ($L_F$), and muscle ($L_M$)

FIG. 4 shows the primary steps in the segmentation of the colon prior to colon-based analysis, i.e., the steps of the anatomy-oriented approach [31], which comprises a major portion of the ABE segmentation. First, global and local histograms are obtained and analyzed. A typical global histogram shows three characteristic peaks, which correspond to CT value distributions of the air (outer and inside colon), the fat, and the muscle, as shown in FIG. 5. A local histogram is obtained at the center of the top five axial slices to determine the CT intensity level of the lungs. In these two histograms, four peak levels of CT values for air, lung, fat, and muscle ($L_A$, $L_L$, $L_F$, and $L_M$, respectively), are determined by searching of local maxima the predetemined ranges. Table 1 shows the search ranges of CT values for the peak levels. These values are used for the automated determination of adaptive threshold values in the segmentation.

Figure 7:
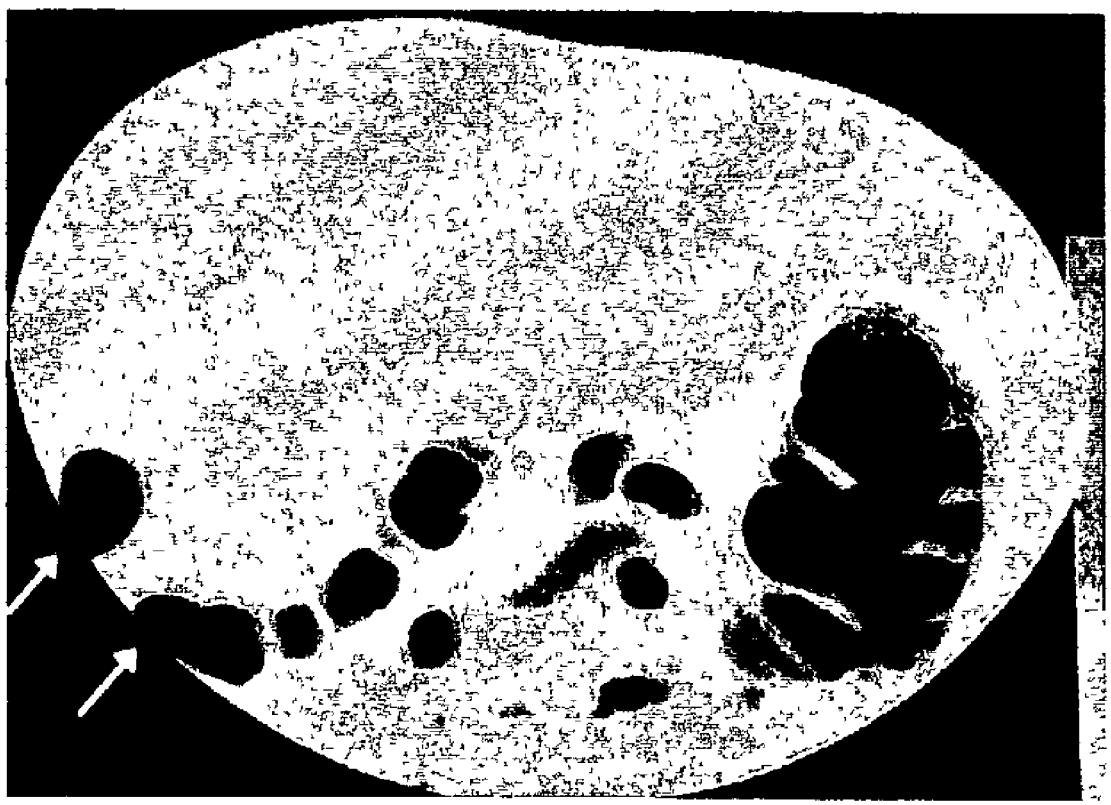
FIG. 7 illustrates an example of a case in which a secondary protocol in the anatomy-oriented approach is applied in the segmentation of the colon because the colon is clipped by the data reconstruction limit.

Let V, $R_a$, $R_b$ and $R_l$ denote the original CT volume, outer air (the air surrounding the body region), bones, and lung bases, respectively. Let $T_{CT}(\alpha,\beta)$ denote the operation of thresholding the CT value range $[\alpha,\beta]$. First, a global histogram analysis of V is performed to obtain the CT values $L_A$, $L_F$, and $L_M$ that correspond to air, fat, and muscle, respectively, as described above. Next $R_a$ is segmented by $$T_{CT}\left(-\infty, \frac{L_A + L_F}{2}\right)$$

followed by a series of morphological operations, and connected component analysis. In rare cases, colonic walls are clipped by the data reconstruction limit (a round border), owing to insufficient coverage of the in-plane imaging range (FIG. 7). In this situation, the air inside the colon is included in the segmented volume of the outer air and is removed from the volume data. Consequently, the final segmentation result of colonic walls has less volume than the expected value, and segmentation failure occurs in this method. In such cases, a secondary protocol for segmentation of the outer air is automatically launched, which uses known properties of the data reconstruction limit, such as shape and CT values. This method, however, has the possibility that small volumes of air between the body surface and the data reconstruction limit are excluded, and therefore this method is not used as the primary protocol.

Next, the bony structures such as the spine, the pelvis, and parts of the ribs are segmented for removal of voxels that have a high gradient magnitude on the boundary of the bone. The $R_b$ region is segmented from $V\backslash\tilde{R}_a$, by $$T_{CT}\left(\frac{2}{3}L_M + 100, \infty\right)$$

and connected component analysis is performed to pick up the bone structures of components that have volumes larger than the predetermined size (50 mm³).

Figure 6A:
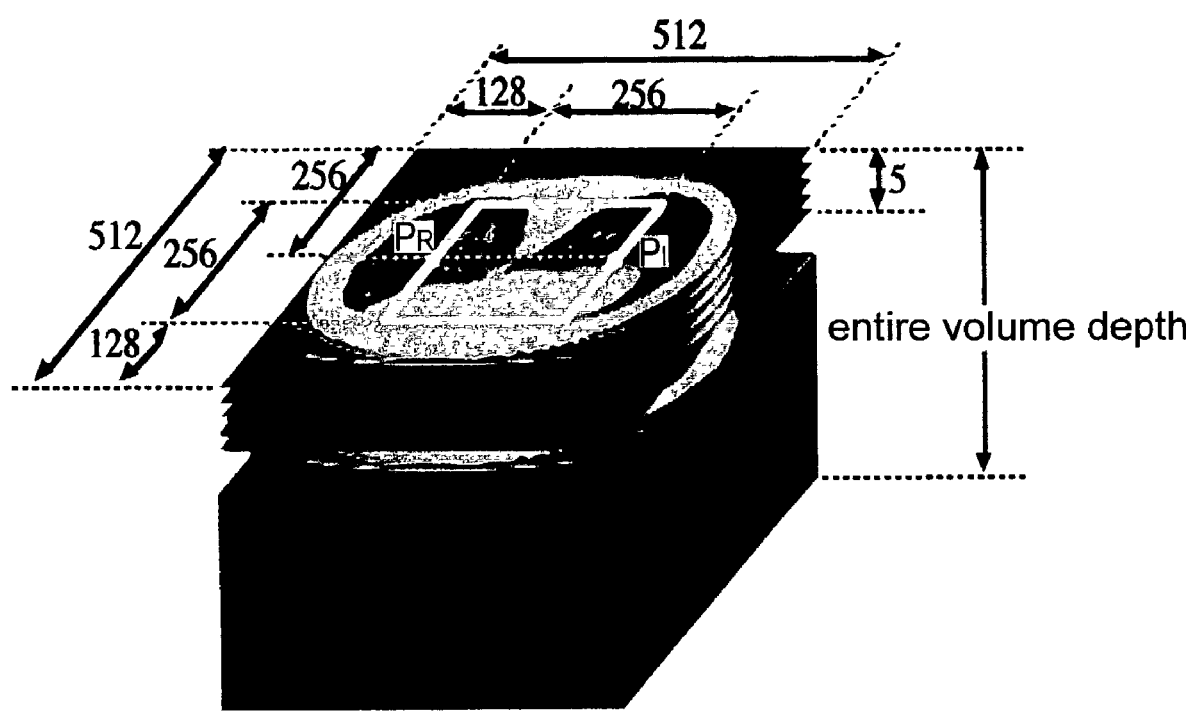
FIGS. 6a and 6b illustrate (a) a volume of interest for a local histogram acquisition of the lungs, showing the two points $P_R$ and $P_L$ used in the anatomy-oriented approach for the selection of the connected components of the lung, and (b) the local histogram showing the peak for the lungs $L_L$.
Figure 6B:
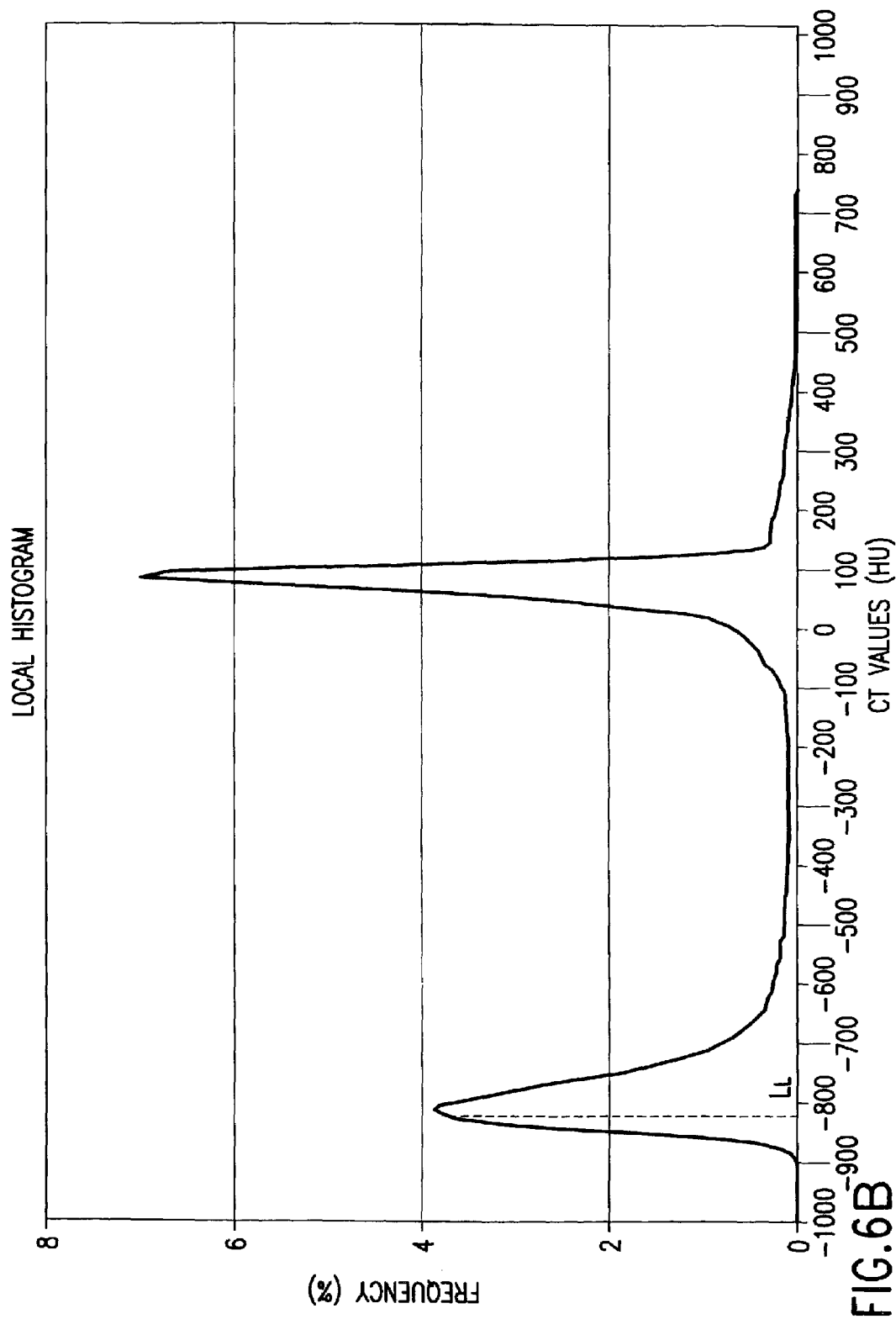

The lung bases are also segmented. It was observed that the border of the lung, including the diaphragm, was included in the segmentation result, if elimination of the lung was not performed first. This is due to the fact that colonic flexures often reach the diaphragm beneath the left lung, after insufflation. To segment $R_l$, a local histogram analysis of the top region of $V\backslash(\tilde{R}_a\cup\tilde{R}_b)$ is performed. The lung bases are segmented by $$T_{CT}\left(\frac{L_A + L_L}{2}, L_L + 150\right),$$

where $L_L$ is the peak CT value of the local lung histogram (FIG. 6). The resulting connected components that are close to the estimated location of the left and right lung bases, identified by a point $P_L$ and a point $P_R$, are removed. The coordinates of these two points were determined empirically so that the lungs in the volume data would include these points. The logical OR set of the two components is determined as the lung volume. The threshold values are determined based on the peak levels of air and lung.

These three structures ($R_a$, $R_b$, and $R_l$) are dilated by a three-dimensional morphological operation with spherical kernels to mask the boundary of the structures in the original volume for the segmentation of the colonic walls. The kernel radii for the structures are 5.0 mm for the outer air, 1.5 mm for the bone, and 8 mm for lung, which were determined according to their distance from the structure to the colon and the sharpness of the boundary of the structure. These three structures for masking are segmented in volume data with a half resolution, because they do not need precise segmentation for the purpose of masking, and doing so accelerates the process.

After Gaussian smoothing of the original data and masking of the data with the outer air, bone, and lung, the colonic walls are segmented by thresholding of the original CT value and the CT gradient magnitude. In this method, the scale (sigma) of the Gaussian function for smoothing and the threshold range for the gradient magnitude were adjusted so that the thickness of the segmented colonic walls would be 3.0-4.0 mm. The scale of the Gaussian function for smoothing was determined as 2.0 (voxels) to preserve small structures and to reduce noise.

The colon is segmented from the remaining volume $V_c=V\backslash(\tilde{R}_a\cup\tilde{R}_b\cup\tilde{R}_l)$ by intersecting the regions obtained by $T_{CT}(L_M-800, L_M-50)$ and $T_{GR}(L_M-950,\infty)$, where $T_{GR}$ denotes thresholding of the gradient magnitude. (The gradient of the CT value is first calculated at each voxel in $V_c$.)

The largest connected component can be selected as the target object of the colonic walls. However, there are some cases in which the colon is not sufficiently insufflated, and consequently the colon structure is fragmented. Therefore, the components are sorted according to their volume, and the smaller components are also added to the segmentation result in this method, if a condition is satisfied. Let $P=\{p_i\}$ be the set of the resulting connected components, and let $|p_i|$ denote the number of voxels in component $p_i$. The component $P_L \in P$, for which $|p_L| \geq |p_j|$ for all $j \neq L$, represents the principal region of the colon. Additional components are included according t to Equation 1.

$$\tilde{C}^+ = p_L \cup \{p_j; |p_j| \geq 0.01 \leq |p_L|, j \neq L, p_j \in P\}. \quad (1)$$

In addition, the thickness of the resulting segmented colonic wall is adjusted to 3.0-4.0 mm.

Figure 9A:
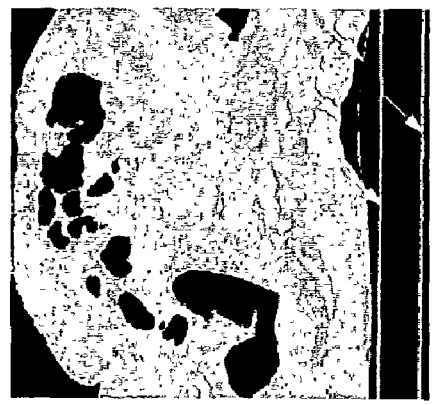
FIGS. 9a-9c are illustrations of (a) an original CT volume containing multiple outer-air objects, as indicated by arrows, (b) a secondary segmentation method which fails to remove part of the outer-air objects, leaving redundant components indicated by arrows, and (c) the preferred anatomy-based extraction method which removes the outer-air region completely.
Figure 9B:
Figure 9C:
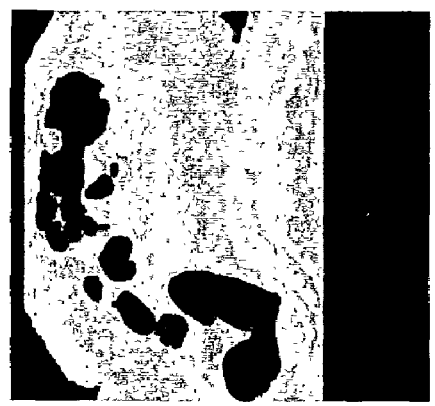
Figure 10A:
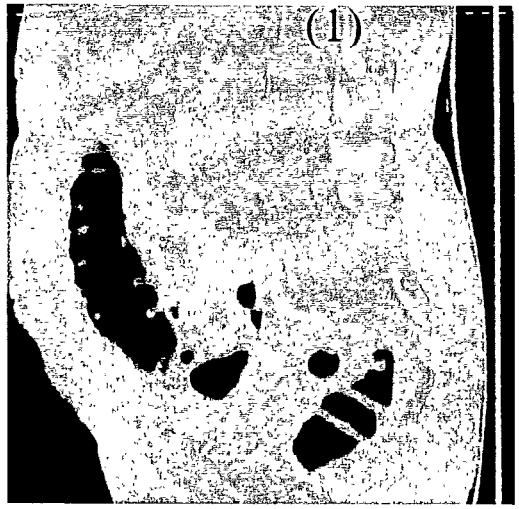
FIGS. 10a-10d are illustrations of the removal of the dorsal body region (which does not contain the colon) by the determination of the spatial location of the spine at the top five axial slices of the segmented bone region, as indicated by label (1)
Figure 10B:
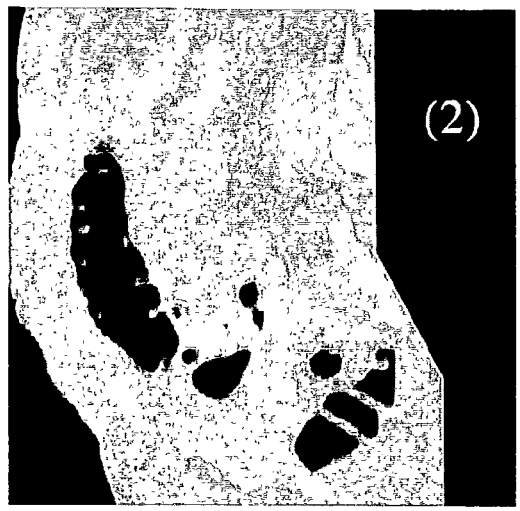
Figure 10C:
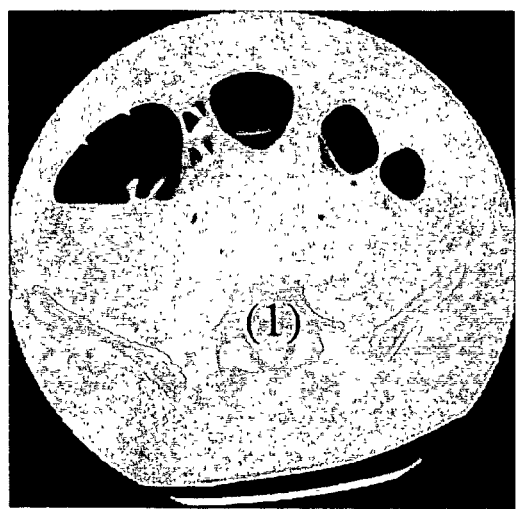
Figure 10D:
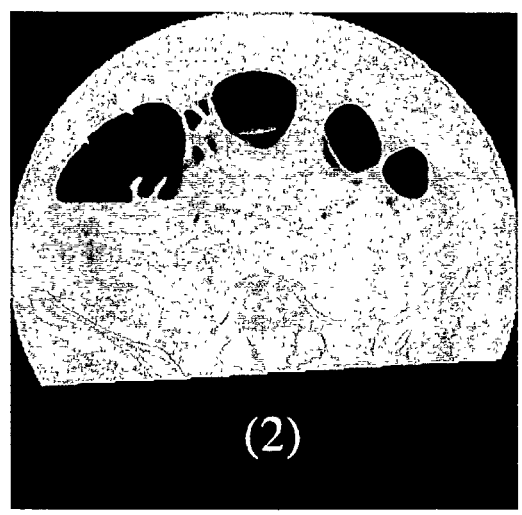

If the segmentation of the outer-air region was incomplete, a part of the underlying table or skin-line could appear within the segmented colon (FIG. 9). Therefore, the ABE technique includes three steps, in addition to the anatomy-oriented approach, for the outer-air segmentation process. The first step inverts the original outer-air segmentation obtained by the anatomy-oriented approach, and removes all but the largest resulting connected component, which is the body region. The second step fills the air gaps at the surface of the segmented outer air by volume-growing. Third, after the osceous structures have been identified, the body region dorsal to the spine is removed (FIG. 10).

Figure 11:
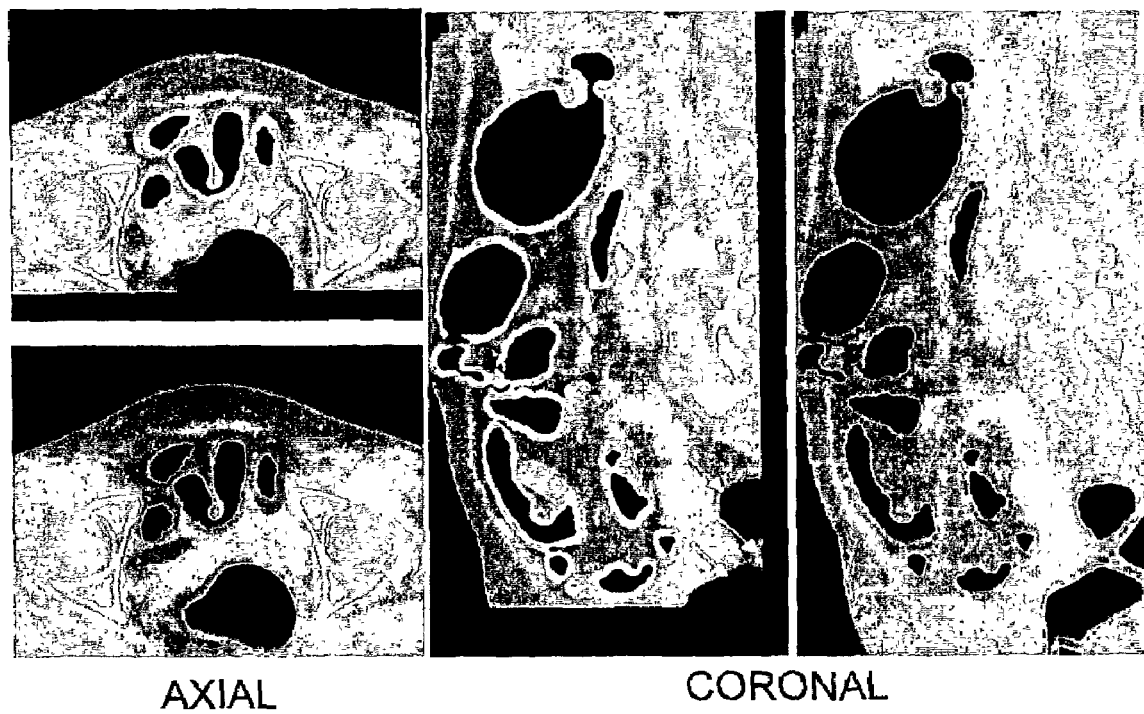
FIG. 11 is an illustration of a secondary segmentation method (yellow) that could exclude small disconnected regions of the colon such as the rectum (arrow), while the preferred ABE step (cyan) includes the rectum correctly in the segmented region and produces a larger volume of interest to cover the entire colon.

Another feature of ABE, in addition to the anatomy-oriented approach, is the minimization of the amount of colonic wall that is excluded from the segmented colon. By default, the anatomy-oriented approach defines the segmented colon as the largest connected component obtained after thresholding for the colonic walls. In the anatomy-oriented approach, smaller components are included only if their size exceeds $R_{fc}=25\%$ of the size of the largest component. This approach reduces the amount of ECs, but it could also exclude a small disconnected part of the colon, typically the rectum (FIG. 11). Therefore, in the ABE method, $R_{fc}=1\%$. Although this increases the amount of ECs in the segmented region, the application of the CBA step should remove such components.

The CBA method uses the segmented colon obtained by the ABE as a guide for volume-growing within the colonic lumen. Because ECs are generally not connected directly to the colonic lumen, they are expected to be excluded by the CBA segmentation process. Schematically, ABE segmentation is an "outside-to-inside" segmentation, whereas CBA is an "inside-to-outside" segmentation. The ECs that are not included in the CBA segmentation are also excluded from the intersection.

Note however that the thresholding operation for segmenting the colonic wall and ECs in the above ABE step may alternatively be accomplished by using other methods such as a region-growing method [33], image labeling [34], Markov Random Field [35], mathematical morphology [36], and other image segmentation methods such as those described in [37] recognizable by those skilled in the art.

The application of the CBA method is complicated by the potential presence of completely collapsed regions in the colon. This causes two problems. First, collapsed regions may prevent the volume-growing process from progressing through the entire colonic lumen. Second, the method may need to assign multiple seeds, i.e., voxels, which determine the starting point of the volume-growing process. Because the method is fully automated, it requires (1) an automated assignment of multiple seeds, and (2) criteria to check whether the CBA segmentation is complete.

Once a seed has been determined, the application of the volume-growing technique is relatively simple. At each iteration, unvisited voxels that are 26-connected to the currently segmented region will be added to the segmented region, if they are not part of the ABE segmentation (FIG. 12a-b), and have CT and gradient magnitude values below those of the colonic wall. The process terminates when the number of voxels added to the segmented region decreases by more than 75% from the previous iteration or decreases by more than a predetermined number. These conditions are expected to produce a segmentation of the colonic lumen that does not extend into the colonic wall nor protrude beyond small openings within the colonic wall.

The segmentation provided by the ABE is of the form shown in Equation (2), $$\tilde{C}^+ = (C \backslash c) \cup E' \quad (2)$$

where C represents the actual colonic walls, $c \subset C$ is the part of C not segmented by the ABE, and E' represents extracolonic components. For polyp detection, one may assume that $c = \phi$, because, according to observations, the portions of the colon not segmented by the ABE reside within completely collapsed locations that are not of diagnostic quality. On the other hand, up to 20% of the false-positive polyp findings were found to originate from E'. Therefore, to minimize E', the CBA method was developed, which essentially implements a self-adjusting volume-growing scheme to segment the air within the colonic lumen. Let $\tilde{C}^-$ denote the segmentation produced by the CBA method. The final segmentation of the colon is obtained by Equation (3).

$$\tilde{C} = \tilde{C}^+ \cap \tilde{C}^- \quad (3)$$

The seed points of the volume-growing step are detected automatically from $\tilde{C}^+$. The first seed is chosen from within the rectum, because this part of the colon can be located most reliably. First, a volume-of-interest $V_R$ is extracted from the 4 cm bottom region of V. Let $R_{C+} = V_R \cap \tilde{C}^+$. Then $R_{C+}$ divides $(\neg RC+) \cap V_R$ into two disconnected components: the colonic lumen and the region outside the colon. The rectum is identified as the second largest connected component within $(\neg RC+) \cap V_R$.

The volume-growing step may need to be continued if the complete colon was not segmented (the conditions are described below). Let $r_i$ denote the region that was segmented by the most recent volume-growing step. The updated CBA-segmentation is $\tilde{C}^- = r'_i \cup \tilde{C}^-$, where $r'_i$ represents $r_i$ expanded to cover $\tilde{C}^+$ within the local neighborhood of $r_i$. Then, if $\tilde{C}$ obtained from Eq. (3) is considered incomplete, the volume-growing process is continued by choosing a seed point from within the largest unsegmented air-filled region.

All seeds used for volume-growing must have CT values corresponding to the air, and they may not be located within previously identified ECs (outer air, bones, lungs). The ABE segmentation is used to guide the process of locating the seeds.

Figure 13A:
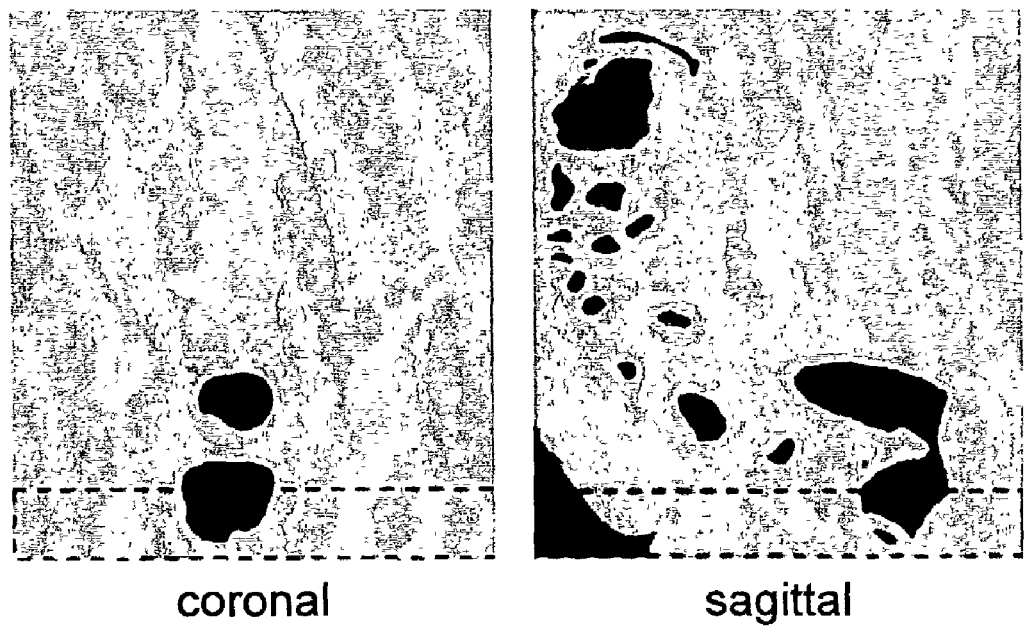
FIGS. 13a and 13b illustrate (a) coronal and sagittal views of a CT volume, with the first 50 caudal slices defining a volume of interest (dotted box) to locate the rectum, (b) coronal and sagittal views of the volume of interest covering the rectum (top row), inverted mask with the rectum marked by "R" (middle row, and the final segmented rectum with "s" indicating the potential location of a seed voxel (bottom row)
Figure 13B:
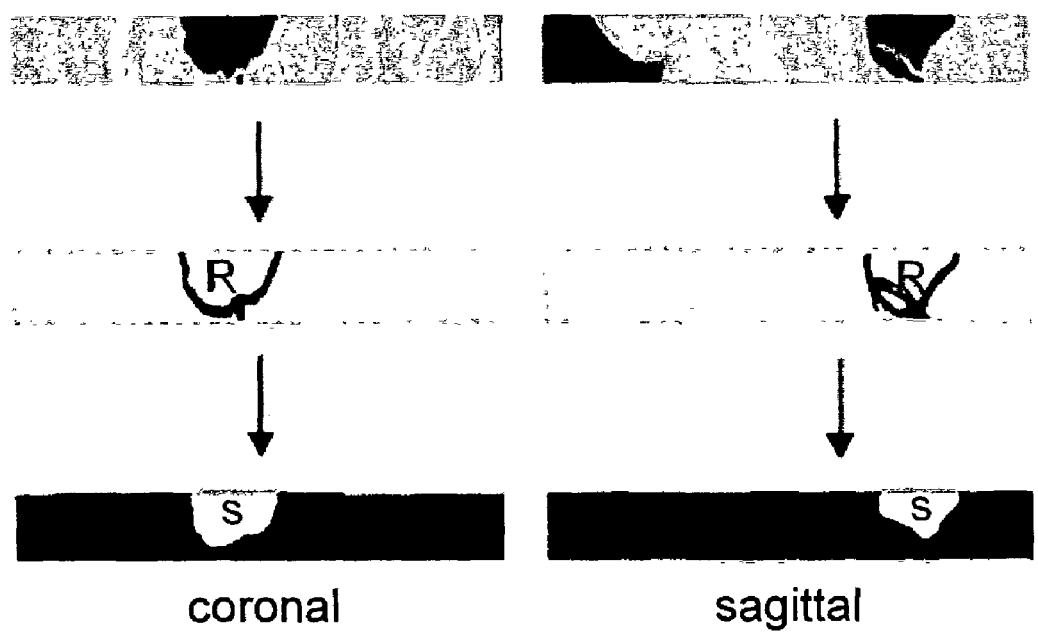
Figure 14A:
FIGS. 14a-14f are illustrations of the conditions for selecting an air seed (invalid region is colored red, arrows show potential sites in (f)), indicating that the air seed must (a) not be within the ABE segmentation, (b) not be within previously identified extracolonic components, (c) have a CT value not exceeding 900 Hounsfield units, (d) not be within the present CBA segmentation, and (e) not be close to the boundary of the surrounding CT volume.
Figure 14B:
Figure 14C:
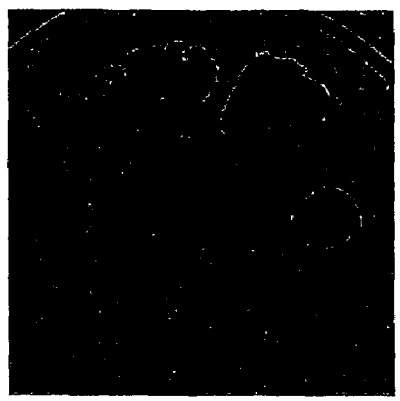
Figure 14D:
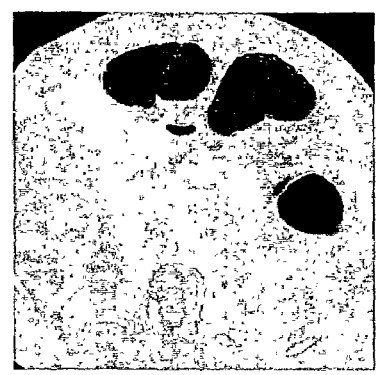
Figure 14E:
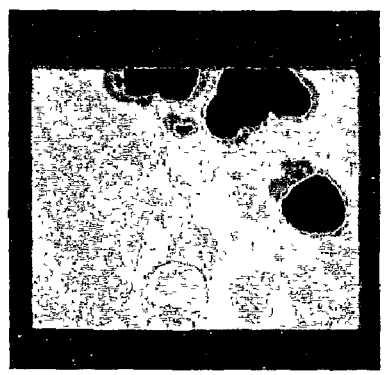
Figure 14F:
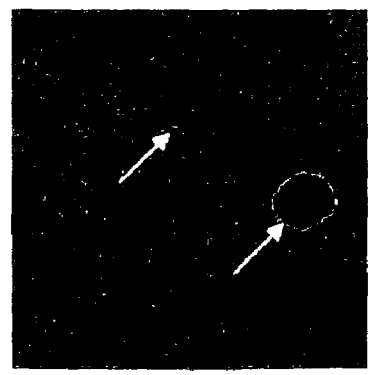

The first seed is set at the rectum, because the location of the rectum can be estimated quite reliably. It is located within the center region of the bottom part of the entire CT volume. The method of setting a seed is reliable; because few ECs are located within this region, the likelihood that the seed would be located within an EC, instead of the rectum, is small. The rectum is located by extracting a volume of interest (VOI) that is defined by the bottom fifty axial slices (FIG. 13a). When the region segmented by ABE within this VOI, is inverted, at least two connected components are obtained. The largest component represents the region outside the colon, and the second largest component should represent the air inside the colon which was set as a seed (FIG. 13b).

If the use of the first seed does not result in a satisfactory segmentation, the next seed is chosen by shifting of the VOI upward by twenty-five slices and repeating the procedure described above. This could happen when the first volume-growing fails due to a collapsed region between the rectum and sigmoid colon.

Additional seeds, if needed, are chosen from a set of air-seeds. The initial set of potential air-seeds is defined by dilating the ABE segmentation. A valid air-seed must then satisfy five conditions (FIGS. 14a-e) that check whether the voxel is located within the unvisited colonic lumen. The five conditions are that (1) the air-seed must not be within the ABE segmentation, (2) the air-seed must not be within previously identified extracolonic components, (3) the CT value of the air-seed may not exceed 900 Hounsfield units, (4) the air-seed must not be within the present CBA segmentation, and (5) the air-seed must not be close to the boundary of the surrounding CT volume. The valid air-seeds are then subjected to connected-component analysis. As the volume-growing continues, each new seed is returned from the largest available connected air-seed component. The seeds that have been used for the segmentation are no longer available as new seeds.

The final segmentation of the colon is obtained by intersecting the segmented regions obtained by the ABE and CBA methods to remove redundant segmentation. It is therefore necessary to have the CBA segmentation cover the surrounding colonic wall, as determined by the ABE segmentation. This is accomplished in two steps. First, several surface layers are added to the CBA segmentation, until the outermost layer intersects with more than 95% of the ABE surface (FIG. 12c). Second, new surface layers are added to the CBA segmentation, until less than 25% of the outermost layer intersects with the ABE segmentation (FIGS. 12d-f).

To reduce the computation time and memory usage, the CBA technique may downsample the CT volumes by a factor of two. However, the very last step of determining the final colonic wall is performed in full resolution, because fine precision is necessary for obtaining a satisfactory match between the CBA and ABE segmentations.

Figure 15A:
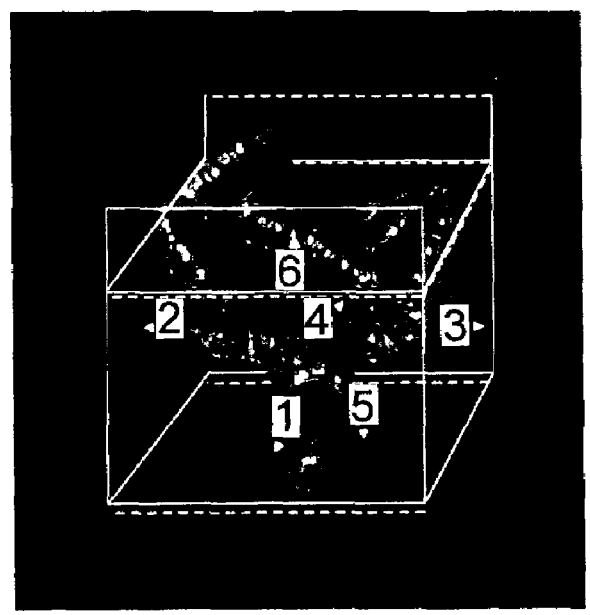
FIGS. 15a and 15b illustrate (a) a volume of interest (solid white box) formed by removing the top 25% and bottom 5% slices (dotted white boxes) and divided into six zones which the segmented colon should visit, and (b) examples of the contents of four of the zones.
Figure 15B:
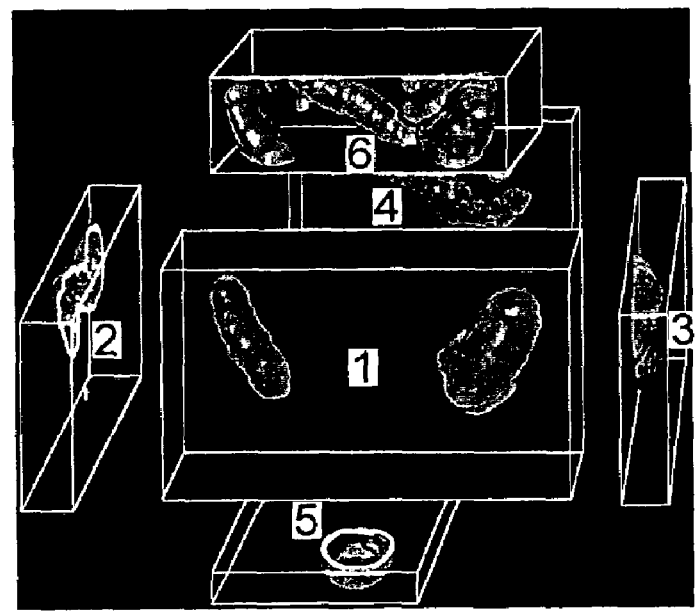
Figure 16A:
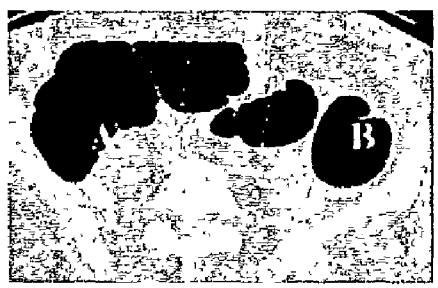
FIGS. 16a and 16b are illustrations of the conditions that the complete segmentation of the colon should satisfy, including (a) checking whether the ascending and descending colon are present by comparing the number of segmented voxels in the sectors labeled "A" and "B", and (b) testing for the presence of the sigmoid colon by checking whether at least 100 mm³ of voxels have been segmented within the region indicated by the dotted box.
Figure 16A:
Figure 16A:
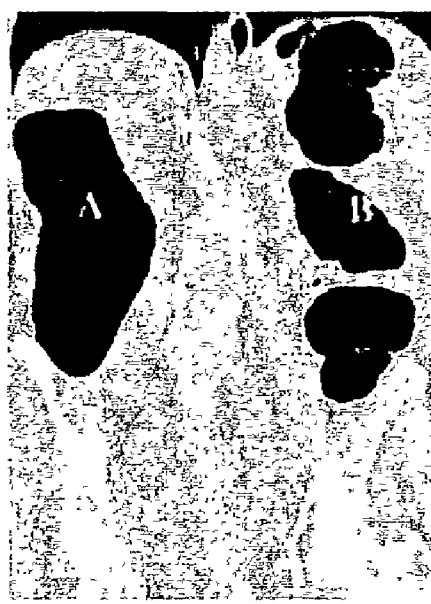
Figure 16B:

Several conditions are used to test if $\tilde{C}$ represents a complete colon. If some of the conditions are not satisfied, the CBA volume-growing process can be invoked to add new components to the segmentation. First, no more than 50% of the ABE segmentation may be removed by the CBA method, i.e., the number of voxels removed from $\tilde{C}^+$ is limited according to $\tilde{C}_A=(|\tilde{C}^+|-|\tilde{C}|)/|\tilde{C}^+|>0.50$. Second, the symmetry between the ascending and descending colon ($C_a$ and $C_d$) is tested by checking that the number of segmented voxels between the expected locations of $C_a$ and $C_d$ differs less than 20% (FIG. 16a). The third condition tests for the presence of segmented colon within the expected location of the rectum. The fourth condition checks that the colon represented by $\tilde{C}$ passes within an offset of 10-25% from the boundary of the bounding box of $\tilde{C}^+$ (FIG. 15). The fifth condition tests if there are very large air-filled compartments that have not been segmented. The size of the largest air-seed component may not exceed 250,000 mm³. The sixth condition terminates the segmentation process if $\tilde{C}_A>0.95$. Finally, a region at least 100 mm³ in size should be segmented from the expected region of the sigmoid colon (FIG. 16b).

Figure 17:
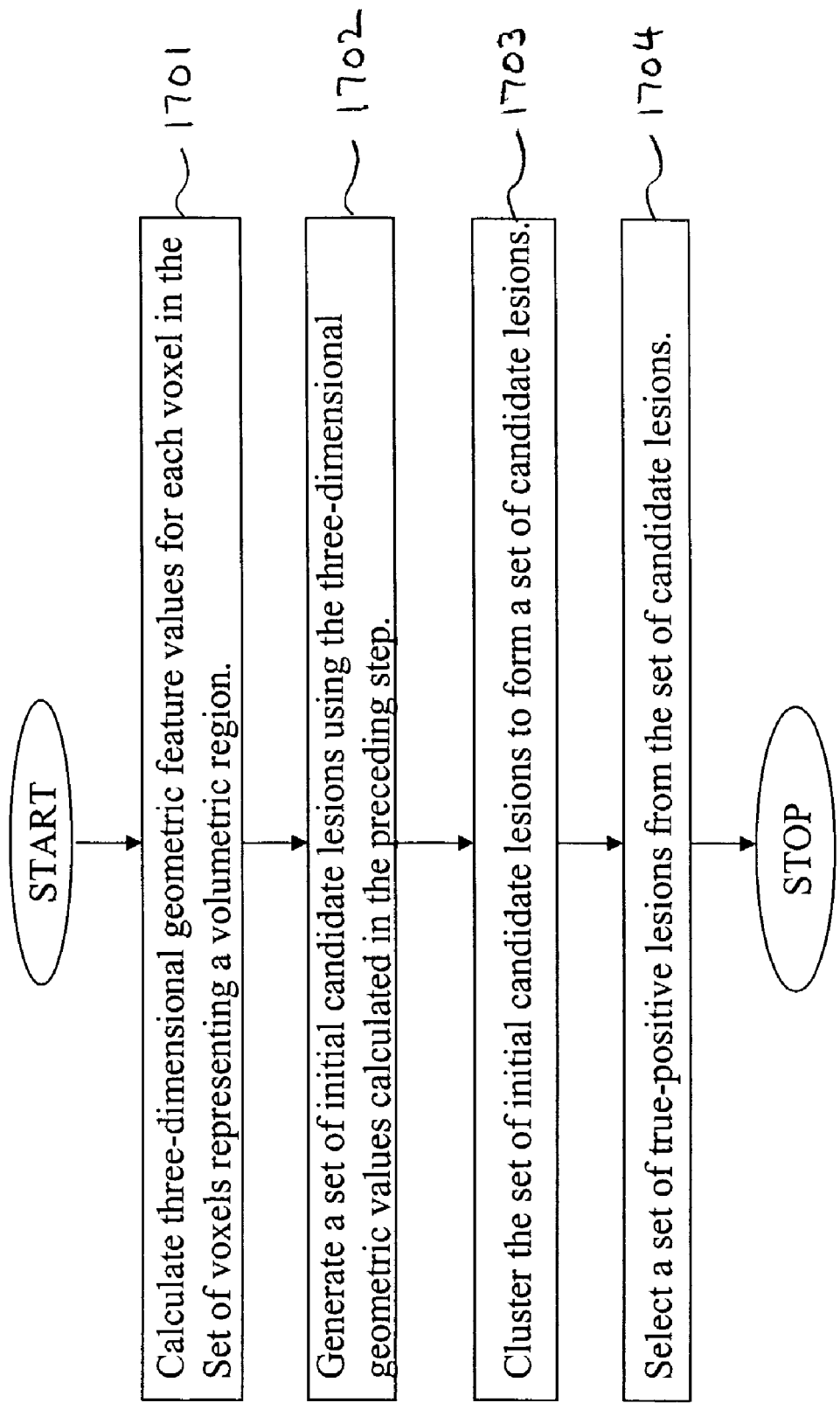
FIG. 17 is a flowchart illustrating the steps of detecting a set of candidate lesions based on geometric feature values and selecting at least one lesion from the set of candidate lesions based on volumetric, morphologic, and/or texture feature statistics according to the present invention.

FIG. 17 is a flowchart illustrating the steps of detecting a set of candidate lesions based on geometric feature values, and selecting at least one lesion from the set of candidate lesions based on volumetric, morphologic and/or texture feature statistics according to the present invention.

First, in step 1701, the volumetric region encompassing the target organ extracted in the previous step is smoothed to generate volumetric regions at multiple scales, and then three-dimensionally derived geometric feature values are calculated, for each voxel in the set of voxels representing the volumetric region, on at least one scale. This step includes determining a volumetric shape index and a volumetric curvedness value for each voxel in the set of voxels representing the volumetric region.

Next, in step 1702, a set of initial candidate lesions is generated using the three-dimensionally derived geometric feature values computed in step 1701. This step includes identifying a set of seed voxels having a volumetric shape index value in a first predefined range and a volumetric curvedness value in a second predefined range, determining a grow region of spatially connected voxels adjacent to a seed voxel in the set of seed voxels, and applying conditional morphological dilation to the grow region to obtain an enhanced grow region.

In step 1703, the set of initial candidate lesions generated in step 1702 is clustered to form the set of candidate lesions.

Finally, in step 1704, a set of true lesions (true-positive lesions) is selected from the set of candidate lesions formed in step 1703.

While the method illustrated in FIG. 17 is applicable to detecting a set of candidate lesions in any target organ, steps 1701-1704 will be described in more detail below with regard to the specific method of detecting a set of candidate polyps in a colon. However, those skilled in the art will recognize that the following methods and structures are readily adaptable to detecting a set of candidate lesions in other organs, and that the methods are not limited only to detecting a set of candidate colonic polyps. Moreover, the invention should not be limited to the specific embodiments of the individual steps of FIG. 17 disclosed below, since various modifications may be made without departing from the spirit and scope of the invention.

Steps 1701-1704 will be described in more detail below with regard to the specific steps of detecting a set of candidate colonic polyps and selecting true-positive colonic polyps from the candidate set.

Polyp candidates are detected in the segmented colon $\tilde{C}$ by (1) smoothing the volumetric region encompassing the colon extracted in the knowledge-guided segmentation step to generate volumetric regions at multiple scales, (2) computing three-dimensionally derived geometric features characterizing polyps, for each voxel in the set of voxels representing the volumetric region, on at least one scale, (3) segmenting connected components corresponding to polyps, and (4) clustering these connected components to generate polyp candidates.

In step 1701, the volumetric region encompassing the colon extracted in the knowledge-guided segmentation step is first smoothed by Gaussian filters with various kernel sizes to generate volumetric regions at multiple scales. Note that the smoothing, and thus the generation of multiscale volumetric regions, can be accomplished by other types of smoothing filters, such as those described in [55], recognizable by those skilled in the art. Then, to characterize polyps, two three-dimensionally derived geometric features, the volumetric shape index and volumetric curvedness [38, 39], are computed at each voxel in $\tilde{C}$ at a given scale. The volumetric shape index characterizes the topological shape of the volume in the vicinity of a voxel (Eq. (23)), whereas the volumetric curvedness represents the size of the polyp or the magnitude of the effective curvature (Eq. (24)). Both quantities are defined based on the notion of curvature. Therefore, the definition and the computational method of curvature are described briefly in the following.

Curvature is a local property attached to points on a surface. Let h(p) denote the CT value at a point (voxel) p=(x, y, z). Then an iso-surface P at the level (CT value) of a in a three-dimensional space $R^3$ is given by $$P=\{p=(x,y,z)\epsilon R^3;\ h(p)=a\}. \tag{4}$$

At each point p, there exists a small neighborhood U of p in which z can be expressed by a function $\phi$ of x and y. By denoting (x, y)=(u, v) in this neighborhood, the iso-surface P can be represented as $$P(u,v)=\{(u,v)\epsilon IR^2; h(u,v,\phi)(u,v))=a\}. \tag{5}$$

Let us denote the partial derivatives of P in terms of u and v as follows:

$$P_u \equiv \frac{\partial(u,v)}{\partial u},\ P_v \equiv \frac{\partial P(u,v)}{\partial v}, \tag{6}$$

$$P_{uu} \equiv \frac{\partial^2 P(u,v)}{\partial^2 u},\ P_{uv} \equiv \frac{\partial^2 P(u,v)}{\partial u \partial v},\ P_{vv} \equiv \frac{\partial^2 P(u,v)}{\partial^2 v} \tag{7}$$

Using these notations, a vector parallel to the normal vector to the surface is defined as shown in Equation (8), $$Q \equiv \frac{P_u \times P_v}{\|P_u \times P_v\|}, \tag{8}$$

where X denotes the outer product of two vectors, and ‖·‖ denotes a norm. With these notations, the first fundamental forms [40] are defined as $$E=P_u \cdot P_u,\ F=P_u \cdot P_v,\ G=P_v \cdot P_v. \tag{9}$$

Also, the second fundamental forms [40] are defined as $$L=P_{uu} \cdot Q,\ M=P_{uv} \cdot Q,\ N=P_{vv} \cdot Q. \tag{10}$$

Because one is interested in calculating the curvature information at a voxel p without explicitly generating an iso-surface, the first and second fundamental forms are calculated directly from the isotropic volume as follows [41]. By the use of implicit differentiation $$E = 1 + h_x^2/h_z^2 \quad (11)$$

$$F = 1 + h_x h_y/h_z^2 \quad (12)$$

$$G = 1 + h_y^2/h_z^2 \quad (13)$$

$$M = (h_x h_z h_{yz} - h_y h_z h_{xz} - h_x h_y h_{zz} - h_z^2 h_{xy})/R \quad (14)$$

and the chain rule, one can obtain $P_u = \partial P/\partial u = (1, 0, \partial\phi/\partial u) = (1, 0, -h_x/h_z)$. Substituting similar expressions for $P_v$, $P_{uu}$, $P_{uv}$, and $P_{vv}$ into Eqs. (7)-(10), one obtains Equations 11-17.

$$L = (2h_y h_z h_{yz} - h_y^2 h_{zz} - h_z^2 h_{yy})/R \quad (15)$$

Then the principal curvatures $k_1$ and $k_2$ [40, 42] are defined as in Equation 18. Here H and K $$L = (2h_x h_z h_{xz} - h_x^2 h_{zz} - h_z^2 h_{xx})/R, \quad (16)$$

$$R \equiv h_z^3 \sqrt{h/h_z^2}, k \equiv \sum_{i=x,y,z} h_i^2 \quad (17)$$

$$k_1 = H + \sqrt{H^2 - K}, k_2 = H - \sqrt{H^2 - K} \quad (18)$$

$$K \equiv \frac{LN - M^2}{EG - F^2} \quad (19)$$

$$= \frac{1}{k^2} \sum_{(i,j,k) = \wp(x,y,z)} \{h_i^2(h_{jj} - h_{jk}^2) + 2h_j h_k(h_{ik} h_{ij} - h_{ii} h_{ji})\} \quad (20)$$

$$H \equiv \frac{EN - 2FM + GL}{2(EG - F^2)} \quad (21)$$

$$= \frac{1}{k^{3/2}} \sum_{(i,j,k) = \wp(x,y,z)} \{h_i^2(h_{jj} + h_{kk}) - 2h_j h_k h_{jk}\} \quad (22)$$

$$SI(p) \equiv \frac{1}{2} - \frac{1}{\pi} \arctan \frac{k_1 + k_2}{k_1 - k_2} \quad (23)$$

$$CV(p) \equiv \sqrt{(k_1^2 + k_2^2)/2} \quad (24)$$

are the Gaussian curvature and mean curvature, respectively. Here, $\wp(x, y, z)$ is a permutation of $(x, y, z)$, i.e., $\wp(x, y, z) - \{(x, y, z), (y, z, x), (z, x, y)\}$.

Figure 18:
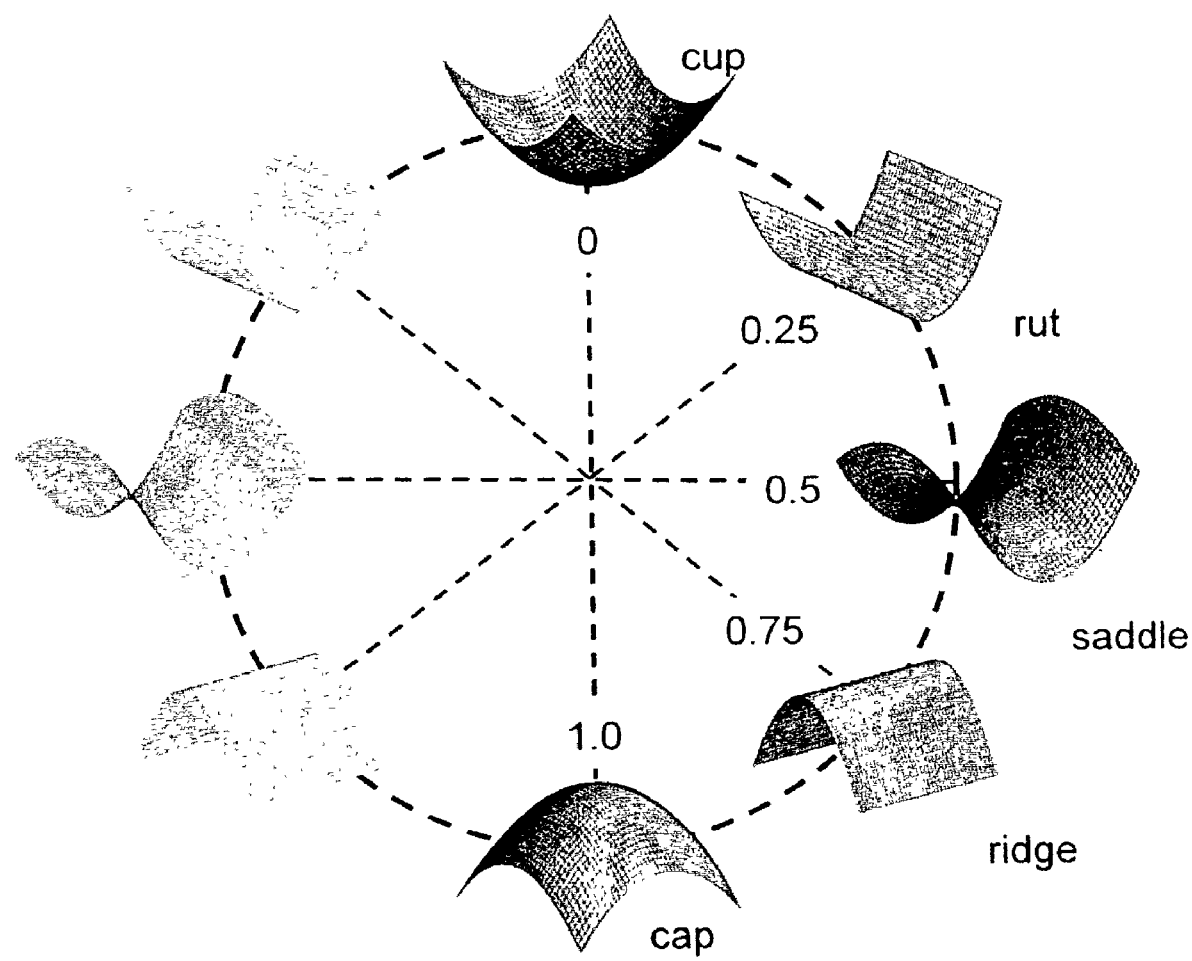
FIG. 18 is an illustration of the relationship of representative shapes to the volumetric shape index values.
Figure 19A:
FIGS. 19a-19f are illustrations of the effect of the volumetric shape index in differentiating between polyps, folds, and lumen, showing axial images with polyps in the boxes ((a) and (d)), polyps indicated by arrows ((b) and (e)), and three-dimensional endoluminal views of the polyps shown in (b) and (e) colored by volumetric shape index ((c) and (f))
Figure 19B:
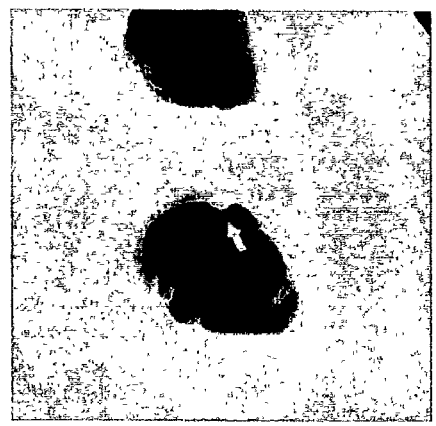
Figure 19C:
Figure 19D:
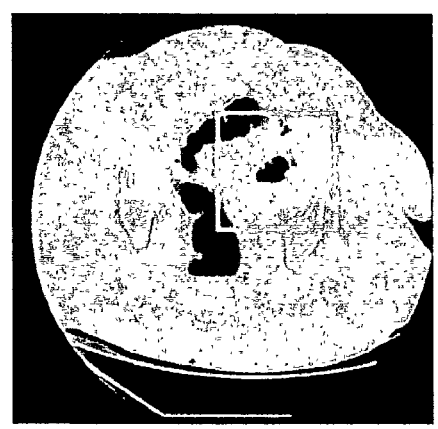
Figure 19E:
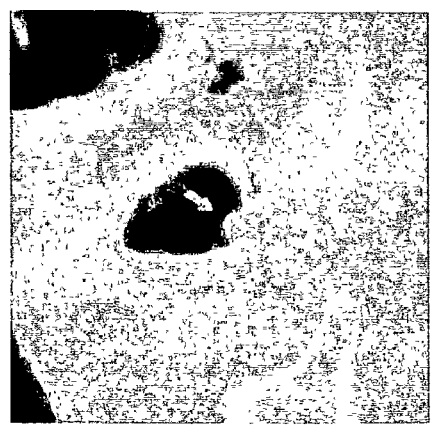
Figure 19F:
Figure 20A:
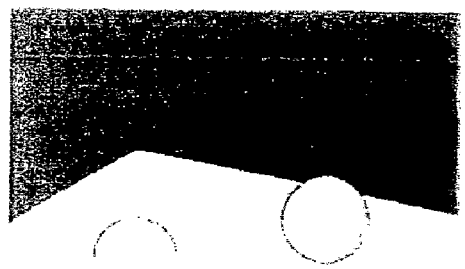
FIGS. 20a-20c are illustrations of (a) a phantom with a complete Gaussian sphere and a Gaussian hemisphere, (b) a cut-plane view of the EC response, and (c) a cut-plane view of the DEC response.
Figure 20B:
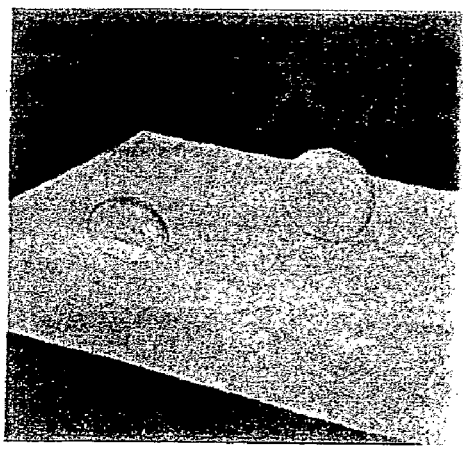
Figure 20C:
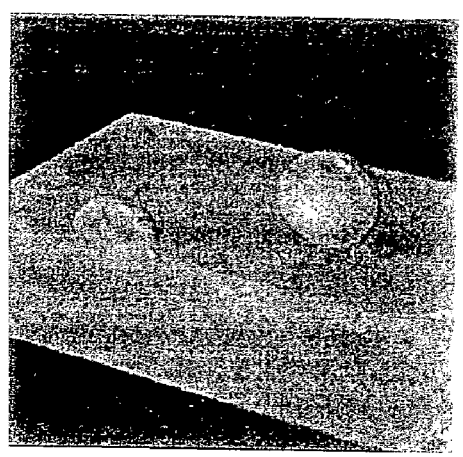

By use of these principal curvatures, the volumetric shape index SI (p) and the volumetric curvedness CV (p) at a voxel p are defined as the local shape index and curvedness of the iso-surface that passes p, where $k_1 \neq k_2$. The space spanned by SI and CV is a polar-coordinate representation of the space spanned by the principal curvatures $k_1$ and $k_2$. The shape index is a measure of the shape. Every distinct shape, except for the plane, corresponds to a unique value of SI [38, 39]. These shapes are mapped on a unit circle in the ($k_1$, $k_2$)-space (see FIG. 18). The unit circle contains shapes with unit curvedness, and the rays through the origin contain identical shapes that differ in their curvedness, i.e., their sizes. For example, as shown in FIG. 18, five well-known shape classes have the following shape index values: cup (0.0), rut (0.25), saddle (0.5), ridge (0.75), and cap (1.0). Diagrammatically, opposite points on the unit circle, denoted by the end points of the dotted lines, represent shapes that are each other's "negative," that is, they have the same shape, but opposite mold. Therefore, all shapes can be mapped on the interval $SI \in [0,1]$. In FIG. 18, the "negative" shapes are represented by light gray. A plane has vanishing curvedness and an indeterminate shape index.

The most important advantage of the shape index is that the transition from one shape to another occurs continuously, and thus the shape index can describe subtle shape variations effectively. For example, SI=0.875 represents the "dome" shape, which is a transient shape from ridge (SI=0.75) to cap (SI=1.0). Moreover, the definition of the volumetric shape index introduced here allows one to define the shape index at every voxel in a volume without explicitly calculating the iso-surface. Therefore, the volumetric shape index captures the intuitive notion of local shape of an iso-surface at a voxel.

The curvedness is a measure of the curvature of the iso-surface. The dimension of the curvedness is that of the reciprocal of length, and its range is ]−∞, ∞[. Curvedness is a "dual" feature to the shape index in that the shape index measures "which" shape the local neighborhood of a voxel has, whereas the curvedness measures "how much" shape the neighborhood includes. The curvedness also provides scale information: a large negative value implies a very gentle change, whereas a large positive value implies a very sharp knife-like edge.

In the three-dimensional volumetric data, generally, polyps appear as bulbous, cap-like structures adhering to the colonic wall, with small to medium curvedness, whereas folds appear as elongated, ridge-like structures having large curvedness values. The colonic walls appear as nearly flat, cup-like structures and have small curvedness values. Therefore, the shape index and the curvedness can differentiate among polyps, folds, and colonic walls effectively.

FIG. 19 demonstrates the potential of the shape index in differentiating colonic structures. FIGS. 19(a) and (d) show axial CT images that contain polyps in the regions indicated by boxes. FIGS. 19(b) and (e) show magnified views of the regions indicated in (a) and (d). The polyps are indicated by arrows. FIGS. 19(c) and (f) represent three-dimensional endoscopic views of (b) and (e), rendered by perspective volume rendering and colored by the shape index. Voxels that have shape index values corresponding to the cap class are colored green, those corresponding to ridge are colored pink, and those corresponding to the other classes are colored brown. As expected, most portions of the polyp are colored green, whereas folds and colonic walls are colored pink and brown, respectively. With this coloring scheme, the polyps, folds, and colonic wall are clearly separated, and the polyp is easily distinguishable from other structures.

In step 1702, the characteristic values of the shape index for polyps are used to segment the polyp candidates by use of hysteresis thresholding [41]. First, voxels that have shape index and curvedness values between a predefined minimum and maximum are extracted as seed regions. The minimum and maximum threshold values for the shape index are set to approximately 0.9 and 1.0, respectively, so that the regions that are in the cap class can be selected. The minimum and maximum threshold values for the curvedness are set so that the curvedness is within the range of targeted polyps, i.e., minimum≈0.08 mm$^{-1}$ (effective size of 12.5 mm) and maximum≈0.20 mm$^{-1}$ (effective size of 5.0 mm.)

Starting with seed regions, hysteresis thresholding based on the shape index and curvedness is applied to the extracted colon $\tilde{C}$ to obtain polyp candidates. This hysteresis thresholding extracts a set of spatially connected voxels to the seed regions having shape index and curvedness values within the predefined minimum and maximum values. This process is used to extract a large connected component that corresponds to the major portion of a polyp because the peripheral region of a polyp does not always show a perfect cap shape, but may show a dome-like shape. Therefore, a relaxed minimum threshold value (approximately 0.8) for the shape index is used in order to include the skirts of the polyps connected to the colonic walls or folds. Similarly, the peripheral region of a polyp may have curvedness values that are smaller or larger than that of the center region of a polyp. Therefore, the minimum and maximum threshold values for curvedness were relaxed to approximately 0.05 $mm^{-1}$ (effective size of 20 mm) and 0.25 $mm^{-1}$ (effective polyp sizes of 4 mm), for identification of clinically significant polyps Table 2 summarizes the threshold values for the major parameters used in the segmentation process.

The region of a polyp candidate is extracted through an iterative conditional morphological dilation process, which is applied to the region detected by hysteresis thresholding as described above. The region, in which the growth rate due to a step of conditional dilation is smallest, is chosen as the final region of the polyp or lesion candidate.

In this method, the region extracted by use of hysteresis thresholding is used as seed region $R_0$. The seed region is expanded by use of conditional morphological dilation as follows: let $\oplus$ denote the operation of morphological dilation [33], and let \ denote the operation of set difference (i.e., A\B denotes the part of set A not in set B). Let $C_L$ denote the region of the colonic lumen, which can be determined during the colon extraction process. Let B denote a morphological spherical structuring element with a diameter of D mm. In each step of the process of iterative conditional morphological dilation, the following operation is performed: $R_i = (R_{i-1} \oplus B) \backslash C_L$. The morphological dilation extends the boundary surface of the previous region $R_{i-1}$ by D mm, and the set difference operation eliminates the part of the dilated region that extends to the colonic lumen. D is set to the voxel resolution of each data set (approximately 0.5-0.7 mm) to expand the region in layers with a thickness of one voxel.

The maximum number of dilation steps, M, is constrained by MD≦7.5 mm. That is, the boundary surface of the polyp candidate may extend at most 7.5 mm from its starting position in $R_0$. Therefore, the technique can potentially extract the complete region of polyp or lesion candidates that are up to 15 mm in diameter. This suffices to extract most polyps with small to medium sizes.

To determine the complete region $R_p$ of a polyp candidate, in each step of the process of conditional dilation, the amount $N_i$ of voxels that were added to $R_{i-1}$ to yield $R_i$ is calculated. The final region of the polyp candidate will be the dilated region for which the growth rate due to expansion by conditional dilation, or dN|dR, is smallest. Typically, the growth rate first increases rapidly, and then decreases as the expanding region becomes bounded by the visually perceived shape of the polyp candidate. After that, the growth rate increases again as the expanding region extends into the organ wall beyond the actual region of the polyp candidate. Therefore, the region that corresponds to the smallest growth rate represents, most likely, the complete region of the polyp candidate.

In practice, small polyps of approximately 5 mm or less in diameter may already be covered by the seed region $R_0$. In this case, the segmentation technique described above could segment not only the polyp, but also a part of the region surrounding the polyp. Therefore, before starting the iterative process of conditional morphological dilation, the seed region is eroded by 1 mm. The seed region then becomes smaller than the actual region of the polyp candidate. When the dilation process is started, the expanding region will first restore the original region of the seed and identify correctly the actual region of the polyp candidate.

The polyp candidates may contain the multiple detections, at different locations, of the same polyps, and may include a large number of small bumpy structures due to image noise. Multiple detections are merged into a single candidate by combining the detections that are located within a merging distance. A merging distance of approximately 10 mm is used, because, generally, multiple detections occur on a polyp larger than 10 mm.

In step 1703, the set of initial candidate lesions generated in step 1702 is clustered to form the set of candidate lesions. In one embodiment, a fuzzy c-means algorithm [43] can be used as described below. Note, however, that the fuzzy clustering process can be accomplished by using other statistical clustering methods such as those described in [44], which are recognizable by those skilled in the art.

Let f (p) denote the feature vector of data point p (i.e. a voxel in a polyp candidate). The fuzzy c-means algorithm groups the data points p with similar f (p) into a single cluster C. The similarity between two data points p and q is defined by the similarity measure $M_f = \|f(p) - f(q)\|$, where $\|\cdot\|$ represents the Euclidean distance. The main advantage of the fuzzy clustering is that it defines a membership function $\theta_i(p) \in [0, 1]$ for each data point p and each cluster $C_i$. If the value of $\ominus_i(p)$ is large, it is likely that p belongs to cluster $C_i$.

Let $s_i$ denote the segmented polyp candidates. To start the fuzzy clustering, the center of each polyp candidate $s_i$ is used as the initial estimate of the cluster centers, and define $\ominus_i(p)=1$ if $p \in s_i$, and $\ominus_i(p)=0$ otherwise. The feature values in each f (p) are normalized to the range [0,1]. The fuzzy c-means clustering takes the f(p) of all p as input, and moves the cluster centers to the optimal location by iteratively updating the membership functions $\ominus_i(p)$ and the location of the cluster centers. This optimization is based on minimizing an objective function that represents the distance from any given data point to a cluster center weighted by the degree of membership of the data points.

The data points p with membership higher than a threshold value m, $\ominus_j(p) \geq m$, for some j are kept to yield the final clusters. By using the relatively high threshold value m of approximately 0.8, the fuzzy clustering process keeps the candidates due to noise as a small, isolated cluster, because they tend to contain voxels that have distinctly different feature values from those of their surrounding voxels. These voxels have low memberships in the candidates, and thus the above thresholding operation generates small clusters. Thresholding with a minimum volume of approximately 38 $mm^3$ is applied to individual clusters for removal of these small clusters. This minimum volume is equivalent to the volume of a 4-mm polyp, which is small enough to keep the clinically significant polyps that are 5 mm or larger.

Table 2 summarizes the threshold values for the major parameters used in the clustering process.

In step 1704, a set of true lesions (true-positive (TP) lesions) is selected from the set of candidate lesions formed in step 1703. For this purpose, three-dimensionally derived features are obtained to characterize each polyp candidate and to differentiate false positives (FPs) from TPs.

Figure 21A:
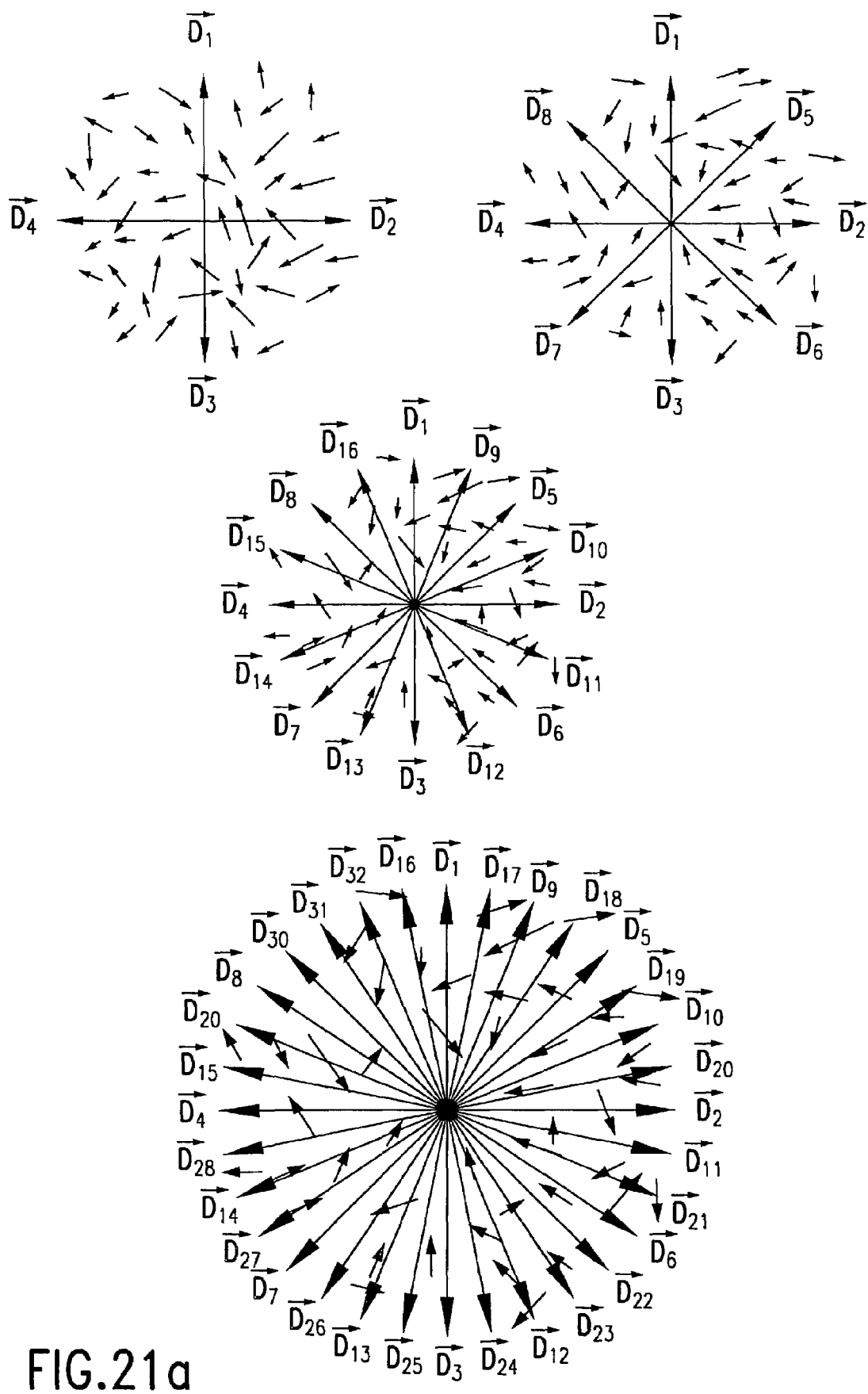
FIGS. 21a and 21b show (a) four 2-D pictures illustrating how the increase in the number of directions in the computation of the gradient concentration improves the estimate of the local gradient concentration, and (b) an illustration of the computation of coefficients used in the calculation of the directional gradient concentration (DGC)
Figure 21B:
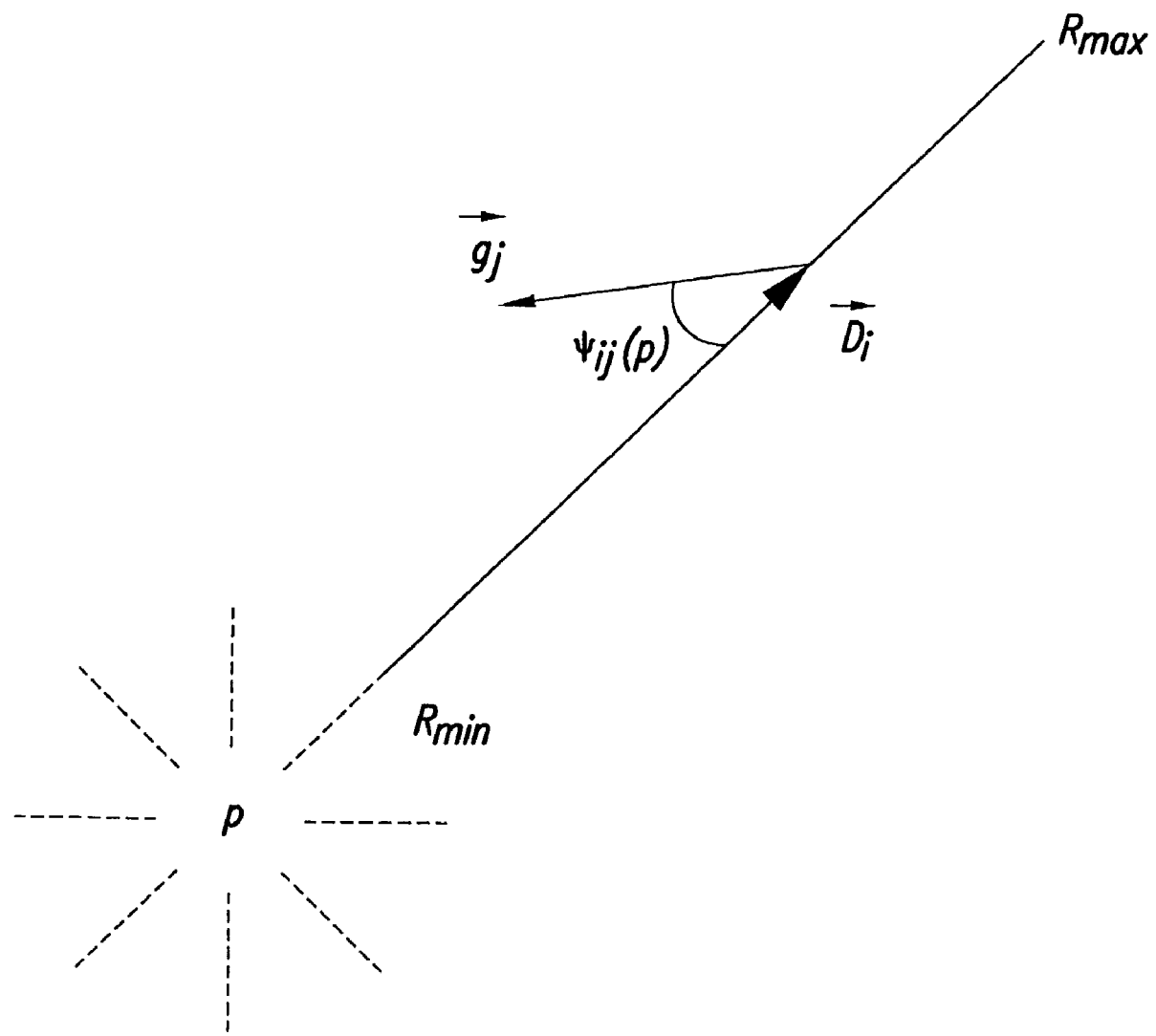

In one embodiment, two three-dimensionally derived volumetric features, the gradient concentration (GC) and the directional gradient concentration (DGC), are used for efficient differentiation between FPs and TPs [45]. The GC and the DGC features are based on the iris filter [45] that was originally designed to enhance and detect rounded convex regions. This feature measures the degree of concentration of the gradient orientations of the CT values in the vicinity of a voxel. The GC feature is computed by $$GC(p) = \frac{1}{N}\sum_{i=1}^{N} e_i^{max}(p) \quad (25)$$

$$e_i^{max}(p) = \max_{R_{min} \le n \le R_{max}} \left\{ \frac{1}{n - R_{min} + 1} \sum_{j=R_{min}}^{n} \cos\psi_{ij}(p) \right\}$$

where p is an operating point (OP), and N is the number of the symmetric directions used for computing the response (FIG. 21a). Generally, increasing the number of directions improves the estimate of the local gradient concentration, with a sacrifice in computation speed. The values $e_i^{max}(p)$ are computed by use of the distance range of $[R_{min}, R_{max}]$ from p in each direction. The angle $\psi_{ij}(p)$ is the angle between the direction vector $\vec{D}_i$ and a gradient vector $\vec{g}_j$ located at distance j from p (FIG. 21b).

Figure 22C:
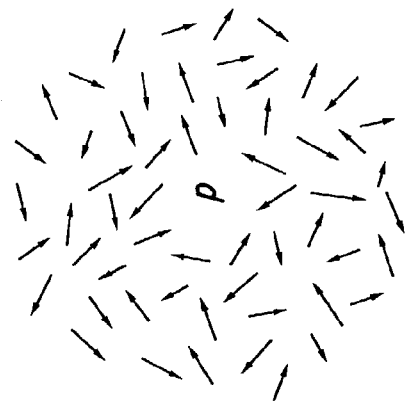
FIGS. 22a-22f are illustrations of 2-D examples of gradient concentration, showing (a) a circular density, in which the density tends to increase towards the center similar to the Gaussian function and all vectors point to the center, (b) hemispherical density, in which gradient vectors point toward the center only in one half of the volume of interest, (c) the gradient vectors, if they exist, point in random directions, (d) the gradient vectors point in the same direction, as can happen within a boundary region, (e) the gradient vectors point away from the center, and (f) a nonspecific situation in which some gradient vectors point toward the center, but do not form a precise hemispherical concentration pattern.

From Eq. (25), the value of GC is bounded by [−1,1]. The value at the OP increases as the number of gradient vectors pointing to the OP increases. Therefore, the GC value is highest at the center of a spherical object, in which the voxel values increase toward the center point (FIG. 22a). This is because the value of $$e_i^{max}(p)$$

in Eq. (25) is high in all directions around the center.

Due to the partial volume effect, the soft-tissue density within a polyp tends to increase from the colonic air toward the center of the polyp. Therefore, most gradient vectors within a polyp tend to point toward the polyp's center. On the other hand, folds, which are a major source of FPs in the colon, are elongated ridge-like objects that do not have a single center toward which the soft-tissue density would increase. Therefore, gradient vectors in a fold do not concentrate at any particular point. Another source of FPs is stool, which can sometimes be confused with small polyps. Because the internal structure of stool is less homogeneous than that of a polyp, the density variation within stool tends to cause the gradient vectors to point in random directions rather than toward any particular location. Because of these differences, the GC feature can be an effective means for differentiating polyps from FPs.

Generally, polyps appearing on the colonic wall are hemispherical objects, rather than complete spheres. Therefore, the DGC feature is designed to improve the identification of hemispherical density patterns. The DGC is designed to have high values for hemispheres, but low values for complete spheres. In a hemisphere, the value of $$e_i^{max}(p)$$

in Eq. (25) is high in one half of the region and low in the other half (FIG. 22b). Suppose one calculates the difference $$e_{ij}^{\Delta}(p) = |e_i^{max}(p) - e_j^{max}(p)|$$

of the values $$e_i^{max}(p) \text{ and } e_j^{max}(p)$$

that have been computed from opposite directions, $\vec{D}_i$ and $\vec{D}_j$. Then $$e_{ij}^{\Delta}(p)$$

is low at the center of a sphere since $$e_i^{max}(p) \approx e_j^{max}(p),$$

but high in a hemisphere where $$e_i^{max}(p) \approx 1 \text{ and } e_j^{max}(p) \approx 0$$

(or vice versa). If the gradient vectors do not concentrate anywhere (FIG. 22c), both $$e_i^{max}(p) \approx 0 \text{ and } e_j^{max}(p) \approx 0, \text{ and therefore } e_{ij}^{\Delta}(p) \approx 0.$$

The DGC is defined based on the coefficients $$e_i^{max}(p)$$

of Eq. (25) as in Equation (26).

$$DGC(p) = \frac{1}{2N}\sum_{i=1}^{N/2} \begin{cases} |e_i^{max}(p) - e_{i+N/2}^{max}(p)|; & e_i^{max}(p), e_{i+N/2}^{max}(p) > 0 \\ e_i^{max}(p) + e_{i+N/2}^{max}(p); & \text{otherwise.} \end{cases} \quad (26)$$

Here N is the number of the symmetric computation directions, and the values $$e_i^{max}(p) \text{ and } e_{i+N/2}^{max}(p)$$

and are computed from opposite directions, $\vec{D}_i$ and $\vec{D}_{i+N/2}$. Although this formulation does not check whether the gradient vectors pointing to p form a precise hemispherical concentration pattern, it allows fast DGC computation with simultaneous computation of GC.

If the gradient vectors point toward the OP in both sides of the OP, $$e_i^{max}(p) \text{ and } e_{i+N/2}^{max}(p)$$

are positive and DGC(p)∈[0,1]. If the gradient vectors point away from the OP, $$e_i^{max}(p) \text{ and } e_{i+N/2}^{max}(p)$$

are negative and DGC(p)∈[−2,0]. If the gradient vectors point toward the OP in one direction, but away from the OP in the opposite direction, DGC(p)∈[−1,1]. Therefore, the value range of the DGC is [−2,1].

Some special cases complicate the use of the DGC feature. For example, if the gradient vectors are pointing in the same direction (FIG. 22d), then $$e_i^{max}(p) \approx 1$$

in one direction and $$e_j^{max}(p) \approx -1$$

in the other direction. The difference $$e_{ij}^{\Delta}(p)$$

may then approach 2, increasing the overall response. Such a situation could occur within a boundary region, if the scale of DGC (i.e., $R_{max}$) is set much smaller than the diameter of the largest target polyps. Another special case occurs when all gradient vectors point away from the OP (FIG. 22e), and then $$e_{ij}^{\Delta}(p) \approx 0$$

at the center. However, this kind of gradient concentration pattern is unlikely to appear in CTC. Finally, there could be nonspecific situations that, although they do not form a true hemispherical concentration pattern, could produce high values $$e_{ij}^{\Delta}(p)$$

Figure 22F:
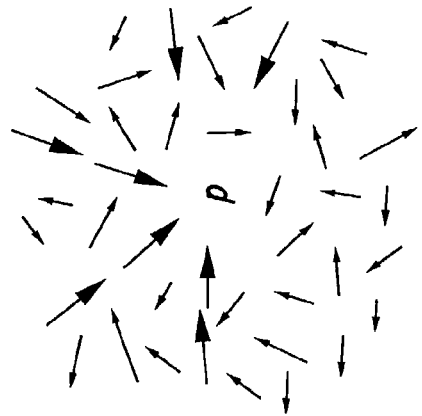
Figure 22B:
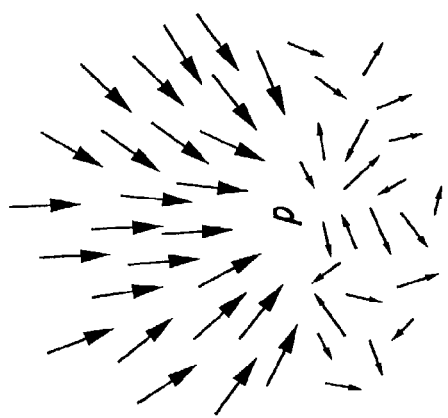
Figure 22E:
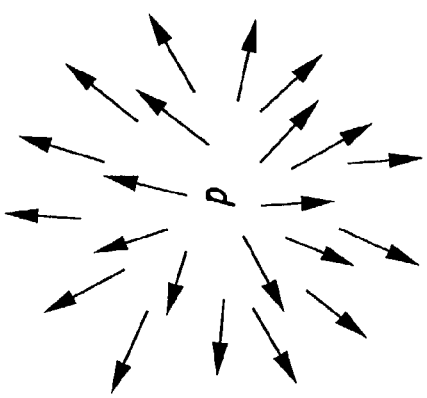
Figure 22A:
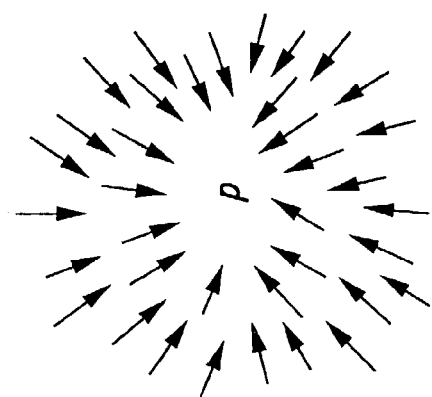
Figure 22D:
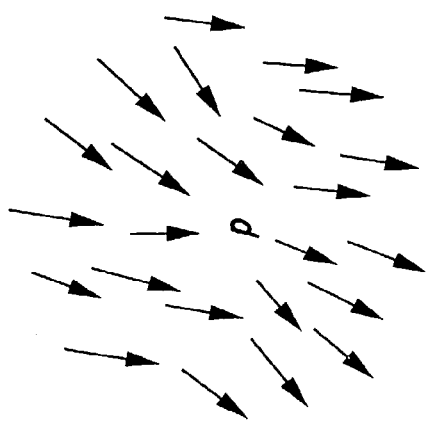

(FIG. 22f). Such situations can be identified by increasing the number of directions where DGC is computed.

Figure 23A:
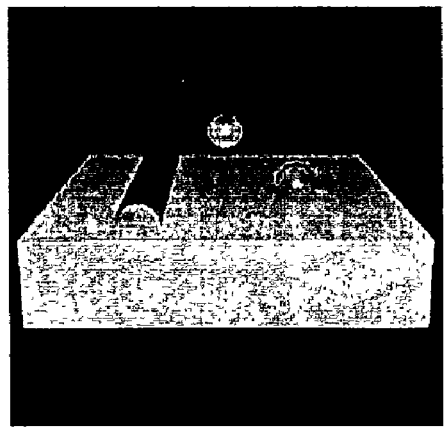
FIGS. 23a-23c are illustrations of (a) a phantom with a Gaussian wedge, sphere, and hemisphere, (b) a cut-plane view of the phantom, colored based on gradient concentration, and (c) a cut-plane view of the phantom, colored based on directional gradient concentration.
Figure 23B:
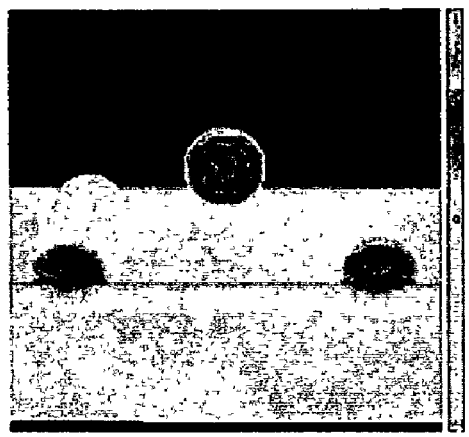
Figure 23C:
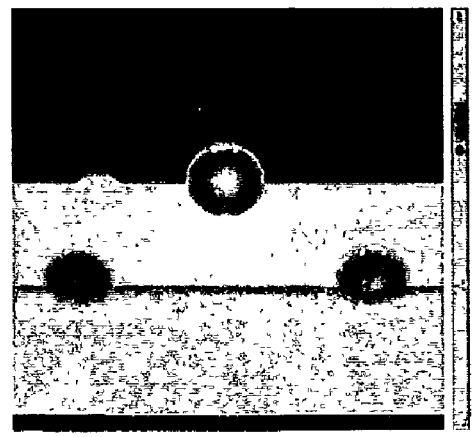

FIG. 23 shows examples of the GC and DGC response for synthetic objects. FIGS. 23a and b show that the GC values are highest at the center of a sphere. High values are also seen in the center of a polyp-like hemisphere. A ridge-like cylinder has moderately high GC values at its central axis, but these are lower than the GC values at the centers of the sphere and hemisphere because of the smaller number of gradient vectors pointing toward the central axis. FIG. 23c shows that the DGC values are high at the center of the polyp-like hemisphere, but low at the center of a sphere. The central axis of the ridge-like cylinder has moderately high values.

In another embodiment, a novel modified gradient concentration (MGC) [46] is used as an effective three-dimensional derived feature for characterizing each polyp candidate and for differentiating false positives from true positives. MGC feature is based on the GC feature. The GC feature characterizes the direction of three-dimensional gradient vectors of CT values with respect to an operating point at the center of the region where the gradient direction is calculated. The GC feature can differentiate pedunculated polyps from FPs with high accuracy, but the performance in differentiating sessile polyps from FPs is low. Therefore, the MGC feature was designed to improve the performance of the GC in differentiating sessile polyps from FPs.

The MGC feature is defined based on the GC feature, which is highly sensitive to spherical objects with a Gaussian distribution of CT values. The values of the MGC are calculated by mapping of the GC values through a sigmoid function that increases the GC values corresponding to spherical (GC≈1) and hemispherical (GC≈0.5) objects while decreasing low GC values that appear within FPs. The sigmoid mapping of the GC values is calculated by $$MGC(p) = \frac{1}{1 + \exp(g\,GC(p) - t)} \quad (27)$$

The parameters of the sigmoid function, i.e., the gain g and transfer t, were determined experimentally.

In another embodiment, the variance of the CT value (CTV) [34] is used as an effective three-dimensionally derived feature for characterizing each polyp candidate and for differentiating false positives from true positives. CTV is calculated from the CT value of the voxels. Given the extracted region R of a polyp candidate, CTV is calculated as shown in $$CTV(R) = \frac{1}{|R|-1} \sum_{p \in R} (CT(p) - CT(R))^2, \quad (28)$$

Equation (28), in which |R| is the number of voxels in R, CT(p) is the CT value of voxel p, and CT(R) is the mean CT value within R.

In the preferred embodiment, other three-dimensionally derived volumetric features described in steps 1701 and 1702 such as the shape index, curvedness, CT value, and gradient of CT values can also be used for characterizing each polyp candidate and for differentiating false positives from true positives.

Figure 25A:
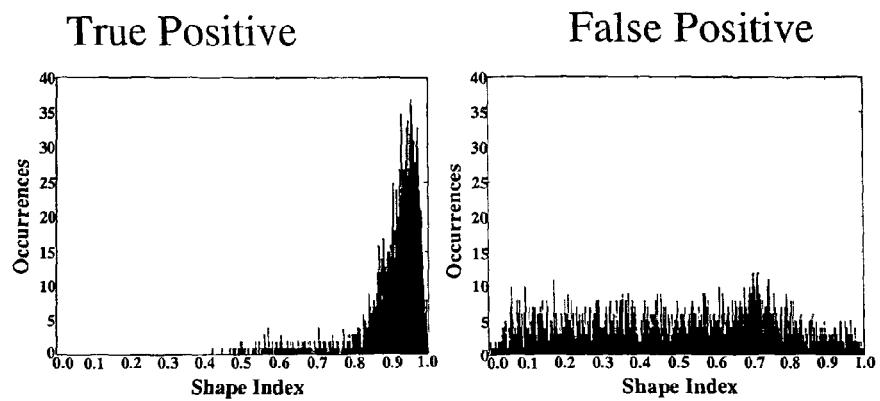
FIGS. 25a-25c show histograms of feature values within a TP polyp candidate (left) and a FP polyp candidate (right): (a) SI feature, (b) GC feature, and (c) CT value feature (in Hounsfield units)
Figure 25B:
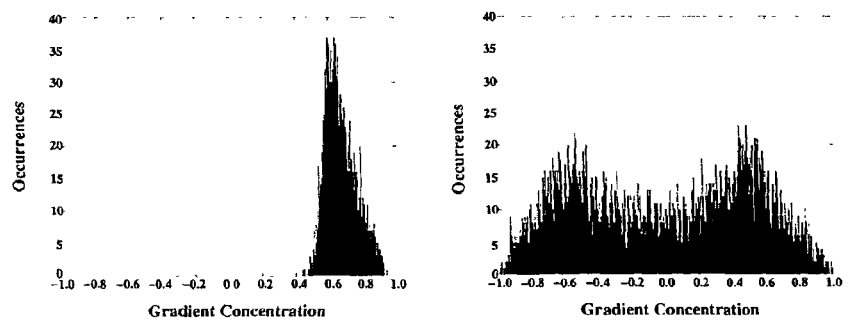
Figure 25C:
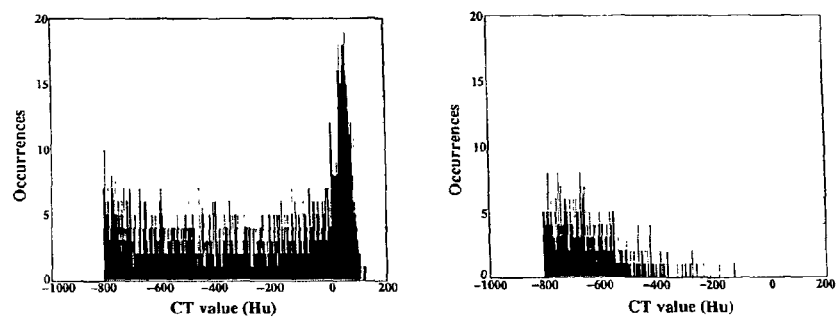

The effectiveness of the features mentioned above in characterizing polyps can be visualized by calculation of histograms of feature values from typical TP and FP polyp candidates. These histograms show signature patterns that are different between typical TP and FP polyp candidate (FIGS. 25a-25c). For example, in FIG. 25a, the SI values of a TP polyp candidate are concentrated at the high end of the histogram of SI values, whereas the SI values of a FP polyp candidate are distributed over a wide range of SI values.

Figure 26A:
FIGS. 26a and 26b illustrate (a) axial, coronal, and sagittal views of a polyp (arrow) that dissolves into a cloud-like background substance, and (b) that the region of the actual polyp produces a subtle polyp-like signature pattern in the high end of the histogram of SI values (arrow), but the surrounding cloud-like substance generates a tail of SI values that extends to the lowest values of the SI.
Figure 26B:
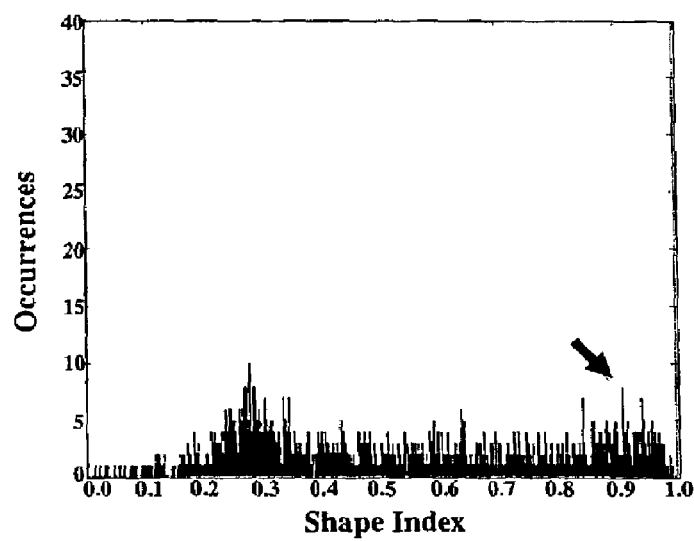

Most regions of polyp candidates contain feature values that are characteristic of polyps, as well as feature values that are not characteristic of polyps. For example, in FIG. 25a, the TP and FP polyp candidates contain both high and low values of SI. Therefore, simply the presence of polyp-like or unpolyp-like feature values is not a sufficient indicator for a TP or FP classification. The polyp candidate may also represent multiple lesions rather than a single well-defined lesion. For example, FIG. 26a shows a small polyp within a cloud-like substance: the histogram of SI values (FIG. 26b) shows not only high values of the SI due to the polyp-like region of the polyp candidate, but also a wide range of low, unpolyp-like values due to the surrounding cloud-like substance. Simply computing the mean value of the SI within the entire region of the polyp candidate extracted by a segmentation method, including the conditional morphological dilation, would dilute the high polyp-like values due to the low values produced by the cloud-like substance.

Thus, a method called feature-guided analysis [46] was developed, in which, for each polyp candidate, a feature $F^J$ is calculated in a restricted range that is determined by the region of the polyp candidate and the rage in which values of the feature exceed a threshold value $T_{Fj}$. The threshold value $T_{Fj}$ is determined empirically for each feature. First, initial estimates of the threshold values for each feature are determined by examining visually the feature histograms of a number of TP polyp candidates and a number of lowest-ranking FP polyp candidates in the data sets. Here, the rank of the FP polyp candidates is based on the mean value of the SI within the entire segmented region of the polyp candidate. Next, approximately 10 threshold values are chosen randomly in the neighborhood of the initial estimates. Each combination of the thresholds from each feature can be used; however, we typically choose the threshold combination that minimizes the FP rate of the present method at high by-polyp detection sensitivities (86%-95%) in the CTC data sets for the feature-guided analysis technique.

Once volumetric, morphologic, and/or texture features are computed, the following nine statistics of these features called feature statistics (FSs) are compute within the region obtained by conditional morphological dilation described in step 1702: (1) mean (2) minimum, (3) maximum, (4) variance, (5) skewness, (6) kurtosis, (7) entropy, (8) the average of 10 voxels with the highest feature values in a candidate, and (9) contrast as defined by the ratio between minimum and maximum. Let $s_i$ represent a polyp candidate, and let $f_i(j)(j=1, \ldots, N_i)$ represent the values of feature f for the $N_i$ voxels of $s_i$. Then the above nine statistics can be defined as shown in Equations (29)-(37). In Eq. (37), the mk represents the indexes of the voxels with the highest value(s) of f within $s_i$. Note that other types of FSs such as the moments as described in [34] can alternatively be used by those skilled in the art.

$$\text{mean}_f(s_i) = \mu_f(s_i) = \sum_{k=1}^{N_i} \frac{f_i(k)}{N_i} \quad (29)$$

$$\min_f(s_i) = \min_{k=1}^{N_i} \{f_i(k)\} \quad (30)$$

$$\max_f(s_i) = \max_{k=1}^{N_i} \{f_i(k)\} \quad (31)$$

$$\text{var}_f(s_i) = \sigma_f^2(s_i) = \frac{1}{N_{i=1}} \sum_{k=1}^{N_i} (f_i(k) - \mu_f(s_i))^2 \quad (32)$$

$$stdv_f(s_i) = \sigma_f(s_i) = \sqrt{\sigma_f^2(s_i)} \quad (33)$$

$$\text{skew}_f(s_i) = \frac{1}{N_i} \sum_{k=1}^{N_i} \left(\frac{f_i(k) - \mu_f(s_i)}{\sigma_f(s_i)}\right)^3 \quad (34)$$

Two methods can be used for computing these statistics for polyp candidates. The simpler and faster approach, which we call global statistics, is to compute these statistics $$\text{kurt}_f(s_i) = \frac{1}{N_i} \sum_{k=1}^{N_i} \left(\frac{f_i(k) - \mu_f(s_i)}{\sigma_f(s_i)}\right)^4 - 3 \quad (35)$$

$$\text{contrast}_f(s_i) = \frac{\min_f(si)}{\max_f(si)} \quad (36)$$

$$\max 10_f(si) = \frac{1}{10} \sum_{k=1}^{10} f_i(m_k) \quad (37)$$

directly from the CT values or their gradient contained within the polyp candidate. The second approach, called local statistics, is to compute the statistics locally within a small neighborhood, typically but not limited to 3×3 or 5×5, of each voxel within the candidate region. The distribution of the local statistics is further summarized by mean, variance, skewness, kurtosis, and contrast statistics within each polyp candidate. The local statistics can capture the local textural variations more efficiently than the first global approach, and thus can be more effective in differentiating stool from polyps.

In step 1704, true polyp (or TP polyps) is selected from the set of polyp candidates based on at least one of the FSs such as, but not limited to, the ones mentioned above. For this purpose, FP polyps are identified by classifying of the polyp candidates into TP and FP categories by use of a statistical classifier. This classifier can be a linear classifier such as the one generated by linear discriminant analysis (LDA) [47]; non-linear classifier such as the one generated by quadratic discriminant analysis (QDA) [47], neural network [48], and support vector machine [49]; kernel-based learning methods [49]; any type of single classifier based on a statistical classification algorithm described in Ref. [50], or any combination thereof. In the classification, a set of FSs are calculated and arranged into a feature vector. The feature vector is used as input to the statistical classifier, and the polyp candidates are classified into TP and FP categories. TPs define the final output of the preferred method, i.e., the detected polyps.

In one embodiment, we used LDA and QDA as the statistical classifier. To be specific, in the following, the classifier generated by the QDA is called a quadratic classifier (QC). Similarly, the classifier generated by the LDA is called a linear classifier (LC).

Let N denote the number of FSs, and $s_i=(s_i^1, s_i^2, \ldots, s_i^N)$ denotes an N-dimensional feature vector of the polyp candidate $s_i$, in which the component $s_i^j$ represents the j-th FS value of the polyp candidate. Given a training set $\{s_i\}$ with known classes, LDA or QDA generates a decision boundary that optimally partitions the feature space spanned by the N features into two classes, i.e., true-positive and false-positive classes. To this end, a discriminant function $g(s_i; w) R^N \rightarrow R$, is generated, which projects the N-dimensional feature space to a scalar decision variable space. Here, w is a weight vector (or matrix) that determines the form of the discriminant function g. This weight vector is determined by the training set. The decision boundary is given by $g(s; w)=0$. For LDA, the decision boundary forms a hyperplane, and for QDA, it forms a hyperquadratic surface.

LDA uses the simplest type of discriminant function, called a linear discriminant function, defined by $$g(s_i; w) = w^t s_i + c \quad (38)$$

where w is an N-dimensional weight vector. In QDA, on the other hand, g is a quadratic discriminant function defined by $$g(s_i; W, w) = s^t W s + w^t s_i + c \quad (39)$$

where W is an N×N matrix.

Geometrically, the discriminant function $g(s)$ is interpreted as proportional to the signed distance from s to the decision boundary. Generally, the larger the value of $g(s)$, the more likely it is that s is a polyp. In other words, $g(s)$ is proportional to the ranked ordering of the likelihood that s is a polyp. Therefore, the polyp candidates are classified into the true-positive class $C_{TP}$ and the false-positive class $C_{FP}$ by partitioning the feature space through thresholding of the decision variable as follows:

$$C_{TP} = \{s_i; g(s_i; w) \geq t\},$$

$$C_{FP} = \{s_i; g(s_i; W) < t\}. \quad (40)$$

Those candidates that are classified into the polyp class $C_p$ are reported as the final detected polyps by our system.

The performance of the FSs in the classification between TPs and FPs, as well as the performance of the polyp detection were evaluated based on CTC data obtained from 72 clinical CTC examinations performed during 1997-2001 at the University of Chicago [18]. Each patient underwent standard pre-colonoscopy colon cleansing. Each patient was scanned in both supine and prone positions, and the colon was insufflated with room air. The CTC scanning was performed in prone and supine positions with a helical CT scanner (GE 9800 CTi or LightSpeed QX/i; GE Medical Systems, Milwaukee, Wis.). Thus, there were 144 CTC data sets. The collimation was 2.5-5.0 mm, pitch was 1.5-1.7, and the reconstruction intervals were 1.5-2.5 mm. The matrix size of the axial images was 512×512, with a spatial resolution of 0.5 mm/pixel to 0.7 mm/pixel. A reduced current of 60 mA or 100 mA with 120 kVp was used to minimize radiation exposure. Each CTC data set covered the entire region of the abdomen, from diaphragm to rectum, and consisted of 150-300 CT images with a matrix size of 512×512. After the linear interpolation along the axial direction, the z-dimension of the resulting isotropic volumes contained between 500-700 voxels, and the physical resolution of these volumes was 0.5-0.75 mm/voxel.

Optical colonoscopy was performed on the same day as the CTC. There were 21 colonoscopy-confirmed polyps larger than 5 mm in 14 patients (27 data sets). Radiologists established the exact locations of the polyps in CTC data sets by use of the colonoscopy reports, pathology reports, and multiplanar reformatted views of the CTC data sets. Eight of these polyps were located in the sigmoid colon, 1 in the descending colon, 3 in the hepatic flexure, 1 in the transverse colon, 2 in the splenic flexure, 5 in the ascending colon, and 1 in cecum. All of the polyps were confirmed on the CT images, but 3 polyps were visible only in either the supine or prone view, because they were located in a collapsed region or carried under the fluid in the other view. Seventeen of the polyps were measured 5-10 mm, three polyps were 11-12 mm, and one polyp was 25 mm in diameter.

To determine the true and false positives in the computerized detections, the center coordinates of the true-positive polyps in each data set were determined by two radiologists. A detection was considered a true positive if the distance between the detected polyp and the center of a true polyp was at most 10 mm. All other findings were considered false positives.

In one experiment, the feature-guided analysis was disabled and the performance of six features was compared in the differentiation of FPs and TPs in the polyp candidates generated in step 1703 [45]. The six features included shape index, curvedness, CT value, gradient of CT value, gradient concentration, and directional gradient concentration. The CT value is a CT attenuations value at a voxel, and the gradient of CT value is the magnitude of the 3×3×3 Prewitt gradient of the CT value [37].

ROC analysis [51] was used to evaluate the performance of these features. ROC analysis is a statistical technique that is accepted widely as an effective method for evaluating the performance of a binary decision-making process in interpreting medical images, or, in this case, the differentiation between TPs and FPs. For this purpose, nine statistics from the feature values within each polyp candidate were calculated. These nine statistics included (1) mean (2) minimum, (3) maximum, (4) variance, (5) skewness, (6) kurtosis, (7) entropy, (8) the average of 10 voxels with the highest feature values in a candidate, and (9) contrast as defined by the ratio between minimum and maximum. When the statistics were calculated for individual features, a total of 54 FSs are obtained to characterize each polyp candidate.

The performance of each FS was evaluated by subjecting its values, computed from polyp candidates, to the LABROC4 program [52], which generates a binormal ROC curve. The ROC result is characterized by using the area under the ROC curve ($A_z$), which is the most commonly employed univariate summary index of the ROC curve [51]. Generally, a high value (the maximum is 1.0) indicates high separation between TPs and FPs.

The FSs that had an $A_z$ value exceeding 0.8 were grouped into FS combinations, because they can be considered as "effective" features. Also, if the sum of the $A_z$ value and its standard deviation exceeded 0.8, the FS was included in the combinations. A study of the plots of FSs with $A_z$ values less than 0.8 suggested that the differentiation capability of such FSs is limited, and their use is expected to lead only to marginal improvement with a potentially high error margin when new cases are added to the database. It should be noted that simply choosing the individually high-performing features does not necessarily result in optimal performance when the FSs are used in combination [51]. Therefore, choosing multiple features with high performance is necessary.

Table 3 shows the three highest-performing statistics of each feature in differentiating between the TP and FP polyp candidates in an analysis of a subset of the CTC database described above (43 CTC examinations for a total of 86 CTC data sets; 12 polyps in 11 cases). The $A_z$ was highest for the mean value of SI (mean(SI))(0.92), followed by the mean value of DGC (mean(DGC)) and the kurtosis of the CT value (0.85). The gradient, GC, and CV features yielded lower values, with the CV feature producing the lowest $A_z$ value in this evaluation.

Figure 24A:
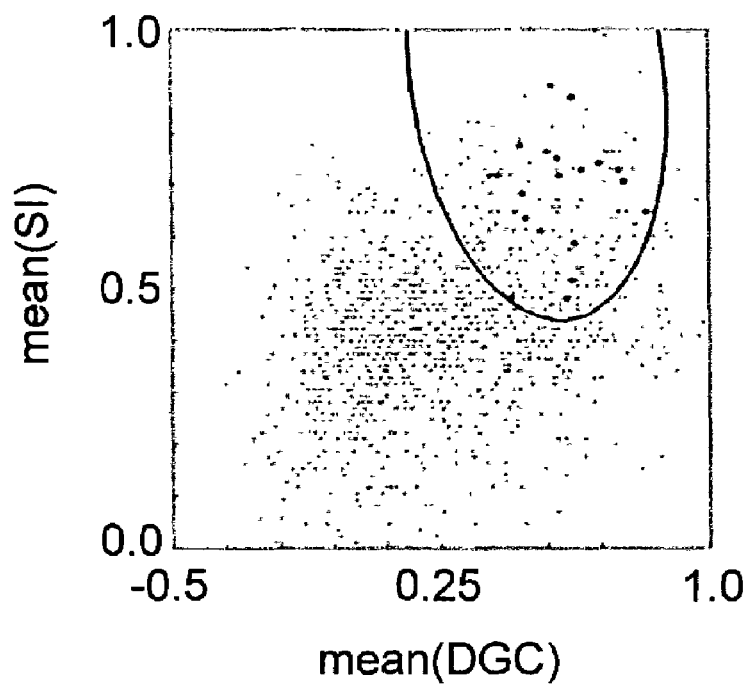
FIGS. 24a and 24b are illustrations of quadratic discriminant analysis showing (a) a partition of a 2-D plane depicting the mean vales of volumetric shape index and directional gradient concentration of the polyp candidates, and (b) multiple partitions generated in the round-robin evaluation process.
Figure 24B:
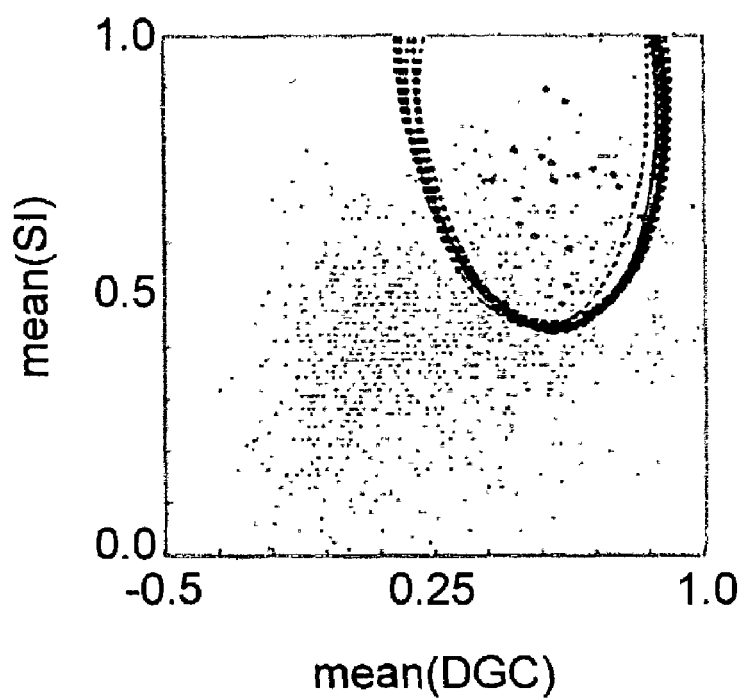

In another experiment, the performance of several FS combinations was evaluated by using them as input to the LC or QC to yield a discrimination function for differentiating between TPs and FPs (FIG. 24a) [45]. The output of the discriminant function was considered as a decision variable, and the values of the discriminant function for each candidate were subjected to ROC analysis. To estimate the unbiased performance, we trained and tested the classifiers for LDA and QDA by a statistical resembling method called round-robin (or leave-one-out) method [53]. In this method, each candidate is removed, in turn, from the set of all polyp candidates. The classifier is trained by the remaining candidates, and a discriminant function is generated and evaluated on the removed candidate (FIG. 24b). The values of these discrimination functions are then subjected to ROC analysis, and the area under the ROC curve $A_z$ is calculated. The advantage of this method is that the training and testing of candidates can be completely separated; therefore, the resulting discrimination criterion is least biased to the cases in the database. Another advantage is that almost all of the polyp candidates are available in this method. It should be noted, however, that the above statistical resembling may alternatively be accomplished using other methods recognizable by those skilled in the art, such as cross validation [53] and bootstrapping [54].

Table 4 shows the FSs that were used to produce the FS combinations. Fifty-nine combinations of two or three FSs yielded the highest $A_z$ values, ranging from 0.93 to 0.96 in the round-robin ROC analysis, with the standard deviation of the $A_z$ value varying between 0.01 and 0.02. Therefore, in Table 5 we show only the ROC results of the FS combinations that also performed best in round-robin polyp detection. As expected, combining two or more FSs increases the $A_z$ value from that of individual FSs. The increment is not remarkably high, however, as the mean(SI) already yields a high $A_z$ value of 0.92 on its own. Many of the combinations that produced the highest $A_z$ values involved FSs based on the SI and DGC features. The highest $A_z$ value was 0.90 when the DGC feature was paired with features other than the SI and 0.93 when the SI feature was paired with features other than the DGC. Adding a third feature to a combination of FSs based on SI and DGC could improve the $A_z$ value marginally. Use of the QC produced generally higher $A_z$ values than use of the LC, although the difference was small. As expected, the use of all samples improved the result over round-robin analysis, but this difference was also small.

The final detected polyps were obtained by determining the threshold value t in Eq. (38). Correspondingly, a free-response receiver operating characteristic (FROC) curve [51] was generated that indicates the overall performance, i.e., sensitivity for the detection of polyps as a function of the false-positive rate, by using t as the sweeping variable. Two types of FROC curves were generated by the following two methods: (1) by-patient analysis, in which a case is regarded as abnormal if at least one true polyp was detected in either the supine or the prone data set of the patient, and (2) by-polyp analysis, in which a polyp was regarded as detected if it is detected in either the supine or prone data set of a patient. In both methods, our system processed the supine and prone volumetric data sets independently to yield polyp candidates. In addition, the average number of false positives per patient was calculated as an index of the false-positive rate.

When generating each type of FROC curve, two methods, consistency evaluation and round-robin (or leave-one-out) evaluation, were used for generating the discrimination function from a classifier. In the first method, the classifier was trained using all of the polyp candidates and produced a single decision boundary that classified the polyp candidates into TP and FP classes. In the second method, each candidate is removed, in turn, from the set of all polyp candidates, and the classifier is trained by the remaining candidates to yield a decision boundary. The decision boundary was then used for classifying the polyp candidate that was left out in calculation of the decision boundary as TP or FP.

Figure 27A:
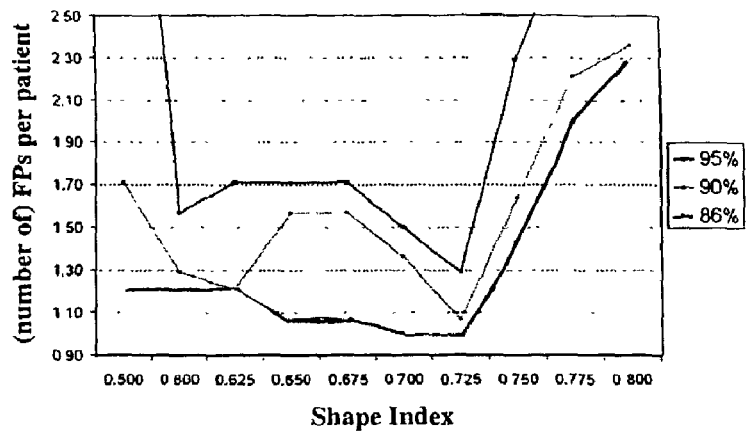
FIGS. 27a-27c illustrate changes in the average number of FPs per patient obtained in the detection of 21 polyps from 27 CTC data sets at by-polyp sensitivities of 86%, 90%, and 95% for several combinations of threshold values for the SI, GC, and CT values used in the histogram-based feature analysis step: (a) effect of SI threshold when GC=0.4 and CT=−300 Hu, (b) effect of GC threshold when SI=0.725 and CT=−300 Hu, and (c) effect of CT value threshold when SI=0.725 and GC=0.4.
Figure 27B:
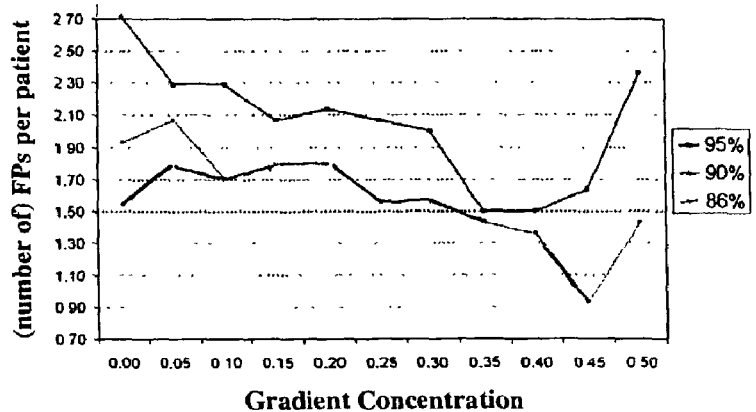
Figure 27C:
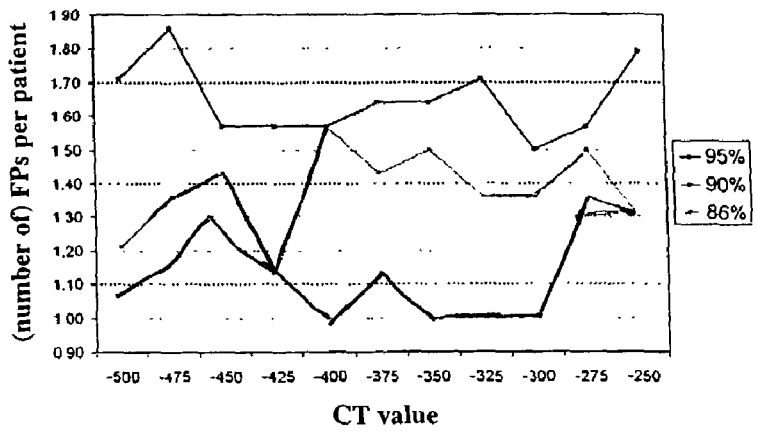

In one experiment, the overall detection performance was compared between a system with the feature-guided analysis but without the fuzzy clustering, and a system with the fuzzy clustering but without the feature-guided analysis [46]. Here, the parameter values of the feature-guided analysis step and the MGC feature were determined by use of 27 CTC data sets with polyps. The following ranges of feature values were used to determine the threshold values for the feature-guided analysis step: $T_{SI}\epsilon[0.5, 0.9](SI\epsilon[0,1])$, $T_{GC}\epsilon[0.0, 0.5](GC\epsilon[-1,1])$, and $T_CT\epsilon[-500, -250]$ (the CT value is given in Hounsfield units). The threshold values of the MGC feature were sampled within $T_{MGC}\epsilon[0.0, 0.4]$. FIGS. 27a-27c show changes in the FP rates obtained at by-polyp detection sensitivities of 86%, 90%, and 95% in detecting polyps from the 27 CTC data sets for several threshold combinations. The lowest FP rates were obtained by use of the following threshold triple: $(T_{SI}, T_{GC}, T_{CT})$=(0.725, 0.4, −300). It should be noted that, as can be seen from FIGS. 27a-27c, the threshold values that yield the lowest FP rate may be different detection sensitivity levels. The above threshold triplet was chosen so that it yielded the smallest FP rate at a by-polyp sensitivity level of 95%. When the MGC feature was used instead of the GC, the lowest FP rates at the same sensitivity were obtained by use of the triplet $(T_{SI}, T_{MGC}, T_{CT})$=(0.725, 0.25, −300).

The gain (g) and transfer (t) parameters of the sigmoid function for calculating the MGC feature were estimated initially by visualization of the MGC feature within a typical spherical (pedunculated) polyp and a hemispherical (sessile) polyp. The final parameter values were determined applying the preferred method to the 27 CTC data sets with polyps. The parameter values were varied uniformly within $-2.0 \leq g \leq -5.0$ and $-0.1 \leq t \leq 0.2$. The parameter values (g,t)= (−2.75, 0.1) yielded the smallest average number of FP detections per patient at 86-95% by-polyp detection sensitivity levels.

The parameter values established above were employed in the feature-guided analysis step of the preferred method. When the resulting system was applied to the entire database of 144 CTC data sets, a total of 34 TP polyp candidates and 1670 FP polyp candidates were detected. These polyp candidates were subjected to the quadratic discriminant classifier, in which only three features, the mean value of the SI, the mean value of the GC (or MGC), and the variance of the CT value, were used as discriminating features to yield the final detected polyps.

Figure 28:
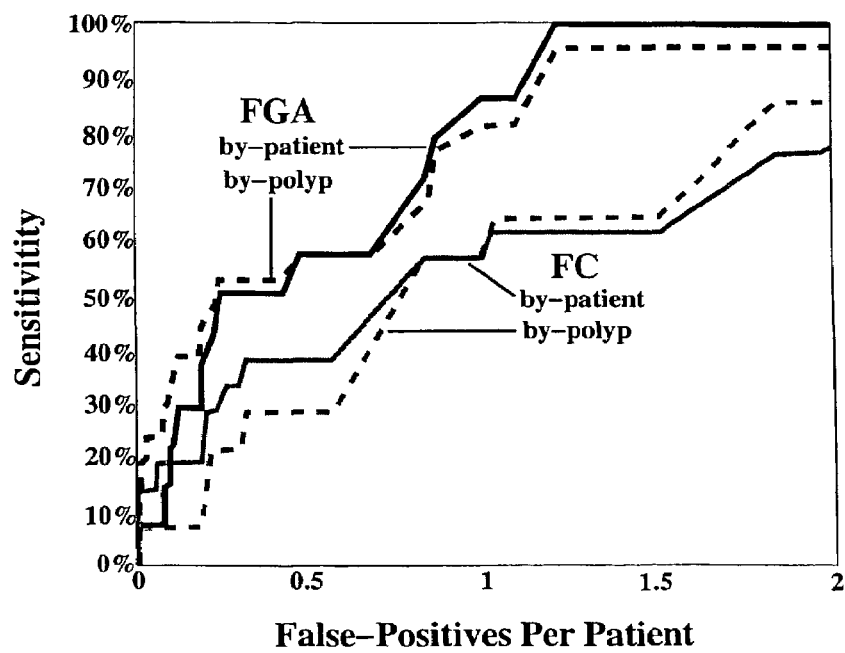
FIG. 28 shows FROC curves for the present method for the by-patient and by-polyp analyses based on 72 patients (144 data sets), including 14 patients with 21 polyps, wherein the FROC curves obtained by use of the feature-guided analysis indicate a higher detection performance than that obtained by use of fuzzy clustering.

In FIG. 28, the top two FROC curves show the performance of the preferred method in the detection of polyps by consistency evaluation. Here, the GC feature was used in obtaining the result. In the consistency evaluation, the preferred method yielded a 100% by-patient and a 95% by-polyp detection sensitivity at a FP rate of 1.22 FP detections per patient. In the round-robin evaluation, at a 100% by-patient detection sensitivity, the FP rate was 1.29 FP detections per patient, and at a 95% by-polyp detection sensitivity, the FP rate was 1.46 FP detections per patient. The use of the MGC feature yielded slightly improved results. In the consistency evaluation, at a 100% by-patient and a 95% by-polyp detection sensitivity, the FP rate was 1.18 FP detections per patient. In the round-robin evaluation, the corresponding FP rate was 1.51 FP detections per patient.

When the fuzzy clustering was used in the present method, there were 1903 FP polyp candidates. The bottom two FROC curves of FIG. 28 show the performance of the present method with fuzzy clustering but without feature-guided analysis. The method yielded a 100% by-patient and a 95% by-polyp detection sensitivity at a FP rate of 4.7 FP detections per patient in the consistency result, and 5.3 FP detections per patient in the round-robin result.

The use of feature-guided analysis reduced 70-75% of the FP detections generated by the fuzzy clustering technique when it was set at a high detection sensitivity of 90-100%. The results obtained by use of fuzzy clustering could be improved by increasing the number of features in the classification of the polyp candidates. For example, it was observed that the use of six features reduced the FP rate of the consistency result down to 1.42 FP detections per patient at a 100% by-patient sensitivity. However, the use of six features with feature-guided analysis also reduced the FP rate: at the by-patient detection sensitivity of 100%, the FP rate was reduced to 0.85 FP detections per patient. Nevertheless, only three features were used in this study because the use of a small number of features is expected to make the detection performance generalizable when more cases are added.

Figure 29:
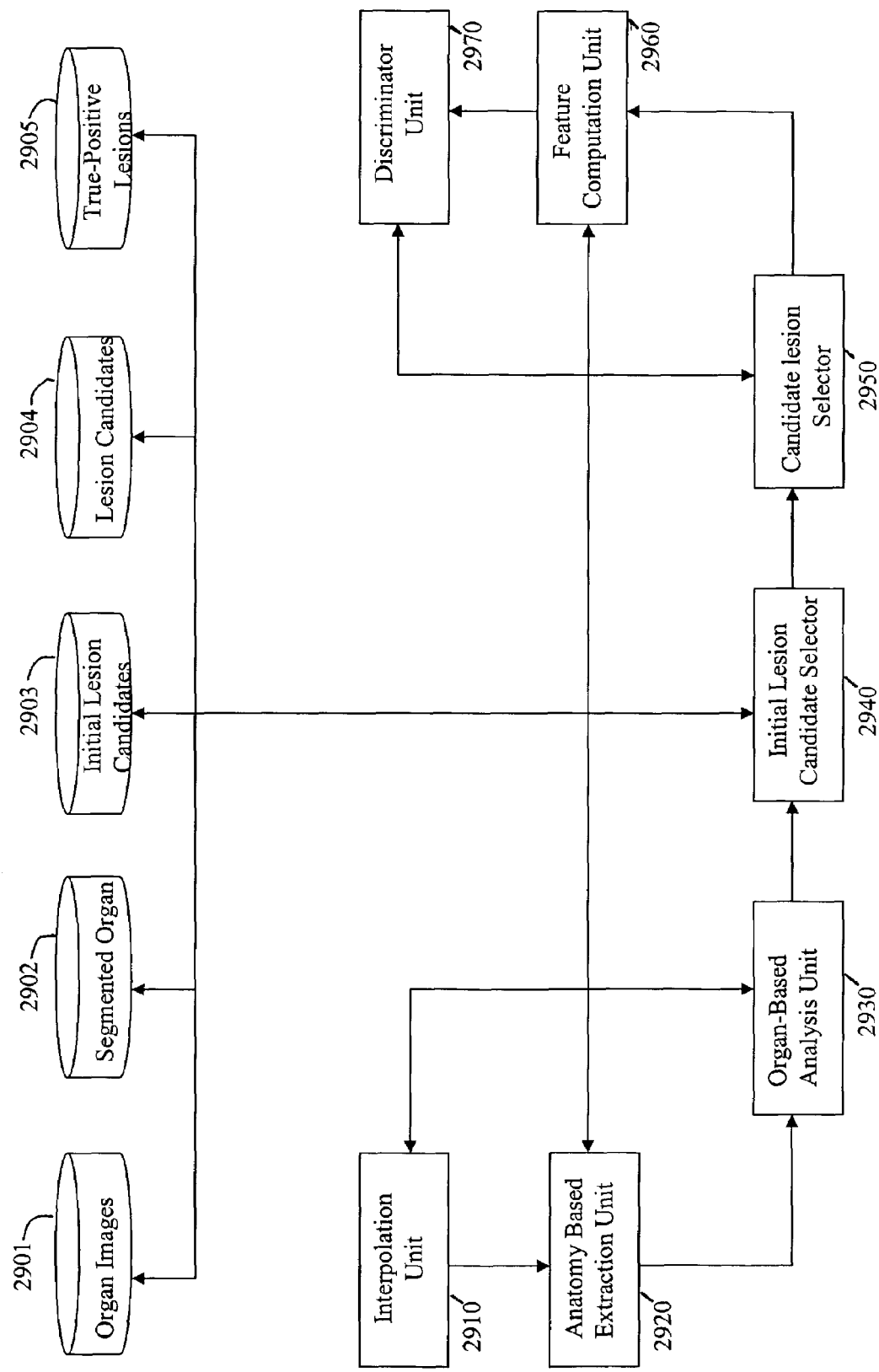
FIG. 29 shows a system for identifying at least one three-dimensionally extended lesion within a thick volumetric region encompassing a target organ according to the present invention.

The present invention may be better understood by reference to the system shown in FIG. 29. The Interpolation Unit 2910 uses a database of cross-sectional organ images 2901 to obtain a set of voxels representing the total scanned volume. The Anatomy Based Extraction Unit 2920 and the Organ-Based Analysis Unit 2930 extract a set of voxels from the total scanned volume, forming a database of voxels representing the segmented organ (2902). Next, the Initial Lesion Candidate Selector 2940 uses the segmented organ database 2903 to compute three-dimensionally derived geometric feature values and form a database of initial lesion candidates (2903). The initial lesion candidates are then transformed, via morphological dilation and clustering, by the Candidate Lesion Selector 2950, into a database of final lesion candidates (2904. Feature values of the candidate lesions are computed by the Feature Computation Unit 2960 and used by the Discriminator Unit 2970 to classify the candidate lesions into a database of true-positive lesions 2905.

The source of image data for Interpolation Unit 2910 may be any appropriate image acquisition device such as an X-ray machine, CT apparatus, and MRI apparatus. Further, the acquired data may be digitized if not already in digital form. Alternatively, the source of image data being obtained and processed may be a memory storing data produced by an image acquisition device, and the memory may be local or remote, in which case a data communication network, such as PACS (Picture Archiving Computer System), can be used to access the image data for processing according to the present invention.

This invention conveniently may be implemented using a conventional general purpose computer or micro-processor programmed according to the teachings of the present invention, as will be apparent to those skilled in the computer art. Appropriate software can readily be prepared by programmers of ordinary skill based on the teachings of the present disclosure, as will be apparent to those skilled in the software art.

As disclosed in cross-referenced U.S. patent application Ser. No. 09/818,831, a computer implements the method of the present invention, wherein the computer housing houses a motherboard which contains a CPU, memory (e.g., DRAM, ROM, EPROM, EEPROM, SRAM, SDRAM, and Flash RAM), and other optional special purpose logic devices (e.g., ASICS) or configurable logic devices (e.g., GAL and reprogrammable FPGA). The computer also includes plural input devices, (e.g., keyboard and mouse), and a display card for controlling a monitor. Additionally, the computer may include a floppy disk drive; other removable media devices (e.g. compact disc, tape, and removable magneto-optical media); and a hard disk or other fixed high density media drives, connected using an appropriate device bus (e.g., a SCSI bus, an Enhanced IDE bus, or an Ultra DMA bus). The computer may also include a compact disc reader, a compact disc reader/writer unit, or a compact disc jukebox, which may be connected to the same device bus or to another device bus.

As stated above, the system includes at least one computer readable medium. Examples of computer readable media are compact discs, hard disks, floppy disks, tape, magneto-optical disks, PROMs (e.g., EPROM, EEPROM, Flash EPROM), DRAM, SRAM, SDRAM, etc. Stored on any one or on a combination of computer readable media, the present invention includes software for controlling both the hardware of the computer and for enabling the computer to interact with a human user. Such software may include, but is not limited to, device drivers, operating systems and user applications, such as development tools. Computer program products of the present invention include any computer readable medium which stores computer program instructions (e.g., computer code devices) which when executed by a computer causes the computer to perform the method of the present invention. The computer code devices of the present invention can be any interpretable or executable code mechanism, including but not limited to, scripts, interpreters, dynamic link libraries, Java classes, and complete executable programs. Moreover, parts of the processing of the present invention may be distributed (e.g., between (1) multiple CPUs or (2) at least one CPU and at least one configurable logic device) for better performance, reliability, and/or cost. For example, an outline or image may be selected on a first computer and sent to a second computer for remote diagnosis.

The invention may also be implemented by the preparation of application specific integrated circuits or by interconnecting an appropriate network of conventional component circuits, as will be readily apparent to those skilled in the art.

While preferred embodiments of the invention have been described, these descriptions are merely illustrative and are not intended to limit the present invention. For example, although the embodiments of the invention described above were in the context of a system for the computer-aided diagnosis and detection of colorectal polyps, those skilled in the art will recognize that the disclosed methods and structures are readily adaptable for broader applications including other types of lesions in other organs. In addition, the invention is applicable to many other types of CAD systems for detection of other medical abnormalities.

Moreover, it will be appreciated from the foregoing that the present invention represents a significant advance over other systems and methods for the computer-aided detection of organ lesions. It will also be appreciated that, although a limited number of embodiments of the invention have been described in detail for purposes of illustration, various modifications may be made without departing from the spirit and scope of the invention. Accordingly, the invention should not be limited except as by the appended claims.

TABLE 1

| Structure | Search Range (HU) | |
| --- | --- | --- |
| | Minimum | Maximum |
| Air | −990 | −900 |
| Lung | −950 | −600 |
| Fat | −200 | 0 |
| Muscle | 0 | 100 |

TABLE 2

| PARAMETER | | | VALUE |
| --- | --- | --- | --- |
| SEED REGION | SHAPE INDEX | minimum | 0.9 |
| | | maximum | 1.0 |
| | CURVEDNESS | minimum | 0.08 mm$^{-1}$ |
| | | maximum | 0.20 mm$^{-1}$ |
| GROWABLE REGION | SHAPE INDEX | minimum | 0.8 |
| | | maximum | 1.0 |
| | CURVEDNESS | minimum | 0.05 mm$^{-1}$ |
| | | maximum | 0.25 mm$^{-1}$ |
| | MERGING DISTANCE | | 12.5 mm |
| | FUZZY MEMBERSHIP | | 0.8 |
| | MINIMUM VOLUME | | 38 mm$^3$ |

TABLE 3

| Feature | Abbreviation |
| --- | --- |
| CT value | CT |
| Gradient | GR |
| Shape index | SI |
| Curvedness | CV |
| Gradient concentration | GC |
| Directional gradient concentration | DGC |

TABLE 4

| Statistic | Abbrev. | Statistic | Abbrev. | Statistic | Abbrev. |
| --- | --- | --- | --- | --- | --- |
| mean | mean | variance | var | entropy | entr |
| minimum | min | skewness | skew | contrast | cnt |
| maximum | max | kurtosis | kurt | maximum10 | max10 |

TABLE 5

| Feature | Stat (1) | $A_z$ | Stat (2) | $A_z$ | Stat (3) | $A_z$ |
| --- | --- | --- | --- | --- | --- | --- |
| SI | mean | 0.92 | skew | 0.91 | max10 | 0.76 |
| DGC | mean | 0.85 | max10 | 0.82 | skew | 0.82 |
| CT | kurt | 0.85 | var | 0.83 | ctr | 0.77 |
| GR | mean | 0.77 | max10 | 0.75 | max | 0.73 |
| GC | min | 0.76 | mean | 0.75 | max10 | 0.70 |
| CV | var | 0.73 | kurt | 0.69 | entr | 0.69 |

The invention claimed is:

1. A method of processing a set of cross-sectional images defining a volumetric region encompassing an inner surface, an outer surface, and intervening tissue between the inner surface and the outer surface of a colon, comprising:
    obtaining a set of voxels representing a total scanned volume from the set of cross sectional images of the colon; and
    performing segmentation to extract a set of voxels representing the volumetric region encompassing the inner surface, the outer surface, and the intervening tissue between the inner surface and the outer surface of the colon from the set of voxels representing the total scanned volume,
    wherein the performing step includes
    generating a first set of segmentation voxels by thresholding the set of voxels representing the total scanned volume with a value characteristic of the colon;
    performing organ based analysis of the set of voxels representing the total scanned volume using seed locations obtained from the first set of segmentation voxels to obtain a second set of segmentation voxels; and
    determining an intersection of the first set of segmentation voxels and the second set of segmentation voxels to obtain the set of voxels representing the volumetric region encompassing the inner surface, the outer surface, and the intervening tissue of the colon.

2. The method of claim 1, wherein the obtaining step comprises:
    determining corresponding pixels on adjacent images in the set of cross sectional images of the colon; and
    connecting said corresponding pixels to obtain a set of voxels representing the total scanned volume.

3. The method of claim 1, wherein the step of performing organ based analysis comprises:
    selecting an air seed voxel;
    designating spatially connected voxels in a neighborhood of the air seed voxel to be in the second set of segmentation voxels, if a set of predetermined conditions is satisfied; and
    repeating the selecting and designating steps until a number of additional voxels designated in the designating step decreases by more than a predetermined percentage of a number of voxels designated in an immediately prior designating step.

4. The method of claim 1, wherein the step of performing organ based analysis comprises:
    selecting an air seed voxel;
    designating spatially connected voxels in a neighborhood of the air seed voxel to be in the second set of segmentation voxels, if a set of predetermined conditions is satisfied; and
    repeating the selecting and designating steps until a number of additional voxels designated in the designating step decreases by more than a predetermined number from a number of voxels designated in an immediately prior designating step.

5. The method of claim 3, wherein the designating step comprises:
determining as the predetermined conditions, (1) if each voxel in the region of spatially connected voxels is not in the first set of segmentation voxels, and (2) if each voxel in the region of spatially connected voxels has an associated voxel value and voxel gradient, each below predetermined values associated with walls of the colon.

6. The method of claim 3, further comprising:
designating a region of surface voxels to be in the second set of segmentation voxels;
repeating the designating step until the region of surface voxels intersects with more than a first predetermined percentage of a layer of voxels in the first set of segmentation voxels; and
repeating the preceding designating step until the region of surface voxels intersects with less than a second predetermined percentage of the layer of voxels in the first set of segmentation voxels.

7. The method of claim 3, wherein the air seed voxel selecting step comprises:
selecting a voxel that (1) is not in the first set of segmentation voxels, (2) has a voxel value less than a predetermined value, (3) is not in the second set of segmentation voxels, and (4) is not close to a boundary of the total scanned volume.

8. The method of claim 1, further comprising:
detecting a set of candidate lesions based on geometric feature values at each voxel in the set of voxels representing the volumetric region;
selecting at least one three dimensionally extended lesion from the set of candidate lesions based on at least one of volumetric feature values and morphologic feature values of each candidate lesion in the set of candidate lesions; and
outputting a set of voxels representing the at least one three dimensionally extended lesion selected in the selecting step.

9. The method of claim 8, wherein the detecting step comprises:
calculating geometric feature values for each voxel in the set of voxels representing the volumetric region;
generating a set of initial candidate lesions using the geometric feature values calculated in the calculating step; and
clustering the set of initial candidate lesions to form the set of candidate lesions.

10. The method of claim 9, wherein the calculating step comprises:
smoothing the volumetric region to generate volumetric regions at multiple scales;
determining a volumetric shape index, for each voxel in the set of voxels representing the volumetric region, on at least one scale; and
determining a volumetric curvedness value, for each voxel in the set of voxels representing the volumetric region, on the at least one scale.

11. The method of claim 9, wherein the step of generating a set of initial candidate lesions comprises:
identifying a set of seed voxels having a volumetric shape index value in a first predefined range and a volumetric curvedness value in a second predefined range;
determining a grow region of spatially connected voxels adjacent to a seed voxel in the set of seed voxels;
applying conditional morphological dilation to the grow region to obtain an enhanced grow region;
designating the enhanced grow region as an initial candidate lesion in the set of initial candidate lesions; and
repeating the preceding determining, applying, and designating steps for each seed voxel in the set of seed voxels.

12. The method of claim 11, wherein the step of applying conditional morphological dilation comprises:
expanding the grow region by morphological dilation until at least a boundary of an expanded region reaches a boundary of the colon;
measuring a growth rate of the grow region during the expanding step; and
designating the grow region at a minimum growth rate as the enhanced grow region.

13. The method of claim 9, wherein the clustering step comprises:
merging initial candidate lesions in the set of initial candidate lesions that are located within a predetermined distance of each other to obtain a reduced set of candidate lesions;
grouping the reduced set of candidate lesions to obtain a set of lesion clusters; and
removing lesion clusters having a total volume below a predetermined minimum volume from the set of lesion clusters to obtain the set of candidate lesions.

14. The method of claim 8, wherein the selecting step comprises:
selecting a set of true positive lesions from the set of candidate lesions; and
outputting the set of true positive lesions as the at least one three dimensionally extended lesion.

15. The method of claim 14, wherein the step of selecting a set of true positive lesions comprises:
calculating at least one feature value for each voxel in a set of voxels representing the set of candidate lesions;
calculating statistics of the at least one feature value for each lesion in the set of candidate lesions; and
partitioning the set of candidate lesions into a set of false positive lesions and the set of true positive lesions based on analysis of the statistics of the at least one feature value calculated in the preceding calculating step.

16. The method of claim 15, wherein the step of calculating at least one feature value comprises:
calculating a gradient concentration feature value for each voxel in the set of voxels representing the set of candidate lesions;
calculating at least one of volumetric shape index value, volumetric curvedness value, and gradient of voxel value for each voxel in the set of voxels representing the set of candidate lesions; and
identifying a set of voxels having a feature value in a predefined range to generate a restricted set of candidate lesions; and
calculating at least one of gradient concentration feature value, volumetric shape index value, volumetric curvedness value, and gradient of voxel value for the set of voxels representing the restricted set of candidate lesions.

17. The method of claim 15, wherein the step of calculating statistics of the at least one feature value comprises:
determining at least one of mean, minimum, maximum, variance, standard deviation, skewness, kurtosis, and ratio of minimum to maximum, using feature values of all voxels in each candidate lesion in the set of candidate lesions.

18. The method of claim 15, wherein the partitioning step comprises:
partitioning the set of candidate lesions using at least one of a linear discriminant classifier, a quadratic discriminant classifier, a neural network, and a support vector machine.

19. The method of claim 16, wherein the step of calculating the gradient concentration feature comprises:
determining a gradient vector of voxel values for each voxel in the set of voxels representing the enhanced set of candidate lesions; and
calculating a concentration of the gradient vector at each voxel in the set of voxels representing the set of candidate lesions.

20. The method of claim 1, wherein the obtaining step comprises:
obtaining the set of voxels representing the total scanned volume from a set of cross sectional computed-tomographic images of a colon.

21. The method of claim 1, wherein the step of performing segmentation comprises:
removing voxels representing organs other than the colon from the set of voxels representing the total scanned volume.

22. A method of identifying at least one three dimensionally extended lesion from a set of voxels representing a volumetric region encompassing an inner surface, an outer surface, and intervening tissue between the inner surface and the outer surface of a colon, comprising:
calculating geometric feature values for each voxel in the set of voxels representing the volumetric region:
generating a set of initial candidate lesions using the geometric feature values calculated in the calculating step;
clustering the set of initial candidate lesions to form a set of candidate lesions:
selecting the at least one three dimensionally extended lesion from the set of candidate lesions based on at least one of volumetric feature values and morphologic feature values of each candidate lesion in the set of candidate lesions; and
outputting a set of voxels representing the at least one three dimensionally extended lesion selected in the selecting step.

23. The method of claim 22, wherein the calculating step comprises:
smoothing the volumetric region to generate volumetric regions at multiple scales;
determining a volumetric shape index, for each voxel in the set of voxels representing the volumetric region, on at least one scale; and
determining a volumetric curvedness value, for each voxel in the set of voxels representing the volumetric region, on the at least one scale.

24. The method of claim 22, wherein the step of generating a set of initial candidate lesions comprises:
identifying a set of seed voxels having a volumetric shape index value in a first predefined range and a volumetric curvedness value in a second predefined range;
determining a grow region of spatially connected voxels adjacent to a seed voxel in the set of seed voxels;
applying conditional morphological dilation to the grow region to obtain an enhanced grow region;

designating the enhanced grow region as an initial candidate lesion in the set of initial candidate lesions; and
repeating the preceding determining, applying, and designating steps for each seed voxel in the set of seed voxels.

25. The method of claim 24, wherein the step of applying conditional morphological dilation comprises:
expanding the grow region by morphological dilation until at least a boundary of an expanded region reaches a boundary of the colon;
measuring a growth rate of the grow region during the expanding step; and
designating the grow region at a minimum growth rate as the enhanced grow region.

26. The method of claim 22, wherein the clustering step comprises:
merging initial candidate lesions in the set of initial candidate lesions that are located within a predetermined distance of each other to obtain a reduced set of candidate lesions;
grouping the reduced set of candidate lesions to obtain a set of lesion clusters; and
removing lesion clusters having a total volume below a predetermined minimum volume from the set of lesion clusters to obtain the set of candidate lesions.

27. The method of claim 22, wherein the selecting step comprises:
selecting a set of true positive lesions from the set of candidate lesions; and
outputting the set of true positive lesions as the at least one three dimensionally extended lesion.

28. The method of claim 27, wherein the step of selecting a set of true positive lesions comprises:
calculating at least one feature value for each voxel in a set of voxels representing the set of candidate lesions;
calculating statistics of the at least one feature value for each lesion in the set of candidate lesions; and
partitioning the set of candidate lesions into a set of false positive lesions and the set of true positive lesions based on analysis of the statistics of the at least one feature value calculated in the preceding calculating step.

29. The method of claim 28, wherein the step of calculating at least one feature value comprises:
calculating a gradient concentration feature value for each voxel in the set of voxels representing the set of candidate lesions;
calculating at least one of volumetric shape index value, volumetric curvedness value, and gradient of voxel value for each voxel in the set of voxels representing the set of candidate lesions; and
identifying a set of voxels having a feature value in a predefined range to generate a restricted set of candidate lesions; and
calculating at least one of gradient concentration feature value, volumetric shape index value, volumetric curvedness value, and gradient of voxel value for the set of voxels representing the restricted set of candidate lesions.

30. The method of claim 28, wherein the step of calculating statistics of the at least one feature value comprises:
determining at least one of mean, minimum, maximum, variance, standard deviation, skewness, kurtosis, and ratio of minimum to maximum, using feature values of all voxels in each candidate lesion in the enhanced set of candidate lesions.

31. The method of claim 28, wherein the partitioning step comprises:

partitioning the set of candidate lesions using at least one of a linear discriminant classifier, a quadratic discriminant classifier, a neural network, and a support vector machine.

32. The method of claim 29, wherein the step of calculating the gradient concentration feature comprises:

determining a gradient vector of voxel values for each voxel in the set of voxels representing the enhanced set of candidate lesions; and calculating a concentration of the gradient vector at each voxel in the set of voxels representing the enhanced set of candidate lesions.

33. A computer program product embedded on a computer readable medium, the computer program product including plural computer program instructions which, when executed by a computer, cause the computer to perform the steps recited in any one of claims 1, 2, 3-20, 21, 22, and 23-32.

34. A system configured to process a set of cross-sectional images defining a volumetric region encompassing an inner surface, an outer surface, and intervening tissue of a colon by performing the steps recited in any one of claims 1, 2, 3-20, and 21.

35. A system configured to identify at least one three dimensionally extended lesion within a thick volumetric region encompassing an inner surface, an outer surface, and intervening tissue of a colon by performing the steps recited in any one of claims 22 and 23-32.

* * * * *